United States Patent
Barritz et al.

(10) Patent No.: US 6,519,766 B1
(45) Date of Patent: Feb. 11, 2003

(54) COMPUTER PROGRAM PROFILER

(75) Inventors: Robert Barritz, New York, NY (US); Gerald Cohen, Oakhurst, NJ (US)

(73) Assignee: Isogon Corporation, New York, NY (US)

(*) Notice: Subject to any disclaimer, the term of this patent is extended or adjusted under 35 U.S.C. 154(b) by 0 days.

(21) Appl. No.: 09/333,341

(22) Filed: Jun. 15, 1999

(51) Int. Cl.$^7$ ................................................ G06F 9/44
(52) U.S. Cl. ..................... 717/130; 717/127; 717/126; 717/131
(58) Field of Search ........................... 717/1, 4, 9, 130, 717/126, 127, 131, 156, 141, 144; 710/262

(56) References Cited

U.S. PATENT DOCUMENTS

| | | | | |
|---|---|---|---|---|
| 5,151,981 A | * | 9/1992 | Westcott et al. | |
| 5,355,487 A | * | 10/1994 | Keller et al. | 717/127 |
| 5,797,019 A | * | 8/1998 | Levine et al. | 710/262 |
| 5,896,538 A | * | 4/1999 | Blandy et al. | 717/4 |
| 5,949,971 A | * | 9/1999 | Levine et al. | 714/47 |
| 5,950,009 A | * | 9/1999 | Bortnikov et al. | 717/9 |
| 5,960,198 A | * | 9/1999 | Roediger et al. | 717/4 |
| 6,018,759 A | * | 1/2000 | Doing et al. | 709/108 |
| 6,026,234 A | * | 2/2000 | Hanson et al. | 717/4 |
| 6,070,009 A | * | 5/2000 | Dean et al. | 717/130 |
| 6,226,787 B1 | * | 5/2001 | Serra et al. | 717/4 |
| 6,256,775 B1 | * | 7/2001 | Flynn | 717/4 |

OTHER PUBLICATIONS

Article: What are Your CICS Transactions Really doing, Anyway?.
Title: Efficient path profiling, author: Ball et al, IEEE/ACM, Dec. 1996.*
Title: ProfileMe, author: Dean et al. IEEE/ACM, Dec. 1997.*
Title: Rapid Prototyping of Networks of Asynchronous Multiple Functional Units, Tsun et al, IEEE, 1997.*

* cited by examiner

Primary Examiner—Gregory Morse
Assistant Examiner—Chameli C. Das
(74) Attorney, Agent, or Firm—Ostrolenk, Faber, Gerb & Soffen, LLP

(57) ABSTRACT

A computer program providing an output which is used to profile one or more operational characteristics of another computer program. The computer program being evaluated is defined by a group of events. In order to provide a user with a useful way to evaluate the performance of the computer program under evaluation, data is gathered corresponding to one or more of the group of events. A path map is constructed from the gathered event data in which the path map represents program operation performance relationships between the gathered events, and the path map is arranged in order of execution. The output is created based on the path map. The output is presented in such a manner that a user can quickly evaluate the performance of the program under evaluation. This is accomplished by presenting event data in a form which shows a logical programmatic flow along with a scaled representation of the quantity of times a measured event occurred along with a scaled representation of the duration of each measured event. Other statistical data can be analyzed and used as the basis for the output. The event data is gathered such that there is little effect on the performance of the program being evaluated.

54 Claims, 60 Drawing Sheets

| Tran A1 | RA 1 | WA 3 | RC 3 | WB 4 | RB 2 | RA 5 | | |
|---|---|---|---|---|---|---|---|---|
| Tran A2 | RA 4 | WA 4 | RC 6 | WC 6 | RA 4 | RB 6 | WA 4 | WB 5 |
| Tran A3 | RA 2 | WA 5 | RB 3 | RC 5 | RB 1 | WA 6 | | |
| Tran A4 | RB 1 | RA 1 | WB 1 | RB 4 | WC 6 | RA 2 | RB 3 | WA 4 | WB 5 |
| Tran A5 | RB 6 | RA 2 | WB 4 | RB 5 | RA 5 | WB 3 | RB 3 | WA 2 | |
| Tran A6 | RC 5 | WB 1 | RB 1 | RA 3 | RB 6 | RC 6 | RB 4 | WA 4 | |
| Tran A7 | RD 6 | WA 5 | RB 2 | RA 2 | WB 4 | RC 1 | | | |
| Tran A8 | RC 6 | WB 5 | RB 4 | WA 4 | WB 3 | | | | |
| Tran A9 | RC 1 | WB 6 | RA 1 | WA 2 | RC 4 | RB 4 | WA 3 | | |
| Tran A10 | RC 1 | WB 2 | RB 2 | RA 6 | RB 1 | WA 5 | RA 5 | RB 4 | |

Fig. 18A

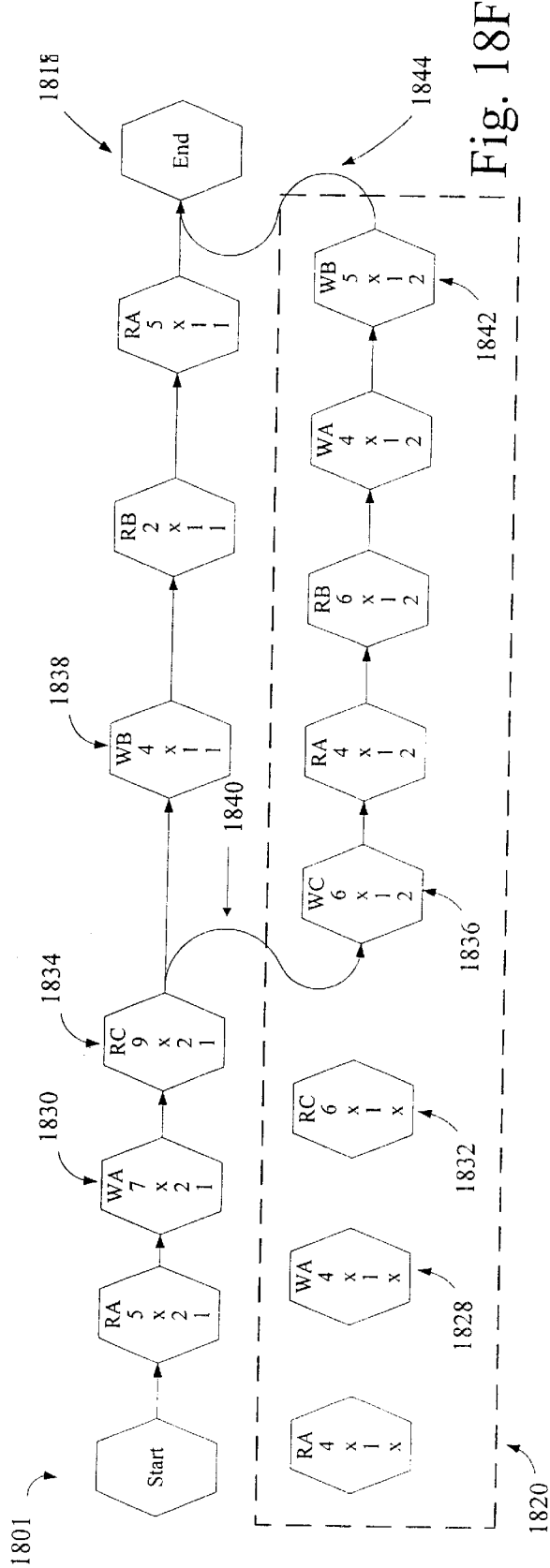
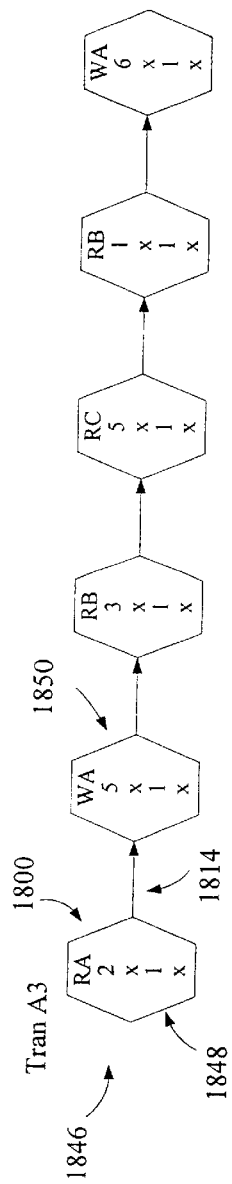
Fig. 18F
Fig. 18G

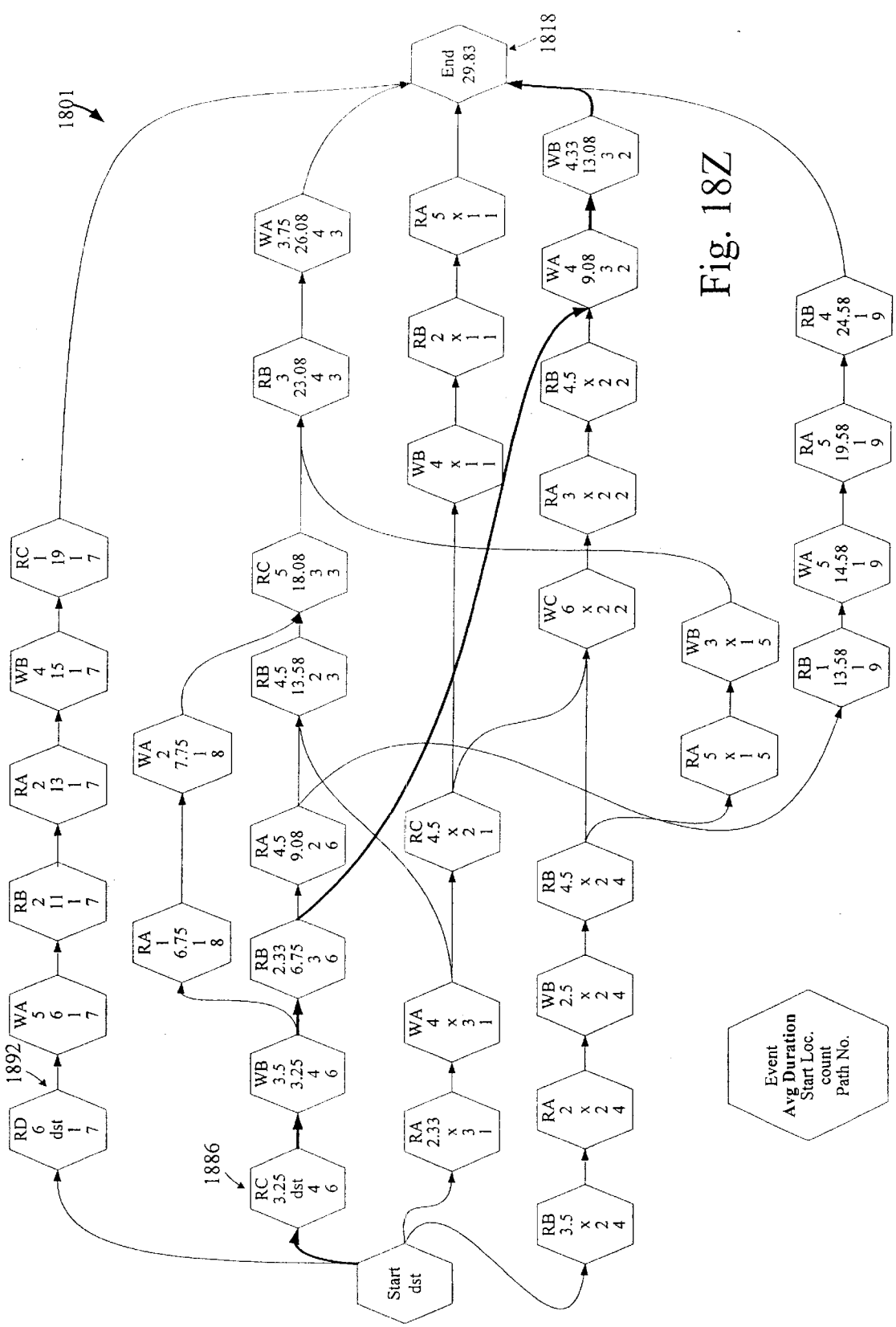

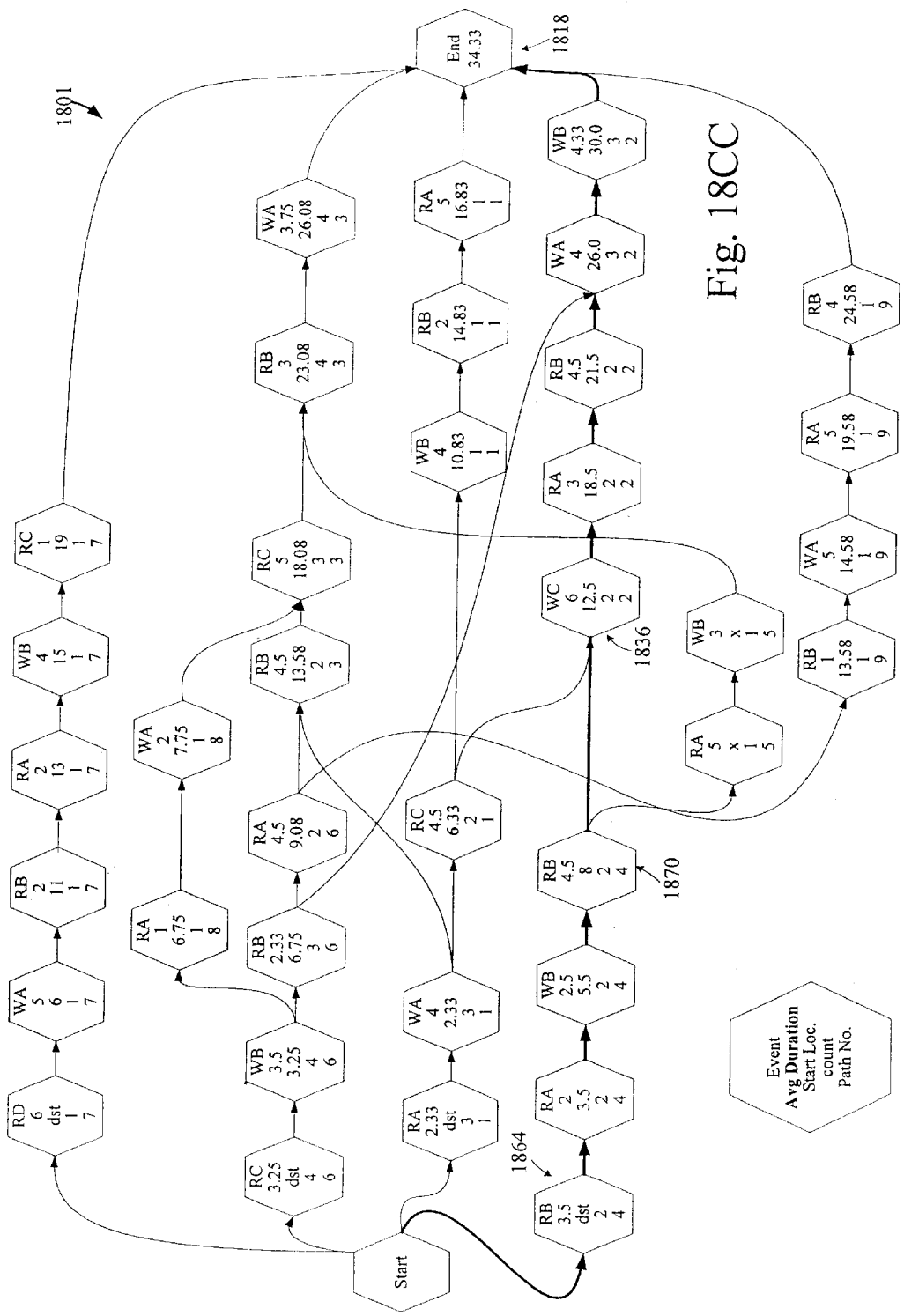

COMPUTER PROGRAM PROFILER

BACKGROUND OF THE INVENTION

This invention relates to a system and method for profiling the dynamic execution of a computer program, and more particularly to a system and method for creating a pictorial or diagrammatic representation of the dynamic execution of a computer program.

The efficiency of computer systems overall, and of individual computer programs or portions thereof in particular, is of great concern to those who write software and maintain computer systems. This is exemplified by the fact that computer hardware and software owners often view their computing resources, and the applications executing on them, as assets. Like many other assets, their owners seek to manage the assets such that the efficiency and productivity of these assets are maximized. The performance of any computer system is necessarily a function of the efficient utilization of the computer's limited resources (e.g., processor usage, memory and I/O devices). Adjusting the allocation of the limited resources in the computer system in order to effectively manage the computing assets, also known as "tuning," can result in more efficient utilization of these valuable resources and programs which execute faster and more efficiently.

The "behavior" of computer programs, that is, the dynamic, run-time execution and processing of a computer program, is often studied in detail. Understanding the behavior of a computer program facilitates tuning of the system and correction of run-time errors or other shortcomings. These errors may be the result of programming mistakes, or of unexpected and inefficient interaction between one or more programs (or one or more processes spawned by a single program) running simultaneously on the system.

The behavior of a computer program, and in particular the sequence of operations performed by the program, may vary considerably each time the program is run (each "instance" of the program) even though the source code has not changed. The behavior of a program may vary from instance to instance based on input (received from a user or an I/O device, for example), data read by and operated on by the program, and the like. As a result of these variables, the sequence of operations performed by the program (known as "paths") may vary significantly from instance to instance. Further, as a result of such different paths being taken by the program, the performance of the program may vary from instance to instance, in some cases being satisfactory and in other cases being unsatisfactory. Moreover, the program may perform correctly when certain paths are taken, and the program may perform erroneously when other paths are taken. Even paths that perform correctly may follow a sequence not well understood by programmers maintaining the program, or even by its original developer.

These difficulties are compounded in larger programs, wherein the increased number of functions and subfunctions makes it less likely that the program's internal workings will be fully understood. In such cases, it is likely that a "result-oriented" approach will be taken by developers and maintenance personnel, by which the efficacy of the program is tested only by verifying the correctness of output from the program without fully understanding what the program is actually doing while executing, and in what manner the program is making use of system resources. A "behavioral" approach to tuning and debugging, in which the programmer or maintainer understands the logical flow or behavior of programs during execution and use of the system's resources, is better suited for developing programs and tuning systems to maximize the efficient use of resources while minimizing errors. However, a tool is needed to convey information about the behavior and performance of the program to the programmer or maintainer (the user of the tool) in a comprehensible and more easily graspable format.

Several types of programs have been developed which create pictorial representations, or profiles, of program performance. One type of profiling program monitors and profiles the overall performance of subject programs by simply gathering statistics on such things as I/O frequency and CPU utilization and by indexing this data by time period, type of I/O, etc.

A second type of profiling program profiles the performance of subject programs by collecting statistics related to individual instructions or ranges of instructions executed by the subject program. This second type of profiling program typically periodically interrupts the operation of the subject program and detects the instruction about to be performed by the subject program. This type of profiling program reports the relative frequency with which particular instructions or ranges of instructions are executed, and may also report on the CPU time consumed by those instructions. The report produced by this type of profiling program may consist of a bar chart with a bar for each instruction or instruction range, wherein the height of each bar denotes the frequency with which the subject program was found to be executing the instruction or range of instructions at issue when the subject program was interrupted.

A third type of profiling program, known as "flow charting programs," processes the source code of a computer program directly and depicts it graphically, according to well-known conventions, so that the processing logic and flow can be more easily traced and understood.

While all of these types of profiling programs provide valuable information for systems and application programmers, the present art is deficient in that no program relates the run-time behavior and dynamic performance of a program to its logical flow. Therefore, it is desired to provide a computer program profiler which depicts the behavior of a computer program and relates the program's behavior and performance to its logical flow in its operating environment, including multiprocessor and networked environments.

SUMMARY OF THE INVENTION

Generally speaking, in accordance with the invention a computer program profiler is provided which diagrammatically, pictorially and tabularly provides a user with data showing the behavior of a computer program such that the program's behavior and performance is shown in accordance with its logical flow in its operating environment, including multiprocessor and networked environments. This allows owners and operators of the computers and networks executing the program to effectively and efficiently manage their computing and networking assets.

It is an object of the present invention to provide a method for profiling one or more operational characteristics of a computer program, the computer program performing one or more transactions, at least one of the transactions having one or more events in which data is gathered corresponding to one or more of the events. A path map is constructed from the gathered event data in which the path map represents program operation performance relationships between the gathered events, the path map being in execution-time sequence, and an output is created based on the path map.

Another object of the invention is to provide a method for analyzing at least one transaction of a computer program to determine the operational characteristics of the computer program, in which a plurality of data is gathered corresponding to one or more of a plurality of event data in a manner having approximately no impact on the executional performance of the computer program. An output is created based on the plurality of gathered event data.

According to still another object of the present invention, an apparatus for profiling one or more operational characteristics of a computer program is provided, the computer program performing one or more transactions, at least one of the transactions having one or more events in which the apparatus comprises a processor capable of the following functions:

gathering data corresponding to one or more of said plurality of events;

constructing a path map from the gathered event data, the path map representing program operation performance relationships between the gathered events, the path map being in execution-time sequence; and creating an output based on the path map.

According to another object of the invention, a computer storage medium storing a first computer executable program code is provided which, when run, executes a method for profiling one or more operational characteristics of a second computer program, the second computer program performing one or more transactions each having a plurality of events, in which data is gathered corresponding to one or more of the plurality of events. A path map is constructed from the gathered event data, the path map representing program operation performance relationships between the gathered events, the path map being in execution-time sequence, and an output is created based on the path map.

Other features and advantages of the present invention will become apparent from the following description of the invention which refers to the accompanying drawings.

BRIEF DESCRIPTION OF THE DRAWINGS

For the purpose of illustrating the invention, there is shown in the drawing several forms which are presently preferred, it being understood, however, that the invention is not limited to the precise arrangements and instrumentalities shown.

DETAILED DESCRIPTION OF EMBODIMENTS OF THE INVENTION

Figure 1:
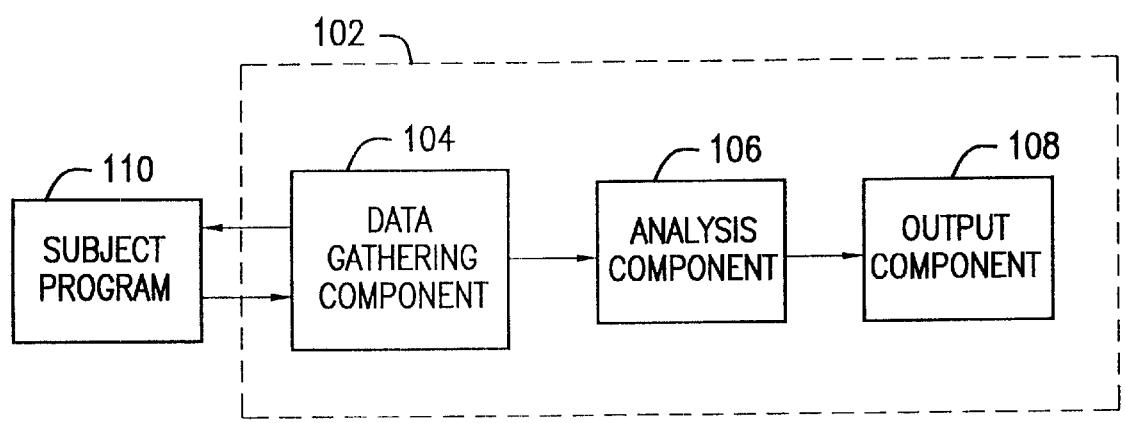
FIG. 1 is a block diagram of a computer program profiler constructed in accordance with the present invention.

Reference is first made to FIG. 1, in which a computer program profiler 102 developed in accordance with the present invention is shown. Computer program profiler 102 includes a data gathering component 104, an analysis component 106 and an output component 108. Generally speaking, in accordance with the invention, data gathering component 104 gathers data on the sequential execution logic and performance of a subject program 110. The data gathered on subject program 110 by data gathering component 104 is transferred to analysis component 106 for analysis and creation of a specialized data structure referred to as a "path map." The path map created by analysis component 106 is used by output component 108 to create a specialized depiction of graphics and/or text which relates the behavior and performance of subject program 110 to its logical flow.

Computer program profiler 102 is executed by one or more processing computers. The processing computers can be mainframe computers, minicomputers or personal computers. In addition, data gathering component 104 of computer program profiler 102 can execute on a special purpose computer such as a network router or switch.

Subject program 110 may generally comprise any computer program running on virtually any type and any number of computers such as mainframe computers, minicomputers, personal computers, or special purpose computers such as network routers, switches, etc. For ease of discussion, the following description of the preferred embodiments of the invention is based on an IBM Customer Information Control System (CICS) transaction processing program. CICS is a product which enables users to create programming applications called "transactions" to process certain data. Each transaction is identified by a unique name and comprises a sequence of operations or "events." An event is a milestone that can be quantified for gathering statistical profiling data. For example, in CICS, a transaction is the execution of a program that performs a sequence of events according to input data provided by the user. In UNIX it is common to "pipe" data through two or more programs, each of which performs a sequence of operations. Such events may include, for example, reading and writing to various data files. Accordingly, subject program 110 will generally be referred to herein as a transaction.

Although the following description refers to transactions and events, it is to be understood that the invention encompasses any implementation of the computer program profiler having the features described herein on any computer hardware or software platform or network of computers. Moreover, the term "transaction" is intended to more generally refer to any program, application or portion thereof, and the term "event" is intended to more generally refer to any segment of a transaction which is of interest to a user.

Such segments may include, but are not limited to, an instruction, I/O operation, macro, function, subroutine or the like, a signal passing through a network node, or a group thereof.

Events can be considered either low-level operations, high-level operations, or a combination of both. High-level operations are generally composed of one or more low-level operations. The distinction between high-level operations and low-level operations is fluid and is not a function of the program which is gathering corresponding statistical data. Rather, it is a function of how a user defines "high" and "low". For example, a user may consider read file, write file, create database record, perform network I/O, and perform an operating system function as examples of low-level events. The same user might also consider send electronic mail, query a database, execute an application program and an internet domain name look-up as examples of high-level events. Thus, high-level or low-level events can be monitored, depending upon the nature of the user's interest.

With the proliferation of networking computers together to perform a function, a computer program is no longer considered a single entity residing and executing in a single unit. A computer program can be distributed among multiple computer units. Thus, as used herein the term "computer program" refers to the overall entity being profiled through which a transaction passes. This entity may require numerous separate programs and multiple computer units to perform its function. These separate programs may in turn employ the use of multiple libraries or may be bundled into one or more program suites.

For example, assume that the computer program to be profiled is a bank's automated teller machine ("teller machine") system. This system is comprised of many teller machines, each of which have their own operating programs, regional controllers each with their own operating programs and multiple mainframe computers, each of which run many programs to track, process and store transactional data. In addition, a bank's own "teller machine" system is likely to be interconnected to other banks' "teller machine" systems. There are additional communication programs running on the bank's computer which provide this functionality. Of course, the network components such as switches and routers also have their own programs. All of these devices contribute to the series of transactions defined by events which constitute the computer program which is to be profiled.

Data gathering component 104 and subject program 110 are preferably stored and executed on the same computer system. However, as discussed above, data gathering component 104 may be stored and executed on a different computer system than subject program 110 so long as the systems are either sufficiently linked for data gathering component 104 to obtain the necessary data from subject program 110 or the data is made available to subject program 110 in some fashion such as a tape, disk or other media. Regardless of where data gathering component 104 is stored and executed, as discussed in detail below, the present invention operates and performs in a non-intrusive manner with respect to subject program 110 such that there is approximately no adverse impact on the executional performance of subject program 110. Analysis of a program's operation using the above-described program profilers is further complicated when the operation of the program is distributed across multiple processors, or multiple networked CPUs.

Data gathering component 104, analysis component 106 and output component 108 are also preferably stored and executed on the same computer system. However, it is to be noted that data gathering component 104 may gather and store data concerning subject program 110, and this data may then be copied, transmitted or otherwise transferred to a wholly separate computer system or systems on which analysis component 106 and output component 108 are stored. In addition to using multiple computer systems or separate computers to gather, analyze and produce the output for the computer program profiler 102, it is also possible that one or more of the programs involved in the execution of all or part of a transaction may be running on multiple processors or multiple computers within the operating environment. The computer program profiler 102 can support this distributed environment, including profiling the movement of data packets over a network. These scenarios are addressed in detail below.

Figure 2:
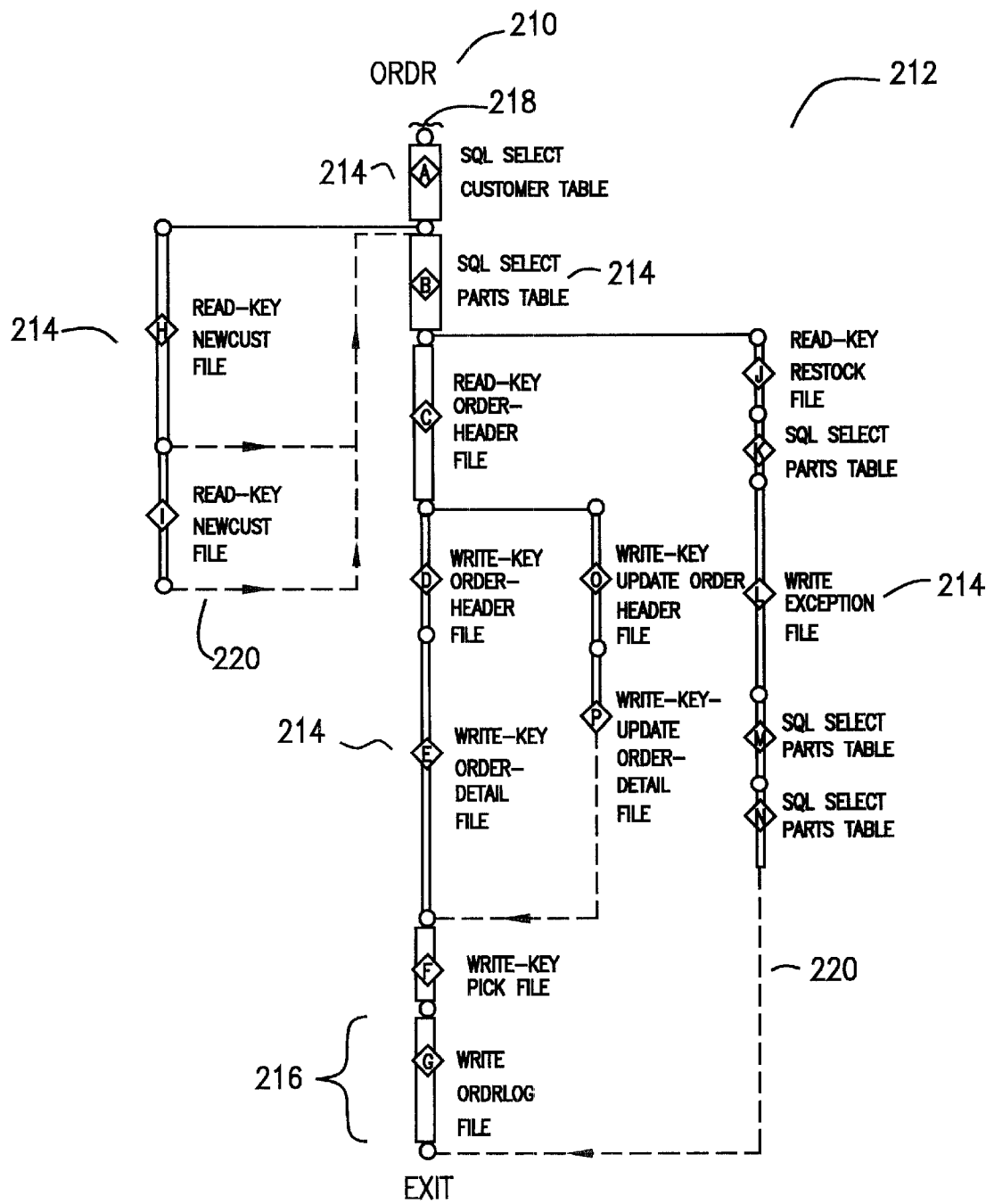
FIG. 2 is a sample output diagram generated by a computer program profiler constructed in accordance with the present invention.

FIG. 2 shows an output report 212 for the actual processing flow for an example subject program 210 named "ORDR". The output allows a user to diagnose the exact cause of slow or erratic transactions by letting the user see what subject program 210 is actually doing in a way that can be related to the program code itself.

The output, displayed on a screen, printed, or stored for future use is a path diagram that reflects the actual processing flow of subject program 210. The diagram depicts each path through subject program 210 that was followed by one or more transactions. A path is a distinct sequence of operations, such as I/O, transient data, etc.

As shown in FIG. 2, each line segment labeled with a letter within a diamond represents a particular operation 214. There are also shown segments in which the length 216 of each segment represents the average amount of elapsed execution time taken to perform the operation. The thickness 218 of each segment represents the number of transactions following that path. The dashed lines 220 show the operational flow back to the subject program's main line, represented in this example by operations A–G. The main line (or main path) is the path of the most frequently occurring sequence of paths from the beginning to the end of a transaction. The longest path is placed in the middle of the output diagram. The output diagram 212 quickly reveals any unnecessary, duplicated, or suspect operations. For example, in the mainline path, the write-key of the ORDER-DETAIL file (operation E) takes a long time to complete when compared with the other operations, possibly indicating a problem. As another example, the PARTS table is read in four different places (B, K, M, and N), revealing a possible logic error, or at the very least, an area of possible coding improvement.

All transactions can be analyzed, or analysis can be restricted to particular transaction IDs and/or particular terminal IDs. Data can be captured using standard exit routines such that very little overhead is introduced into the operation and performance of subject program 210.

Figure 3:
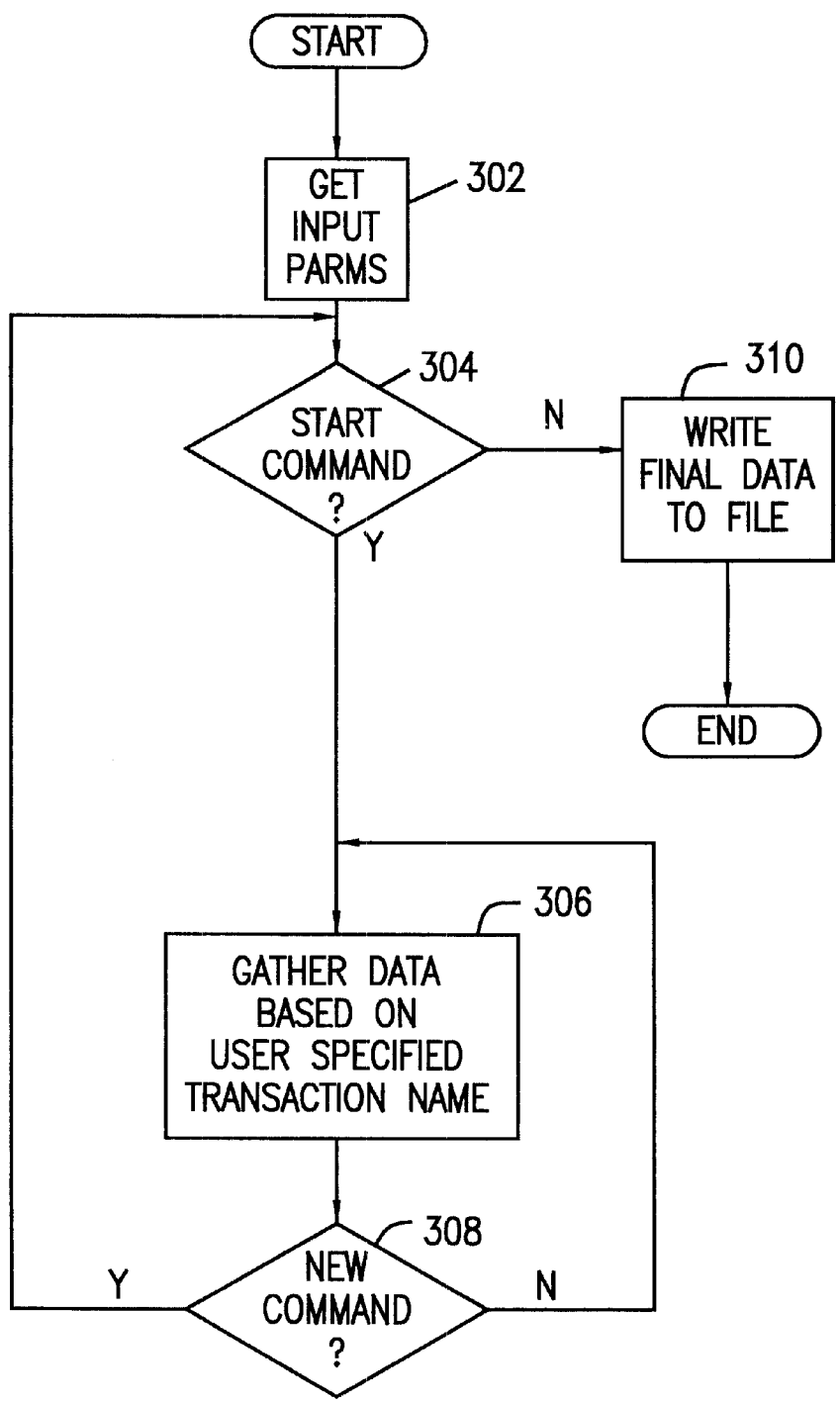
FIGS. 3–17 are flow diagrams depicting the operation of a computer program profiler constructed in accordance with the present invention.
Figure 4:
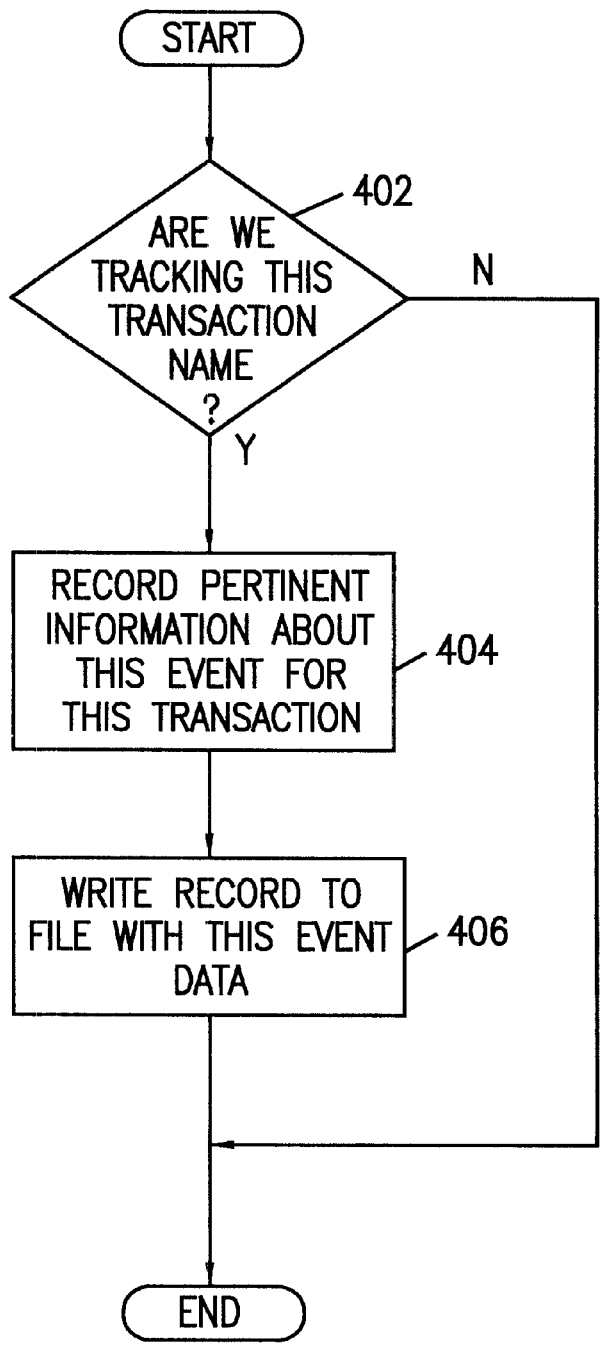

Reference is now made to FIGS. 3 and 4, wherein the operation of data gathering component 104 is explained in further detail. Data gathering component 104 is preferably initiated by a command input by the user to start data gathering. The initial task 302 performed by data gathering component 104 gets parameters from the user specifying the data to be gathered. For example, the user may be asked to specify the names of the transactions to be monitored for profiling. A default profile can also be created to monitor transactions when none are specified. Additionally or alternatively, the user may be prompted to specify names of transactions which are to be excluded from data gathering.

Such exclusions may serve to limit any generic names, names with wildcard characters, or lists of transaction names which the user has previously specified for inclusion in data gathering. Preferably, if no transaction names are specified by the user, data gathering component 104 will gather data on all transactions running on the subject computer system.

A grouping of transactions of a specific type, or transactions which are related are referred to as a "category". Examples of categories include activities conducted under a user-ID, internet domain name and internet domain name look-up, etc. Users might be interested in gathering statistical data relating to these categories. In these cases, profiling software is necessary to capture, analyze and present this data in a meaningful fashion. Data gathering component 104 can gather data relating to these categories. Presenting categorized transaction event data allows a user to view system performance at a meaningful level because the user is able to determine how a specific aspect of the system is operating, rather than merely viewing the low-level operational characteristics of the system. The present invention allows a user to view categorical system performance via an output, as described below, based on categories.

Data gathering component 104 also allows a user to specify certain criteria. The resultant profile is then based on this criteria. Criteria can be specified alone or in combination with one or more other criteria. In other words, criteria provide a way to filter data gathered or used in the present invention. It must be noted that filtering criteria can be implemented 1) in the data gathering stage so that only relevant data is captured and stored in memory; 2) during the path map creation stage such that all data pertaining to a transaction is captured and stored in memory, but only data meeting the specified criteria is passed to analysis component 106; 3) in the reporting stage so that the output presented to the user is focused on the area of interest to the user, or 4) any combination thereof. For example, a user might want to include or exclude transactions which:

have a specific transaction identification;
have a specific user identification;
have a path containing a particular node or event type;
have a particular Internet domain name;
have a particular Transmission Control Protocol/Internet Protocol (TCP/IP) address;
access a particular file or particular data; or
occur in a specific time period.

Data gathering component 104 then enters a loop beginning with step 304 in which data gathering component 104 checks whether the command input by the user is a request to start or stop data gathering. If the user has entered a start command, then data gathering component 104 proceeds to step 306 in which data is gathered on subject program 110 pursuant to the input parameters specified by the user in step 302. Internal work space for the data to be gathered is obtained.

After records containing the data have been gathered in step 306, data gathering component 104 checks to see if a new command has been issued by the user or, perhaps, by another program or I/O device in step 308. If no new command has been issued, processing reverts back to step 306 in which data gathering component 104 continues to gather and store data. This loop continues until a new user command has been detected in step 308. At this point, control is returned to step 304 in which the new user command is checked to determine whether or not it is a start command. Typically, a command entered after data gathering has begun will not be a start command, but rather will be a "quit" or similar command indicating that data gathering is to be stopped. In this case, the result of the query in step 304 will be negative and control will pass to a step 310 in which the final data is written to the data file specified by the user. All internal storage is then released and processing is complete.

Additionally or alternatively, data gathering component 104 may be discontinued in step 304 upon the expiration of a timer or upon reaching an ending time specified by the user in step 302. Such a configuration would allow the user to automate and simplify the gathering of data concerning subject program 110.

The quantity of criteria required to effectively monitor and profile transactions, and the resultant data from those criteria, may be too voluminous to be efficiently entered by a user. In addition, a user might not know which specific events are important for gathering and profiling purposes. In the alternative, data processes within data gathering component 104 can be substantially automated such that a user need not select particular event criteria. Using an automatic process, a user need not know which events are particularly important.

Methods and apparatuses for automatically monitoring computers to detect, monitor and control software products installed on a computer system are known. Such methods and apparatuses are provided, for example, in U.S. Pat. No. 5,499,340, issued to Barritz, and U.S. Pat. No. 5,590,056, issued to Barritz, both of which are incorporated herein by reference. The present invention can make use of automatic program detection by maintaining a list of criteria for which data are to be gathered in the event that a particular program is automatically detected. This reduces the amount of user interaction required to merely a single instruction, namely to begin automatic data gathering.

This aspect of the present invention is particularly useful when used in conjunction with mainframe computers because these computers typically employ many logical disks, for many different user communities, such that there is a large number of potential programs which may be executed thereon.

Automated data gathering in conjunction with automatic program detection is also quite useful in the network computing environment because a packet received by an individual node may cause the execution of one or any number of computer programs within that particular host. A user need only initiate the automatic execution of data gathering component 104 rather than enter data gathering criteria for each of these programs in the hopes that one will be executed. In other words, the automatic initiation of data gathering component 104 can be quite beneficial in large-scale computing environments. These predetermined data gathering criteria are stored in the computer's volatile or non-volatile memory for future use.

The predetermined criteria can be provided by the vendor of the particular software program to be monitored, can be established by the user, or can be generated by capturing all events for a particular program and deleting those event criteria which are not needed. of course, the predetermined list of event criteria can be edited by a user, and customized for a particular use.

In this embodiment, the substantially automated initiation of data gathering component 104 can optionally automatically invoke analysis component 106, described in detail below, such that the generation of an output map, or other output data, is automatically generated without the need for any user intervention. Preferably, analysis component 106 is invoked once data gathering component 104 has halted, i.e., data gathering is complete. Thus, automatic initiation of data gathering component 104 can be invoked without a user being present, and executed overnight, such that the resultant output is available for the user in the morning.

The data gathering performed by step 306 of data gathering component 104 is depicted in greater detail in FIG. 4. Each time data gathering component 104 is notified that an event has been or is about to be executed in an instance of a transaction, the transaction name of the event is checked in step 402. The transaction name for the subject event is compared with the list of transactions or classes of transactions specified by the user in step 302 for which data gathering was requested. If data gathering was not specified for this event, then the event is ignored and data gathering component 104 waits for the next event.

If the transaction name checked in step 402 matches one of the transactions to be monitored, control proceeds to a step 404 in which pertinent information about this event is recorded in a transaction record for the current instance of the subject transaction. In particular, the "event type" is recorded. The event type may indicate, for example, that the event is a read or write to a file, a transfer of control to another program or transaction module, or a request for system service such as storage. In addition, the time that the event occurred is recorded. Additional information specific to the event type is also recorded. For example, if the event was a write to a file, the additional information could include the name of the file and the size of data written to it. Finally, after the pertinent event information is recorded in step 404, in step 406 the resultant data record for this event is written to the data file specified by the user in step 302.

The mechanism for recording event data will vary from system to system. Some systems, such as CICS, allow "exit-routines" to be supplied in order to capture and record appropriate transaction and event data. Others, such as many computer operating systems, lack provision for some or all of the such exit-routines. In the latter case, it is necessary to establish a monitor to intercept the appropriate transactions and events without requiring modification to subject program 110 and/or having approximately no negative impact on the executional performance of subject program 110, and to record the data pertinent thereto. One such monitor is disclosed in U.S. Pat. No. 5,499,340, except that the functions being intercepted would also include input and output functions.

Figure 5:
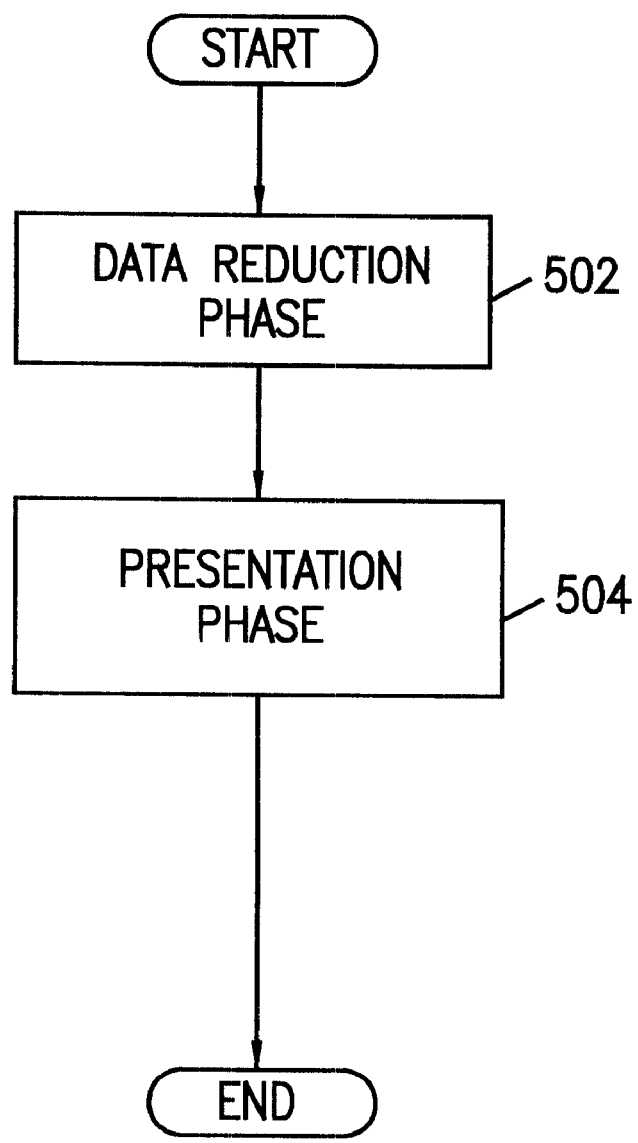

Reference is now made to FIG. 5, in which analysis component 106 of computer program profiler 102 is described in greater detail. Analysis component 106 can generally be divided into two fundamental, sequential phases: a data reduction phase 502 and a presentation phase 504. During the data reduction phase 502, the transaction and event data to be analyzed are selected and a data structure representing an internal map of the recorded events is created which relates the recorded events to one another. In addition, data from like sequences of events in different transaction instances are combined and looping events in each instance of the transaction are condensed. In the presentation phase 504, the internal map created in data reduction phase 502 is used to create a logical view that will allow the user to quickly understand how the recorded events relate to one another. This is accomplished by reassembling the events according to their sequence of execution within the subject transaction, identifying a "main path" through the recorded events, and generating data necessary to create a pictorial representation of this main path. Events which fall outside of the main path are arranged to show how they relate to those events which are on the main path. The relationships between the recorded events are analyzed to allow an optimum pictorial representation of the events. In the output component 108, the logical view created in presentation phase 504 is translated into a selected output medium, such as a printer or a computer monitor. As discussed above, analysis component 106 may be activated at any time after the transaction and event data gathered by data gathering component 104 has been stored.

Figure 6:
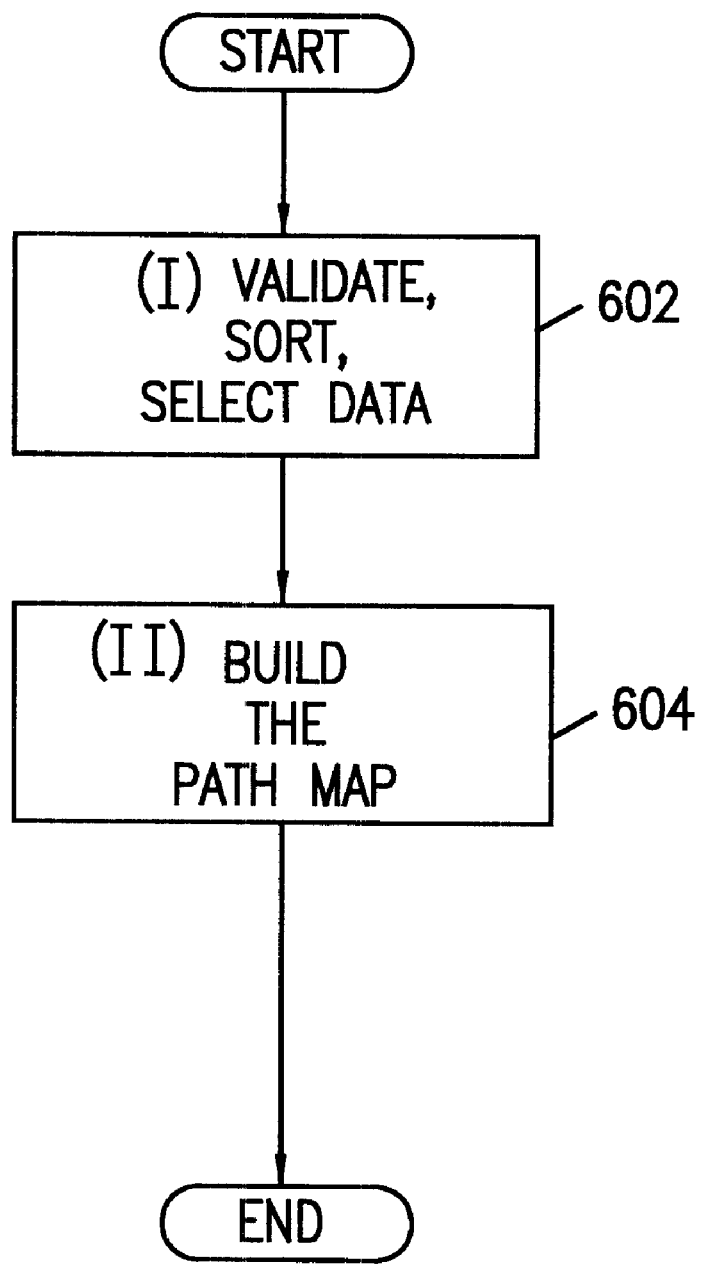

As shown in FIG. 6, the data reduction phase 502 may itself be generally divided into two sequential tasks. In a first data reduction phase task 602, event data is validated, sorted and selected. The recorded data is analyzed to ensure that it was built correctly and that the user parameters relating to the selected data, the selected output medium and the like, are correct. In a second data reduction phase task 604, a specialized data structure, referred to as a "path map," is built. The path map comprises a number of path element control blocks ("PECBs") which are created from the event data selected in the first data reduction phase task 602. Each PECB initially contains data for one recorded event, although the PECBs in the final path map are likely to contain data on more than one recorded event. The path formed by these PECBs is a logical map showing how each recorded event relates, in order of execution, to each other recorded event. Data is accumulated in each PECB related to particular aspects of one or more associated recorded events, such as the duration of execution time for the event and the number of times the event occurred within the time period selected for recording and analysis.

Figure 7:
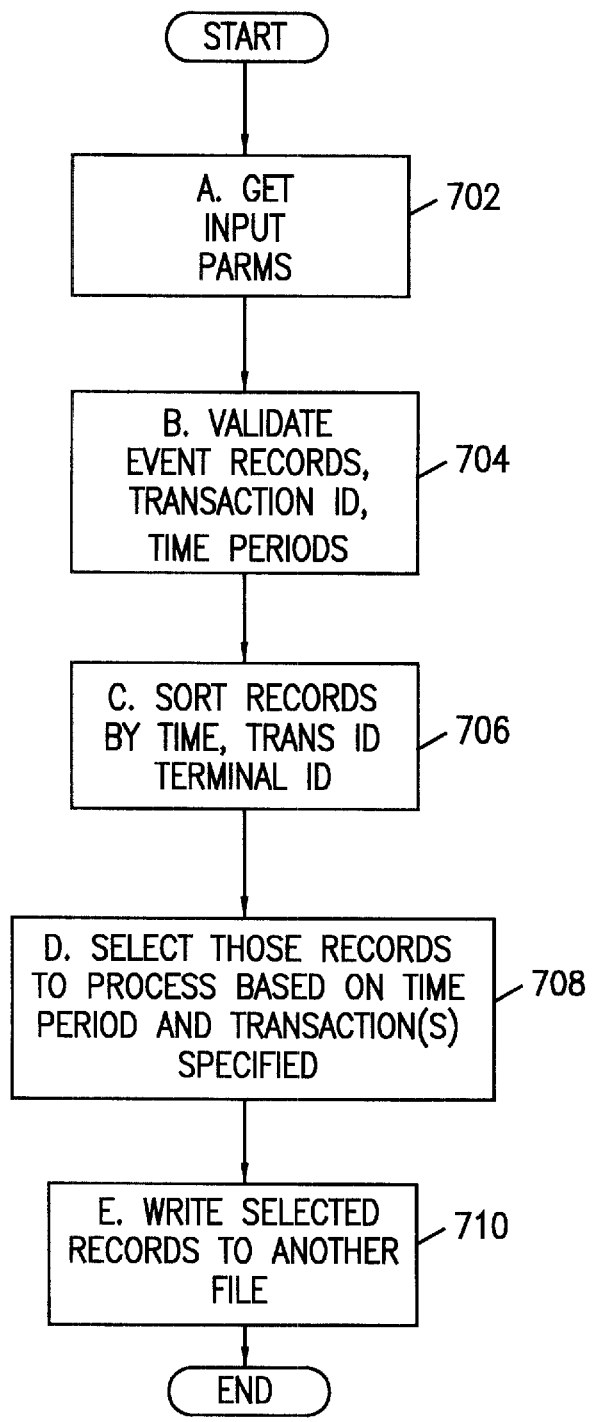

The processing performed by the first data reduction phase task 602 is shown in greater detail in FIG. 7. First data reduction phase task 602 begins with an input step 702 in which the user is prompted to specify where the event records to be analyzed are located and which records which should be selected for analysis. The parameters entered by the user may include, but are not limited to, file name(s) of records containing the event data, the names of transactions to be analyzed, the time period for analysis, and the like. After the input parameters have been obtained in step 702, the records containing the event data specified by the user are validated in a step 704 together with any transaction names and/or time periods specified by the user. In particular, the file containing the event records specified by the user is read and the format of the event records is validated to ensure that the data and the records can be properly interpreted. The event records are also checked to ensure that the event records contained in the specified file actually occurred within the time period specified by the user in step 702. A sort step 706 is then executed which sorts the event records in order of their respective points of execution within the program. The event records are further sorted by transaction name and any other relevant indicia specified by the user (for example, terminal I.D., user I.D., etc.) so that the event records are organized in the order in which the events occurred for a particular transaction. These event records are then selected in a selection step 708 based on the time period and transaction names specified by the user in input step 702. Finally, the sorted and selected event records are preferably written in a step 710 to a separate file for use in later processing.

Reference is now made to FIGS. 8–13 in which the second data reduction phase task 604 is described in further detail. Task 604 builds PECB chains from the PECBs selected and sorted in first data reduction phase task 602. Each PECB chain is a two-way linked list of PECBs representing the sequence of events which occurred in one instance of a recorded transaction. Second data reduction phase task 604 assimilates each of these PECB chains into a path map which is a specialized data structure, preferably configured as a linked list of PECBs, representing all unique paths or event sequences (each of which is represented by a path of linked PECBs on the map) executed for the selected transaction(s). Where the same path or path segment is executed in more than one instance of the transaction, the redundant paths or path segments are not given separate representation in the path map, but are instead tracked by recording, within the PECBs comprising the path map, the frequency with which certain paths or path segments were executed. In this way, the simplest logical and pictorial representation possible may be obtained without sacrificing any relevant data.

Figure 8:
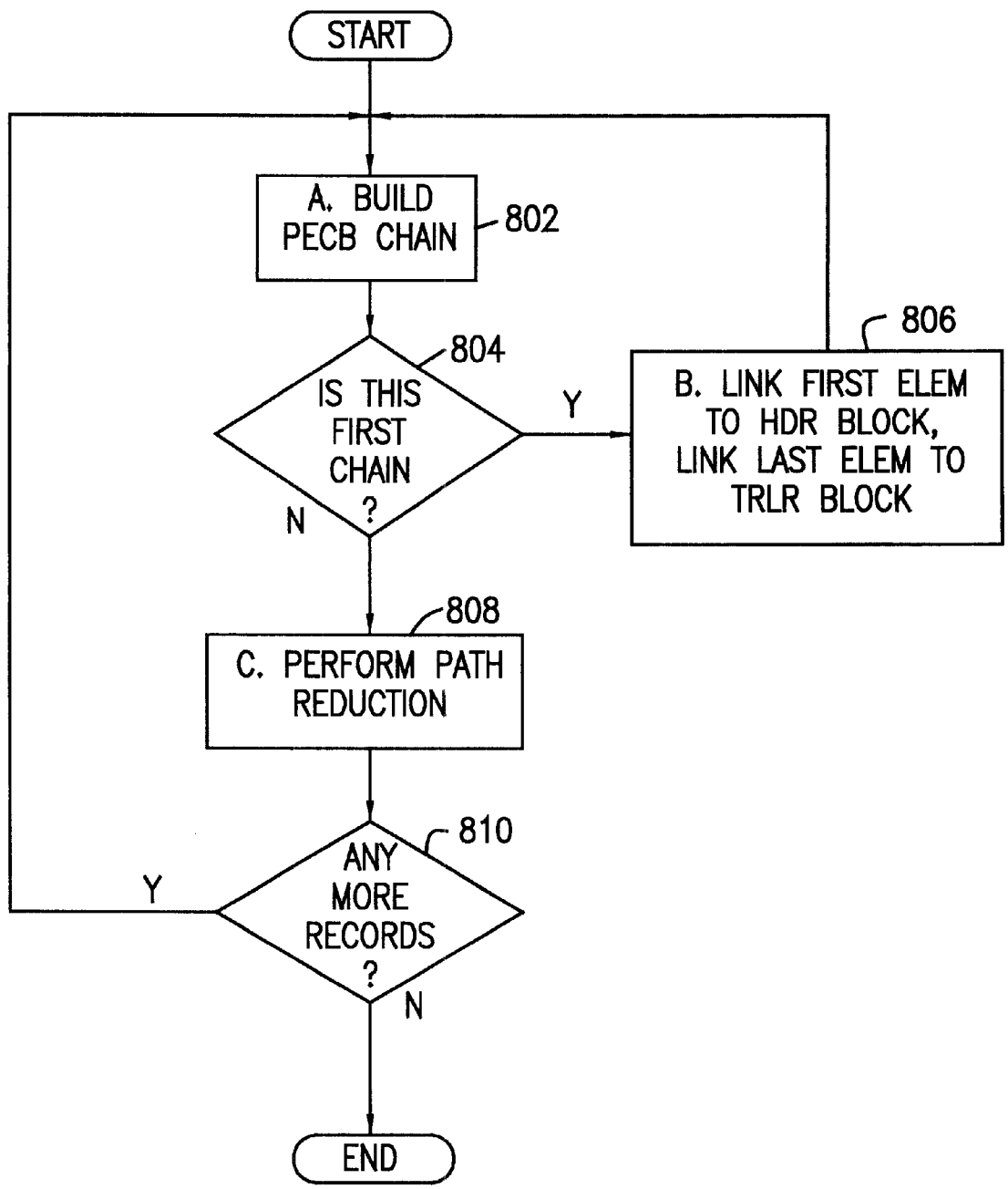

As shown in FIG. 8, building the path map begins by creating a chain of PECBs for each recorded instance of the transaction. First, a PECB chain building task 802 builds a single PECB chain for one instance of the transaction. After a PECB chain has been built, a decision 804 is made as to whether the PECB chain most recently built in step 802 is the first PECB chain built for the path map. If it is, two special PECBs are preferably built. Specifically, a header PECB and a trailer PECB (represented in the figures as HDR and TRLR, respectively) are built to anchor the beginning and end of the path map. The first PECB in the PECB chain detected by decision 804 is then linked to the header PECB, and the last PECB in the PECB chain detected by decision 804 is linked to the trailer PECB of the path map in step 806. At this point, the path map reflects one path for the subject transaction, namely, the path taken in the first recorded instance of the transaction. An identifier is preferably set in each PECB in this chain indicating that the path represented by this first PECB chain is the first unique path added to the path map. The identifier may comprise, for example, an integer path number (in this case "1"). Each time a new, unique path or path segment is added to the path map, its presence is preferably indicated by identifying each PECB in the new path or path segment with the next available path number. When the path map is complete, the path numbers in the PECBs will give an indication of how many unique path segments make up the final path map.

Control then returns to step 802 in which a PECB chain is built for the next recorded instance of the recorded transaction, if applicable. For each PECB chain built after the first in step 802, decision 804 will pass control to path reduction task 808 which condenses loop events within the PECB chain and attempts to match the chain to a PECB chain or PECB chain segment already in the path map. Data from like PECBs are combined in path reduction task 808 and the frequency of particular events is recorded to enable computation of average execution times for the recorded events. The process of building new PECB chains in task 802 and performing path reduction in task 808 continues in a loop until it is determined by a decision 810 that there are no more recorded transaction instances to be processed, after which control will be passed to presentation phase 504.

Figure 9:
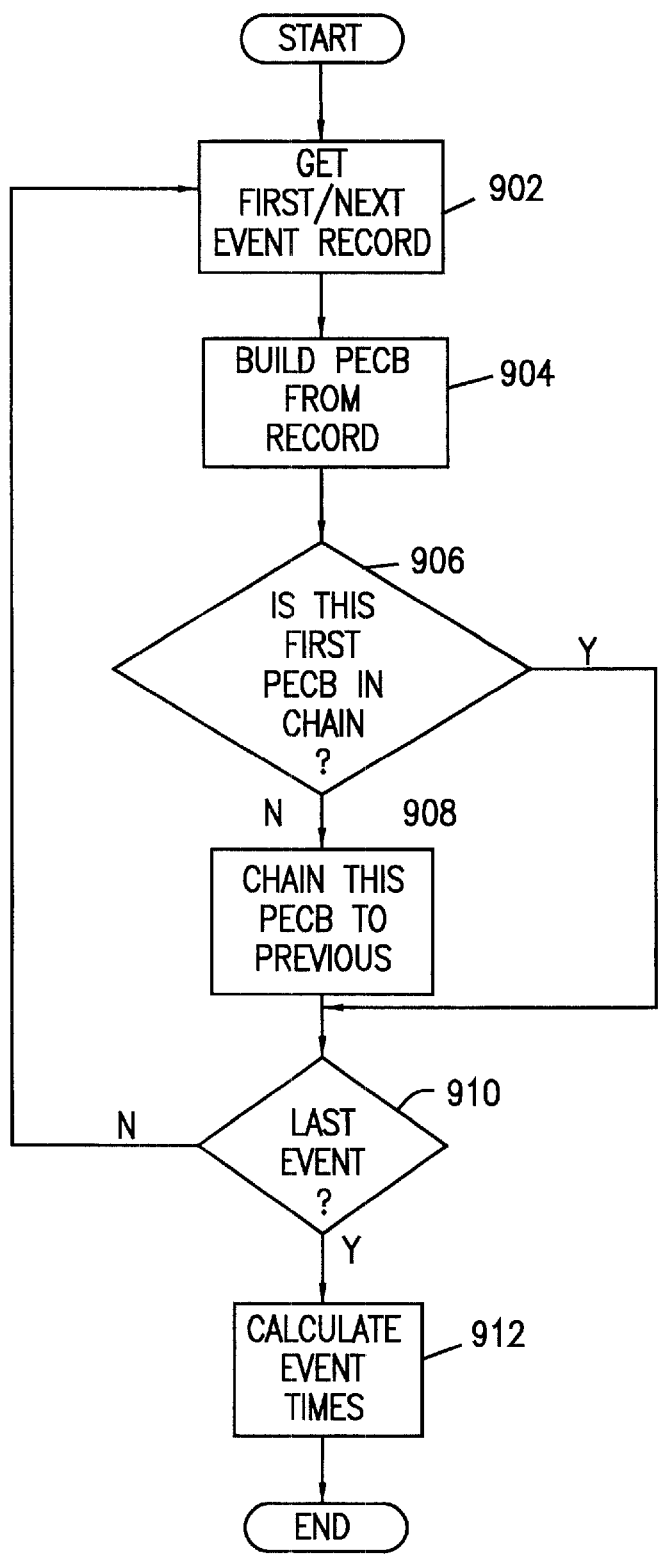

PECB chain-building task 802 is described in further detail with reference to FIG. 9. PECB chain building begins by obtaining an event record from the file of sorted and selected event records created in step 710 of FIG. 7. Next, a PECB is built in a step 904 from the event record selected in step 902. The PECB is a multi-threadable control block which will contain data about collected occurrences of the subject event and will be linked to events which precede and/or follow it in the PECB chain. Memory must, of course, be allocated for each PECB. Such allocation is preferably accomplished by allocating a large block of contiguous memory early in the analysis process, such as when each PECB chain is built or when the second data reduction phase task 604 is initiated, rather than when each PECB is built, for reasons of speed and efficiency. Allocating PECBs from a single large memory area also permits the PECBs to be contiguous in memory, which facilitates searching the linked PECBS. Data from the event record selected in step 902 is then written into the allocated PECB in step 904. In a CICS environment, the relevant event data could include the time the event was executed, a transaction I.D., an event type, event operands, a task number, a terminal I.D., a user I.D., and the like.

The PECB will also contain a number of pointers for linking the PECB to other PECBs before and after it on the PECB chain. A PECB may contain multiple forward and backward pointers, and therefore the size of a PECB may vary depending on the number of pointers allocated for the PECB. For this reason, the size of a PECB may be statically allocated by limiting the number of forward and backward pointers in the PECB, or, alternatively, memory space for additional pointers may be allocated dynamically to the PECB when such pointers are stored in the PECB.

After the PECB has been built in step 904, this most recently built PECB is chained or linked to the previously built PECB in this chain by step 908 if the current PECB is not the first in the chain as determined in decision 906. Chaining is accomplished by writing a forward pointer in the previous PECB which points to the current PECB, and by writing a backward pointer in the current PECB which points to the previous PECB in order to maintain the preferable two-way linkage. Decision 910 creates a loop by which PECBs are built and chained as described above until a PECB for the last event for the current transaction instance has been built and chained. At this point, the duration of execution of each event (the "event duration") is calculated, preferably by subtracting the time at which the event occurred (which was stored in each PECB in step 904) from the time at which the following event in the PECB chain occurred. The event duration for each event is written into the PECB for that event. An "event count" is also written into each PECB indicating the number of times the associated event was executed (in the sequence represented by the PECB chain) in all the recorded instances of the transaction. When a PECB chain is initially built, the event count in each PECB is set to 1.

The path reduction performed by path reduction task 808 on each PECB chain is described in greater detail with respect to FIGS. 10–13. Path reduction begins with a loop processing task 1002. Since a series of consecutive events of the same type may indicate a loop condition, the path map (and therefore the ultimate pictorial representation) should be simplified to condense the PECBs representing a loop condition into a single PECB in which the number of repetitions of the particular event is recorded as well as the average duration for each repetition of the event. Likewise, repeated sequences of multiple events may indicate a multiple event loop which requires similar processing.

After loops have been processed, a forward-processing task 1004 is initiated to determine whether the event sequence or "path" of the new PECB chain, or an initial segment of it, is identical to a path or path segment already on the path map. Forward-processing task 1004 attempts to match events on the new PECB chain with those already on the path map, beginning with the first event in the new PECB chain and the first event(s) on the path map and moving forward through the chain and path map. When a match is found, the event data in the PECB on the new chain is incorporated into the matching PECB already on the path map, and the PECB on the new chain is eliminated, thereby reducing the number of PECBs added to the path map and simplifying the ultimate output. PECBs which do not match any PECB already on the path map are added to the path map.

Likewise, backward-processing task 1006 completes path reduction by working backward from the end of the new PECB chain and attempting to match PECBs on the new chain against those already in the path map. This process is useful for identifying whether the path represented by the new PECB chain begins differently than those already in the path map but nevertheless ends with a sequence of events which is already identified in the path map and may be incorporated therein as described above.

Loop processing task 1002 condenses PECB chains containing loops by retaining only those PECBs in the chain necessary to represent one cycle of the loop and eliminating the remaining PECBs representing the redundant cycles of that loop. It is desirable to represent the loop as a single PECB block on the path map rather than including a PECB for every loop cycle. Such repetitive events would cause a large number of PECBs and unique paths, both in the path map and on the ultimate output diagram, which would overly confuse the user by displaying a complex set of interconnected and possibly crossing connection lines indicating these unique paths. The important information for the user, and therefore the relevant information to be stored in the path map, is the fact that a loop occurred and the average time consumed by the loop (in the example above, the number and duration of read events which were executed).

In addition, loop processing task 1002 averages the effects of loops across different instances of a transaction so that a variation in the number of identical events within the loop in different instances of the transaction does not cause a disproportionate number of unique paths to be created in the path map and ultimate output. For example, if a transaction contains a "read" event, wherein the read event is executed in a single-event loop until a particular datum is located, three instances of the transaction might result in this read event looping four times in the first instance, five times in the second instance, and twenty-five times in the third instance. It would be desirable to show only a single path for such a loop on the path map indicating the average execution time expended by the loop to read the datum in all three instances rather than, in this example, three unique paths, one for each loop length.

Figure 11:
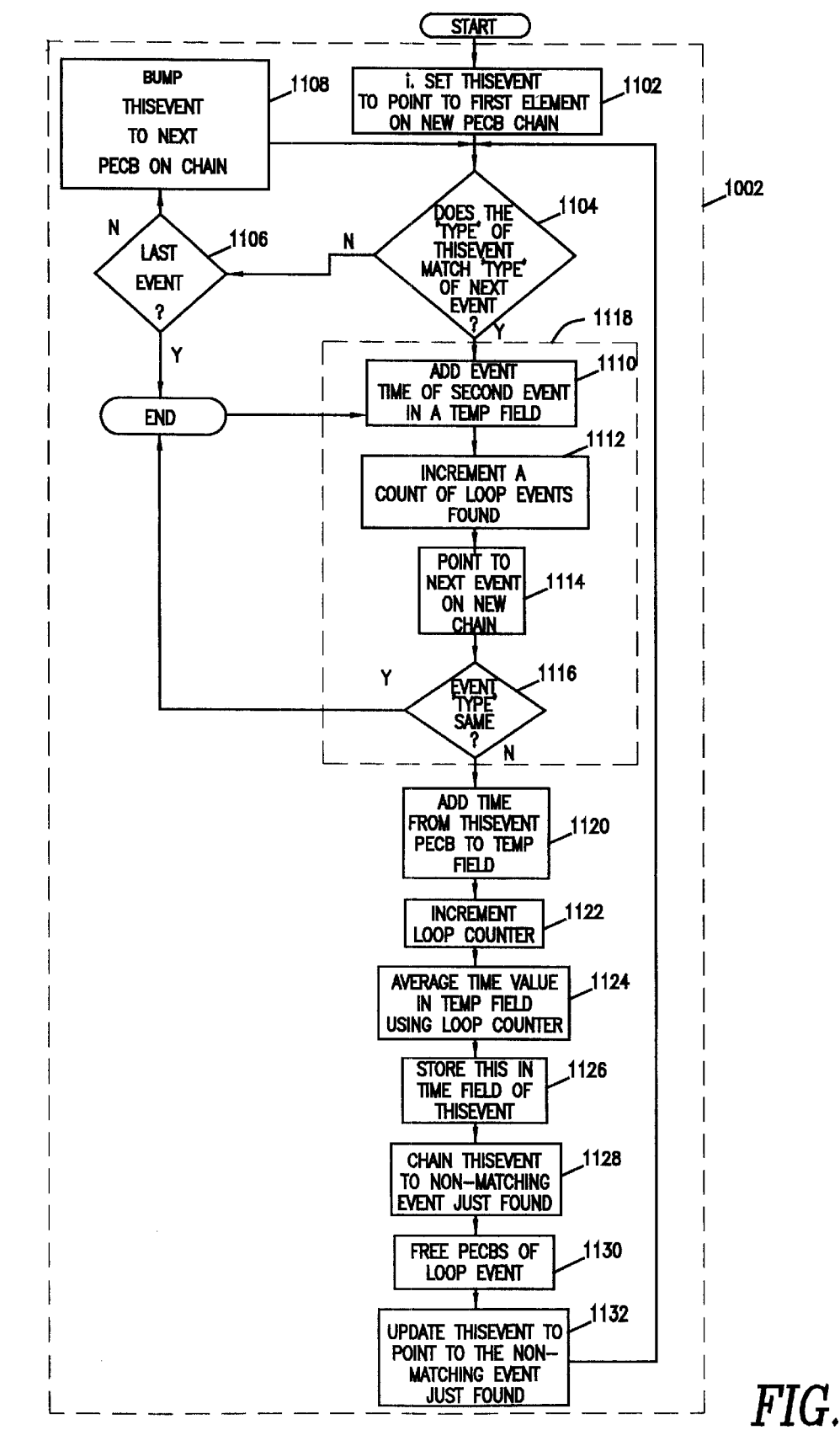

Single event loops (that is, loops consisting of a series of consecutive identical events) are preferably processed as described in FIG. 11. A PECB pointer, named THISEVENT for purposes of this description, is initially set to point to the first PECB on the new PECB chain to undergo loop processing. The event "type" (such as read, write, etc.) of the PECB pointed to by THISEVENT is then compared to the type of the next forward event on the PECB chain. If the types do not match, then a loop has not been found. In that case, control is passed to decision 1106 which determines whether this is the last PECB in the chain, in which case the single event loop processing would be complete. If THISEVENT is not the last PECB on the chain, the THISEVENT pointer is advanced to point to the next PECB on the chain in step 1108, and the type of the new PECB pointed to by THISEVENT is again matched to the type of the next event on the chain in step 1104. This loop, comprising decisions 1104, 1106 and step 1108, continues until decision 1104 determines that the types of two consecutive PECBs are the same, thereby indicating a loop event.

When a loop event has been found, a loop event counting loop 1118, comprising steps 1110, 1112, 1114 and decision 1116, is executed. Loop event counting loop 1118 begins by storing the event duration (that is, the execution time consumed by the event calculated in step 912 of FIG. 9) of the latter event in a temporary field. This event duration is obtained from the PECB for the latter event. Next, a counter of loop events is incremented in step 1112. This counter is preferably created and/or cleared after decision 1104 determined that a loop event had occurred. A new PECB pointer, named LOOPEVENT for purposes of this description, is then set to point to the next PECB on the PECB chain in step 1114. If the type of the PECB pointed to by LOOPEVENT is determined in decision 1116 to be the same as the type for the PECB pointed to by THISEVENT, then loop event counting loop 1118 recurs, starting again with step 1110. Loop event counting loop 1118 continues in this manner until the type of the PECB pointed to by LOOPEVENT is different than that of the PECB pointed to by THISEVENT, indicating that the loop found in the PECB chain has ended.

Once the end of the loop in the PECB chain has been found, the event duration in the PECB pointed to by THISEVENT is added to the temporary field and the loop counter is incremented as shown in steps 1120 and 1122, respectively. These steps account for the first event in the loop. The average event duration for each event in the loop is then calculated in step 1124 by dividing the time in the temporary field by the number of events indicated by the loop counter, and this average time, together with the number of events in the loop indicated by the loop counter, are stored in corresponding fields in the PECB pointed to by THISEVENT in step 1126.

The redundant loop events are next removed from the PECB chain by chaining the PECB pointed to by THISEVENT to the non-identical event found in decision 1116 (which is pointed to by LOOPEVENT) in step 1128. This is accomplished by setting the forward pointer in the THISEVENT PECB to point to the LOOPEVENT PECB, and by setting the backward pointer in the LOOPEVENT PECB to point to the THISEVENT PECB. At this point, the PECB pointed to by THISEVENT contains all the necessary information regarding the loop, including the event type, the number of times the event was executed, and the average event duration consumed by each event. Accordingly, the remaining PECBs for the loop events (that is, the PECBs formerly located on the chain between the THISEVENT PECB and the LOOPEVENT PECB) may be eliminated, and the memory space occupied by these PECBs may be freed in a step 1130. Finally, THISEVENT is set to point to the non-identical event found in decision 1116 (also pointed to by LOOPEVENT) in step 1132 and control is returned to step 1104 for further loop processing along the chain. Loop processing continues in this manner until the last event in the chain is found in decision 1106, at which time single event loop processing for this PECB chain is complete.

After single event loop processing has been completed, multiple event loop processing is performed on the chain. Multiple event loop processing proceeds in a manner similar to single event loop processing as described above, but instead of searching for repetitive, sequential occurrences of a single event, a search is conducted for repetitive, sequential occurrences of groups of events. Multiple event loop processing preferably begins by searching for repetitive, sequential occurrences of two-event groups, and proceeds to three-event groups, and so on. The largest size group searched for may be determined as desired, generally based on countervailing considerations of output simplification and the speed of loop event processing. However, the largest event group searched for should obviously be no larger than one-half of the number of PECBs on the chain.

Figure 12:
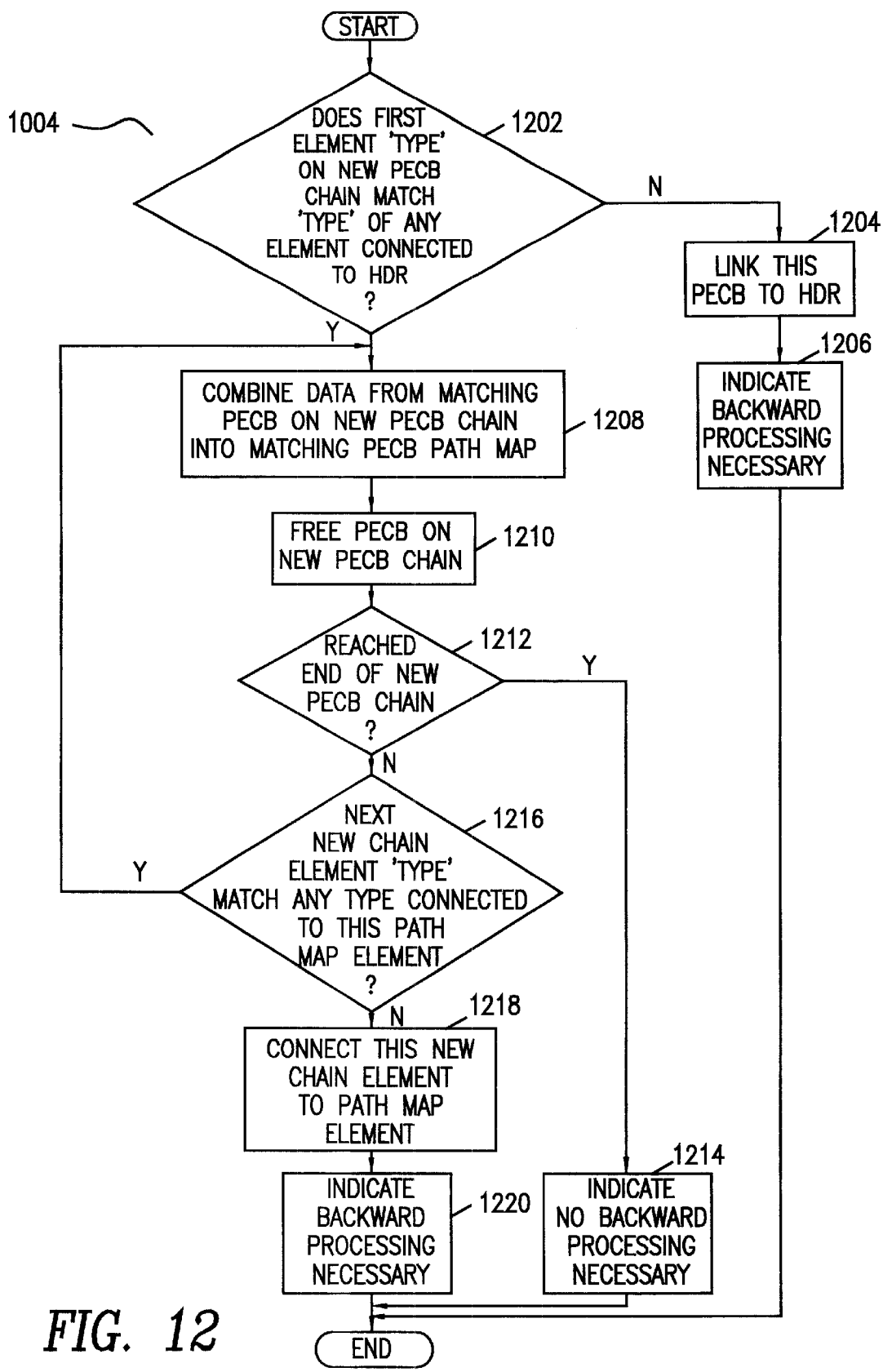

Referring again to FIG. 10, after loop processing task 1002 is complete, additional path reduction is performed on the chain by a forward-processing task 1004 which is described in greater detail with respect to FIG. 12. Forward-processing task 1004 attempts to match sequential events at the beginning of the new PECB chain with the beginning of the paths already on the path map, starting with the first event in the new PECB chain and the first event(s) on the path map, and moving forward through the new PECB chain and path map if such matching events are found. The event data from matching events is incorporated into the PECBs already on the path map, and only PECBs which do not match a path already on the path map are actually added to the path map itself.

As shown in FIG. 12, forward-processing task 1004 begins with a determination 1202 as to whether the event type of the first PECB on the new chain matches the event type of any PECB connected to the header PECB on the path map. In other words, the first element of the new chain is compared to the first elements of the paths already identified on the path map to determine whether the beginning of the path represented by the new chain coincides with a path which is already on the path map.

If no match is found in determination 1202, then the first PECB of the new chain is chained to the header PECB on the path map in step 1204, thus indicating that the new chain represents the beginning of a new path. A new path number is preferably set in each PECB in the new chain to indicate that the new chain represents a new, unique path, and this path number is preferably set as the next available integer path number. Although a path may begin with different events than any path on the path map, the new path may at some point execute a sequence of events which ends a transaction like a path already on the map. That is, the new path may "merge" with a path already on the map. For this reason, so called "backward processing" should be performed on the new path as described below, and an indication that backward processing is necessary is made in step 1206, after which forward processing would be complete for this new chain.

If the type of the first element on the new PECB chain does match the type of one of the elements connected to the header PECB on the path map, then a common path beginning has been found. The data from the matching PECB on the new chain is incorporated into the data in the matching PECB on the path map in step 1208. Specifically, at least the average event duration and event count contained in the matching PECB on the path map would preferably be updated to reflect the data in the matching PECB on the new PECB chain. The matching PECB on the new PECB chain can then be freed in step 1210 since its data is already incorporated in the path map. Alternatively, an indicator in the matching PECB on the chain could be set in step 1210 for indication that the PECB should be freed at a later time, and in this manner all PECBs so indicated could later be freed essentially simultaneously after path reduction task 808 is complete.

If the matching PECB on the new chain is determined to be the last PECB on the new chain in decision 1212, then the entire new PECB chain has been matched to a path already on the path map. In such a case, forward processing would be complete and no backward processing would be necessary, and this is indicated in step 1214.

If a matching event has been found and the end of the new PECB chain has not yet been reached, the event type of the next PECB on the new chain is compared in determination 1216 to the event type(s) of the next element(s) on the path map which follows the matching path map PECB found in determination 1202. If another match is found, control returns to steps 1208 and 1210 to combine the data from this most recently matched PECB on the new chain to the most recently matched PECB on the path map and to free the PECB on the new chain. This path-matching loop, comprising steps 1208 and 1210 and determinations 1212 and 1216, continues until either the end of the new PECB chain is reached in determination 1212 as discussed above or a non-matching event is encountered while travelling the path map in determination 1216. If the latter event occurs, a new path segment has been found in the new chain beginning with the non-matching PECB. Accordingly, the non-matching PECB on the new chain is connected to the most recently matching PECB on the path map in step 1218. A new forward pointer is added to the matching path map PECB pointing to the non-matching PECB on the new chain, and the backward pointer in the non-matching PECB on the new chain is changed to point to the matching path map PECB. Finally, the next available path number is set in each PECB representing the new path segment. Since an end portion of this new path segment may merge with a path already on the path map before ending, the new path segment is marked to indicate that backward processing is necessary in step 1220, and forward-processing task 1004 is complete.

Figure 13:
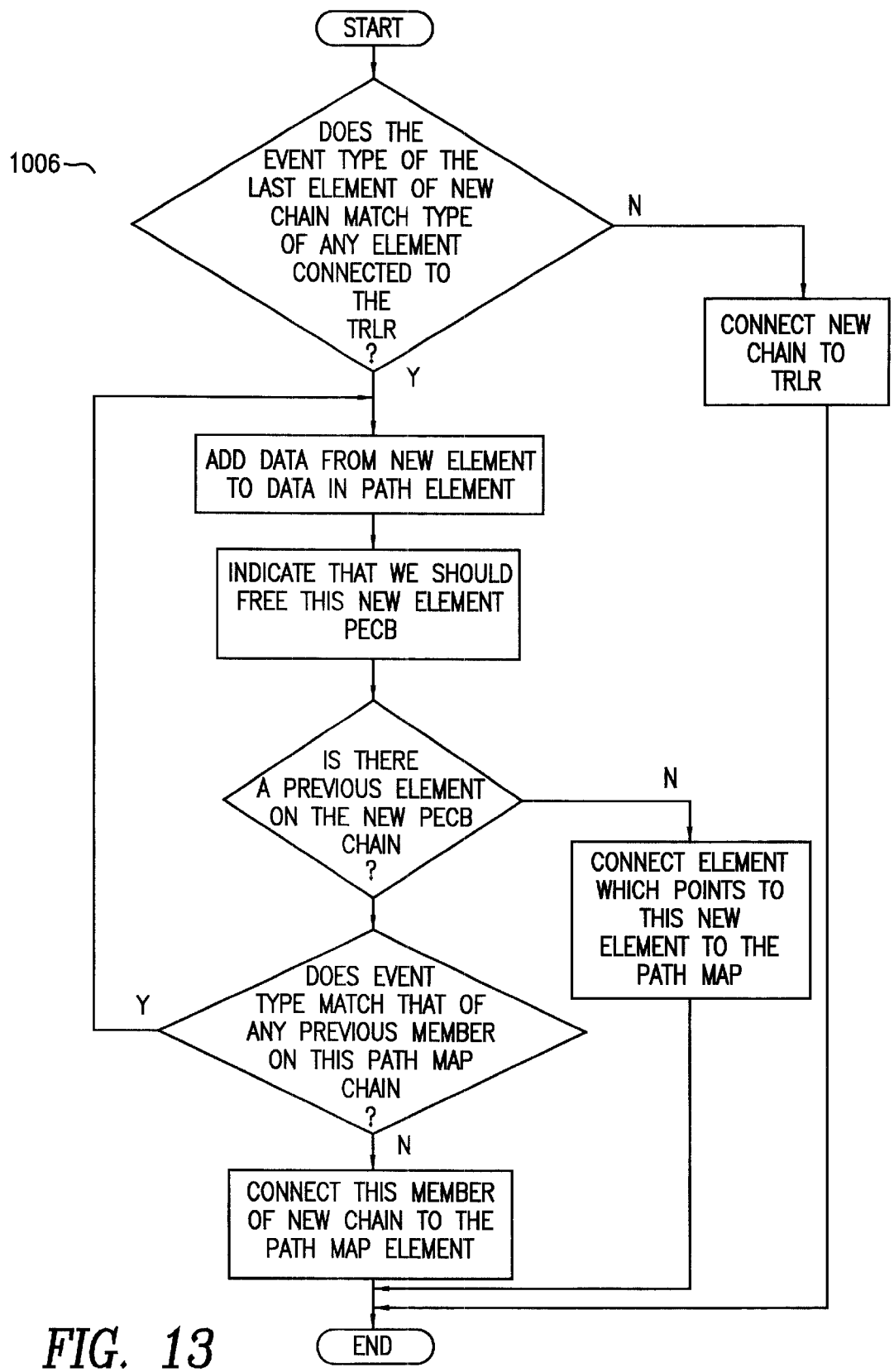

Backward-processing task 1006 operates similarly to forward-processing task 1004 as shown in FIG. 13, with the exception that processing begins at the end of the new chain and path map and proceeds backwards toward the beginning. Backward-processing task 1006 is executed only if forward-processing task 1004 discovered a path or path segment in the PECB chain which was not already on the path map.

The completion of loop processing task 1002, forward-processing task 1004 and backward-processing task 1006 (if required) completes path reduction task 808 and, therefore, the processing for one new PECB chain. After all of the PECB chains have been built and incorporated into the path map in accordance with step 604 of the data reduction phase, the result is a path map data structure which logically relates each event which occurred in any instance of the subject transaction to each other event which occurred in any instance of the transaction.

A path map built in the manner described above incorporates characteristics and restrictions worthy of note. First, since each path, represented by a single PECB chain built in step 802, is reduced based on the results of PECB chains which were previously processed, a different path map, and consequently a different output diagram, may result if the transaction data were processed in a different order. Specifically, the configuration of the ultimate path map is a function of the order in which the recorded instances of the transaction are processed. Nevertheless, the main path would be substantially the same since determination of the main path is based on the content, in addition to the sequence, of the event data as discussed below.

In addition, it is preferable to ensure that PECBs do not contain both multiple forward pointers and multiple backward pointers. If a PECB did contain both multiple forward and multiple backward pointers, this would indicate a "crossing point" or overlap between two paths. As a result, it would not be possible to determine the true path taken by a transaction by following the path map from the beginning to the end. Accordingly, it is preferable to ensure that a PECB which has more than one forward pointer has only one backward pointer, and likewise, that a PECB which has more than one backward pointer has only one forward pointer. It will be noted that a PECB on the path map containing more than one backward pointer indicates a "merge point" of two or more transaction paths, while a PECB with more than one forward pointer indicates a "split point" where a single path splits into two or more transaction paths. To facilitate following the path map accurately, it is therefore also preferable to ensure that there are no paths in which a split point occurs after a merge point.

Figure 14:
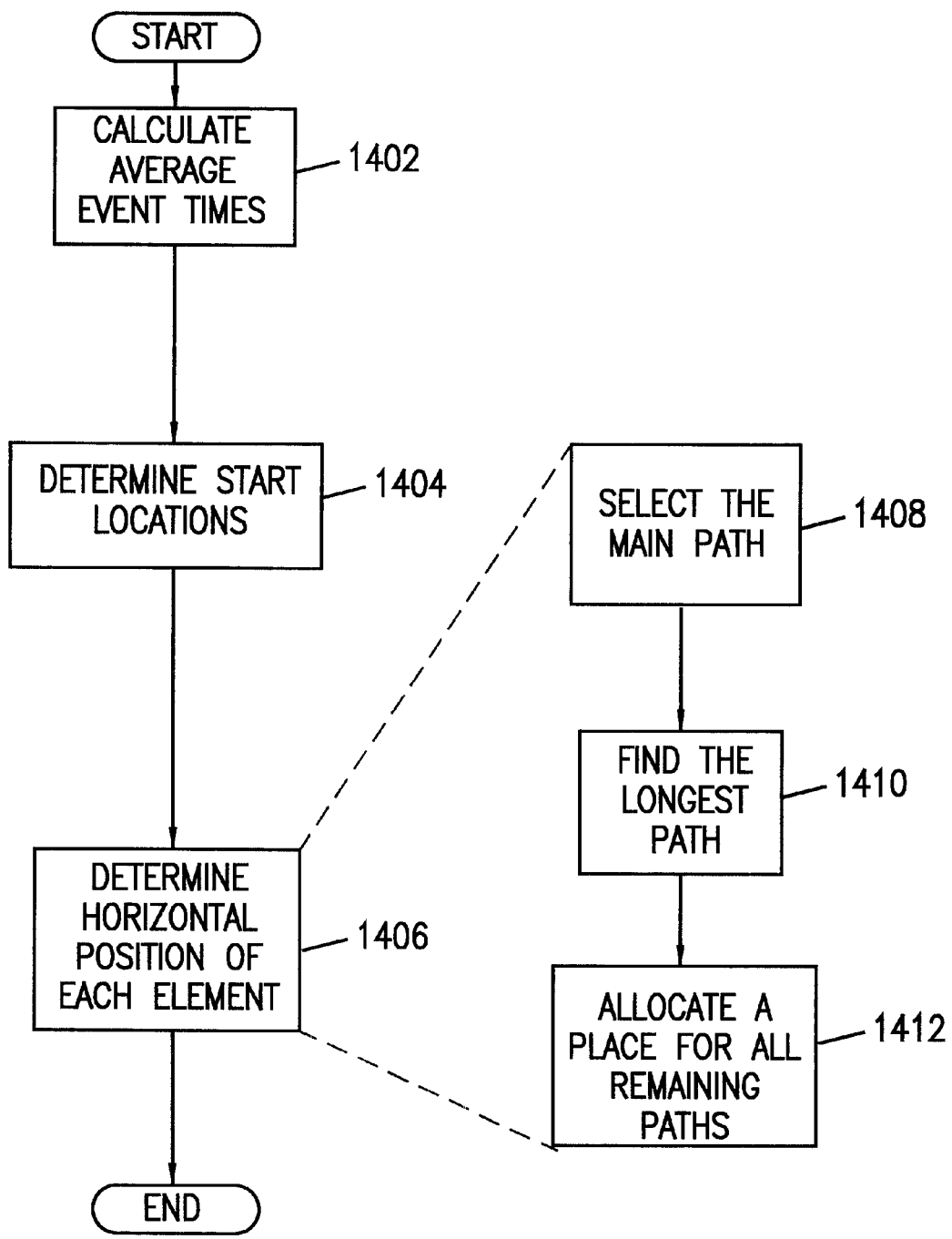

The next phase of analysis component 106 of the invention is the presentation phase 504 as shown in FIG. 5. Referring now to FIG. 14, presentation phase 504 begins with a step 1402 wherein the average event duration for each event represented by a PECB on the path map is calculated and stored in each PECB. In particular, after data reduction phase 502 is complete, each PECB in the path map contains the accumulated event times for all of the instances in which the event was executed in its sequence on the path map, as well as the total quantity of event occurrences. In each PECB, the total accumulated event time is divided by the total quantity of event occurrences to obtain the average event duration for that event, which is stored in that PECB. This average event duration will be used in the output component 108. In addition, the shortest and longest average times of all of the PECBs on the path map are maintained for use in determining the proper scale factors for the final display in the output component 108 as will be described below.

The start locations for each event in the ultimate output diagram are next determined in step 1404. One dimension of the output diagram will be the duration of the recorded transactions and the events comprising them. Since each path in the path diagram contains a series of sequential events, the placement of each event in the output diagram depends on the placement of those before it in the path.

The start location for each event is determined in the following manner. Each transaction consumes a certain amount of time prior to the occurrence of the first recorded event. This time is known as the default start time and is stored in the header PECB in the path map. Likewise, each transaction consumes a certain amount of time after the occurrence of the last recorded event, which is stored in the trailer PECB. For each path leading from the header PECB, the first PECB in the path is selected. The start location for this first path element is set to the default start time as described above. A forward pointer of this PECB is then used to select a next PECB in the path. The start location for this PECB is calculated as the start location from the previous PECB plus the average event duration of this PECB, and this sum is stored as the start location for this PECB. Processing continues in this manner working forward along the path to the last, terminal PECB.

It should be noted that due to the possibility of splitting and merging paths, it will be necessary to indicate which path segments have been processed for start location and which still require processing after reaching the terminal PECB. This indication is preferably accomplished by monitoring whether the previous PECB contains more than one forward pointer, thus indicating that the present PECB is the first PECB in one of a plurality of branching paths emanating from the previous PECB. When such a condition is found, the start location values stored in each PECB from the previous PECB backward to the first PECB in the path may be cleared. This will indicate that the path needs to be processed again, and the start location values retained in the present PECB will indicate that another branch should be processed when this PECB is again selected. The indication that other branching path segments require processing may be indicated by other means, such as by the use of flags or recursive processes, for example. Conversely, if while processing along a path a block is found which already has a start location time stored in it, then this PECB is a merge point for several paths. The start location time for this PECB should be calculated in the normal manner described above, and preferably the higher of this calculated value and the value already stored in this PECB should be retained in PECB. Storing the higher value ensures that the PECBs contain the latest start location time for all possible paths. This is preferable because it allows all connecting lines drawn in the output diagram to point forward along the time dimension (typically downward on the output medium) which presents a more readable and understandable output diagram. This also ensures that the start location time contained in the terminal PECB will be the value of the longest path on the path map, which can be used to scale the output diagram in the time dimension in the output component 108.

After the average event durations and the start time locations of the events in the path map are determined in steps 1402 and 1404, the information necessary to determine the relative vertical positioning of each element on the output diagram has been determined. The final task for the presentation phase 504 is to determine the horizontal position of each element as shown in step 1406 of FIG. 14. Determining the horizontal positioning of each element requires determining a main path through the path map in a step 1408, determining a longest path through the path map in a step 1410, and allocating a location for all remaining paths through the path map in a step 1412. Steps 1408 and 1410 may be performed in any order.

Figure 15:
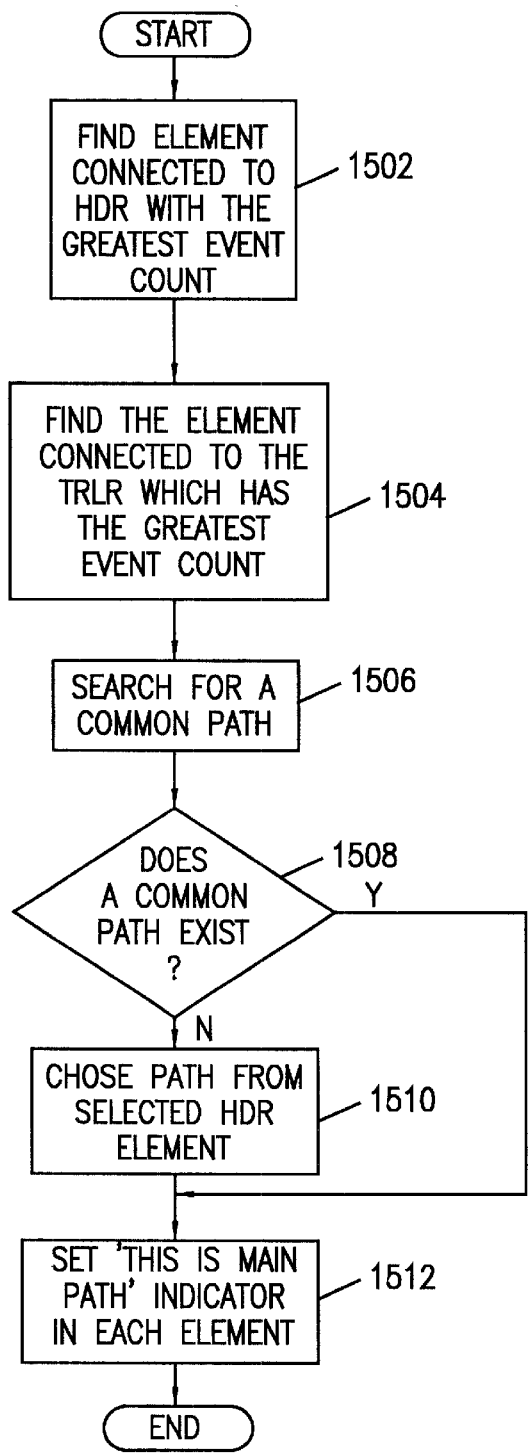

FIG. 15 illustrates a preferred method for selecting the main path. The main path through the path map is determined to be a path which connects those events which were executed with the highest frequency as reflected in the event count information in each PECB. Beginning with step 1502, the PECB in the path map connected to the header PECB which contains the highest event count is selected. Likewise, in step 1504 the PECB connected to the trailer PECB which contains the highest event count is also selected. Using the forward and backward pointers in step 1506, a search is conducted to determine whether a common path exists between the PECBs selected in steps 1502 and 1504. If a common path does exist as determined in determination 1508, then the PECBs along this common path, together with the PECBs selected in steps 1502 and 1504, comprise the main path.

If a common path is not found in steps 1506 and determination 1508, then the main path may be selected by, for example, working forward using the PECB forward pointers from the PECB selected in step 1502 toward the trailer PECB, and selecting, after each PECB with multiple forward pointers, a PECB for the main path which has the highest event count. Alternatively, where multiple forward pointers are found, the longest path may be chosen as the main path to enhance the readability of the output diagram by ensuring that connections among events can be easily routed without crossing each other. After the main path has been determined, an indicator or flag in each PECB along the main path is set in step 1512.

There are a variety of methods for defining and determining a main path through the path map. It is to be understood that any method for determining a main path is encompassed by this invention, so long as the main path reflects some information about the relative frequency of the occurrence of the events on that path with respect to other paths on the path map.

The longest path through the path map is preferably determined in step 1410 in the following manner. Starting at the trailer PECB, backward pointers are used to find the preceding PECB on the path map wherein the sum of the start location time and the event duration equals the start location time for the current PECB. This process is continued until the header PECB is reached. Another indicator or flag is set in each PECB on the longest path.

The main path and longest path are useful for plotting the final output diagram. In particular, the main path will preferably be shown as a vertical column of event symbols positioned in the center of the output diagram and the remaining path segments will be placed to the left and right of the main path. The longest path, if it is not also the main path, will preferably be placed on the output diagram at the farthest horizontal distance from the main path. This allows connecting lines from the remaining path segments to be drawn to the main path without having to be drawn through the longest path itself, thereby enhancing the readability of the output diagram.

An illustrative example of the operation of the above-described system and methods for creating a path map and determining the main path and longest path will now be described with reference to FIGS. 18A–18FF. FIG. 18A is a table of event data for ten recorded instances, named A1–A10, of a transaction A. The events comprising each transaction are shown in sequential order to the right of each transaction instance name. For simplicity of the example, only "Read" and "Write" event types are used. The event type for each event is represented as an "R" or "W" followed by a letter; "R" denotes a "Read" operation, while "W" denotes a "Write" operation. The letter following "R" or "W" indicates a particular file which is read or written. Thus, "RA" indicates a read operation from file A, while "WC" indicates a write operation to file C. Beneath each event type is a number representing the event duration for the event.

The transaction data shown in FIG. 18A would be gathered as described above using the process shown in FIGS. 3–4. It should be noted that, although the transaction data shown in FIGS. 18A–21G and described herein is based on event duration and frequency of execution, gathered data can include any relevant statistical data which can be measured, for example, I/O data quantity, data transmission rates, memory/storage usage during program execution, etc. As such, the present invention should not be interpreted as directed only toward event duration, i.e., time, and frequency of occurrence.

The event sequences shown in FIG. 18A have been chosen to generate a relatively complex path map, including multiple starting and ending events and crossing path segments. Loop events are omitted in this example for simplicity. It should be noted that actual data records would typically contain the time at which the associated event was executed, and the event durations would be calculated while building a PECB chain in step 912. The event durations have already been calculated in FIG. 18A merely to simplify the example.

Figure 18:
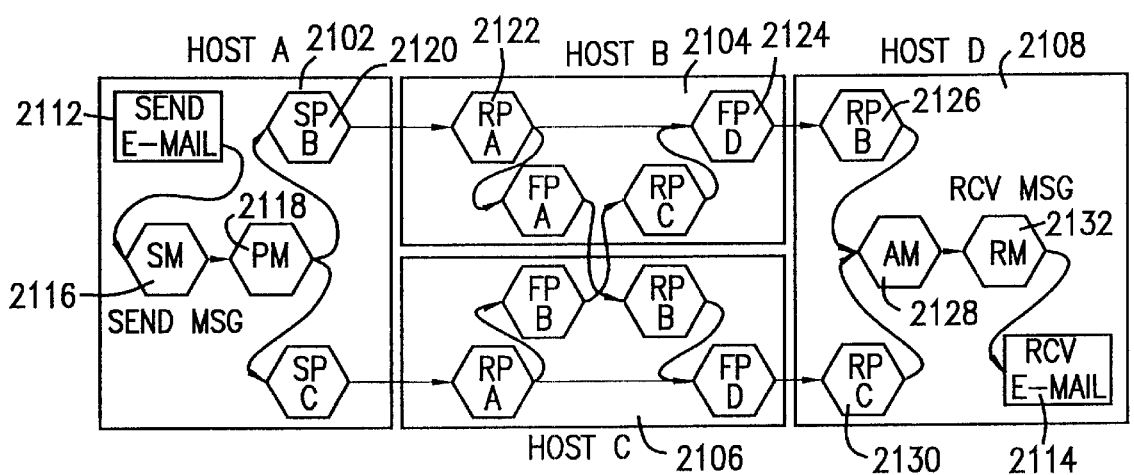
FIG. 18 is a path map showing message transactions.
Figure 18B:
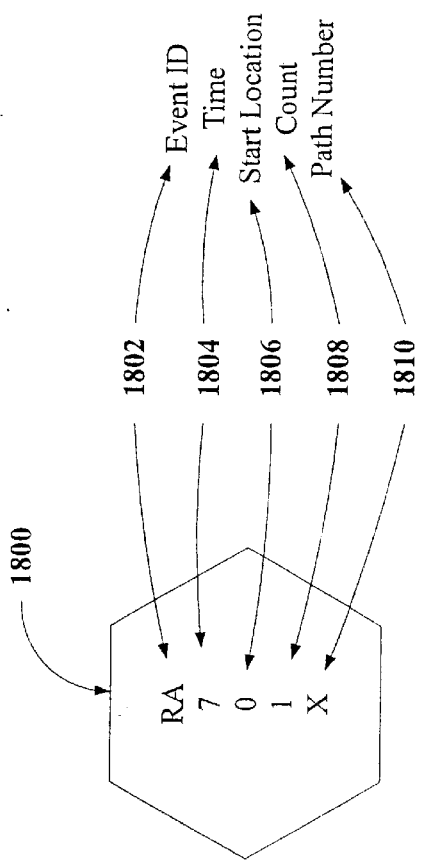
FIGS. 18B–18N, 18P–18V and 18X–18FF are path maps generated by a computer program profiler constructed in accordance with the present invention and operating on the sample event data of FIG. 18A.

FIGS. 18B–FF are pictorial representations of PECBs and PECB chains. In all such representations, PECBs are represented by hexagons and the information contained in a represented PECB is shown inside the hexagon. In addition, pointers from one PECB to another are shown as arrows drawn between the linked PECBs. The pointer represented by each arrow is stored in the PECB represented by the hexagon at the base of the arrow, and the pointer itself contains information necessary to locate the PECB represented by the hexagon at the tip of the arrow. Although every PECB on the path map has at least one forward and one backward pointer (except for the header and trailer PECBs), only forward pointers are shown in FIGS. 18C–18FF for ease of readability. Nevertheless, it is to be understood that a corresponding backward pointer exists in the path map for every forward pointer.

As shown in FIG. 18B, each PECB 1800 contains a number of fields for storing data related to the event represented by the PECB. These data fields preferably include an event ID field 1802, a time field 1804, a start location field 1806, an event count field 1808, and a path number field 1810. Not all of these fields are necessary to build a path map, but they are preferably included to facilitate creating the ultimate output diagram as discussed below. Data contained in the fields of each PECB in FIGS. 18C–18FF are shown in the order noted in FIG. 18B.

Figure 18C:
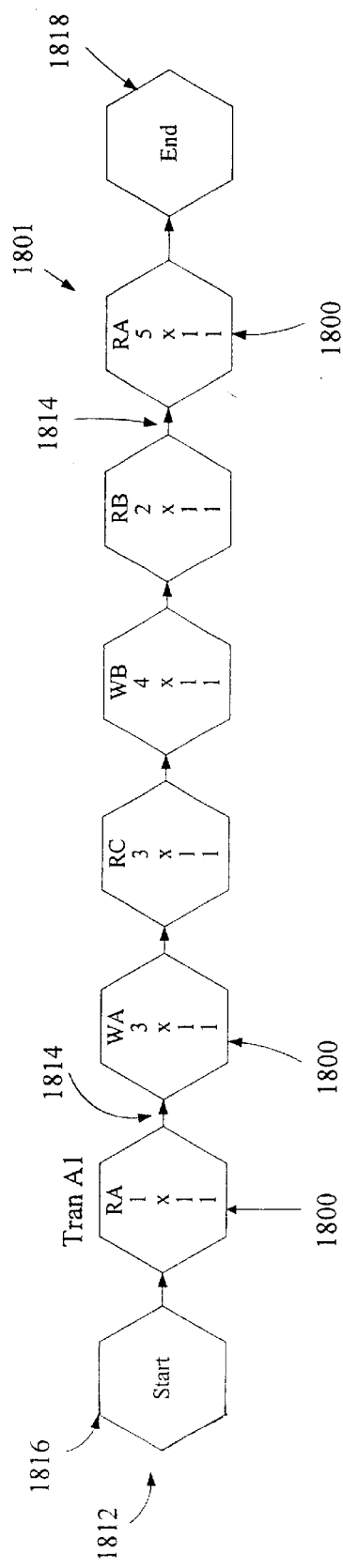

After the transaction data have been gathered and stored, the first step in developing a path map 1801 is to build a PECB chain for the first transaction instance A1. This process corresponds to PECB chain-building task 802 shown in FIG. 8 and is depicted in greater detail in FIG. 9. The first PECB chain 1812 built for the first transaction instance A1 is shown in FIG. 18C. First PECB chain 1812 comprises a PECB 1800 for each event recorded in transaction instance A1. Each PECB 1800 in the chain 1812 contains a forward pointer 1814 linking it to the next PECB 1800 on the chain. In addition, because PECB chain 1812 is the first chain, the first available path number, "1", is set in each PECB in chain 1812, and header PECB 1816 and trailer PECB 1818 are built and linked to chain 1812 as shown in determination 804 and step 806 of FIG. 8.

Figure 10:
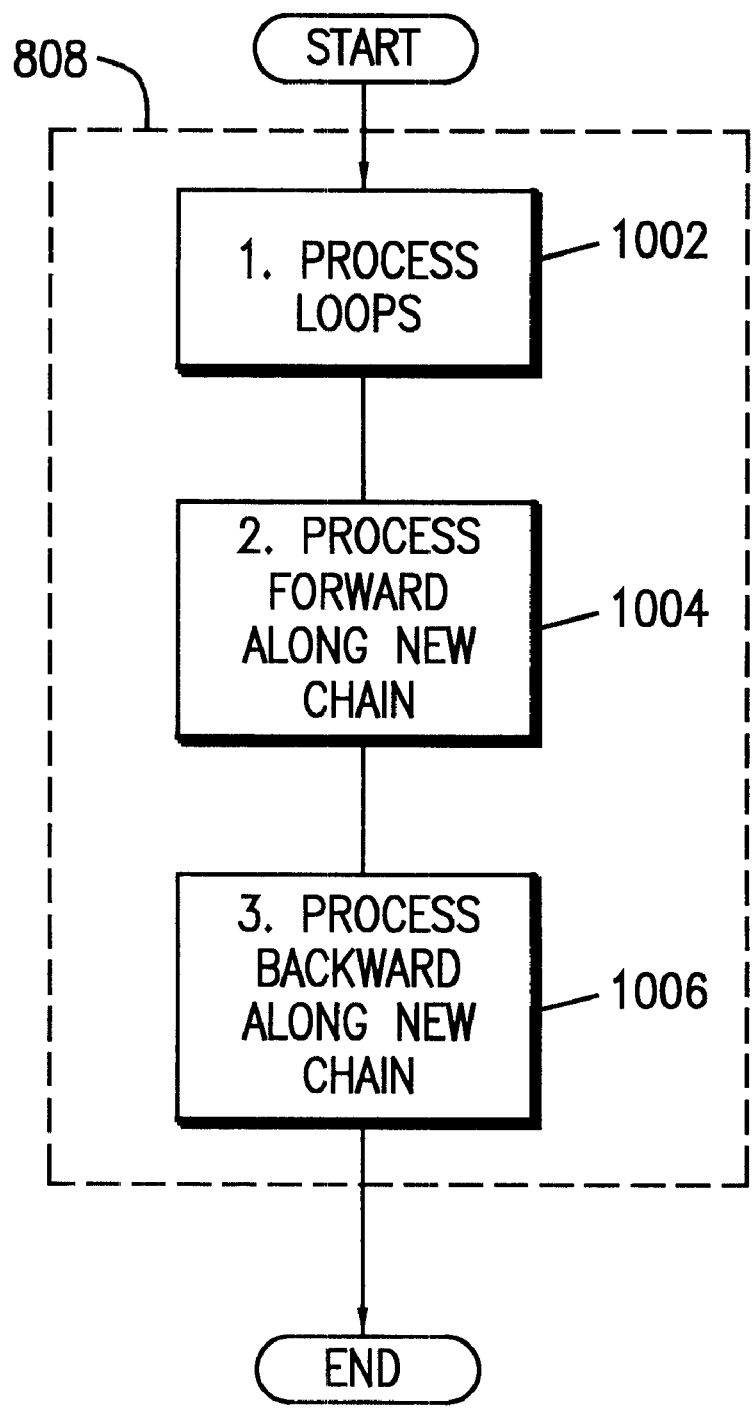
Figure 18D:
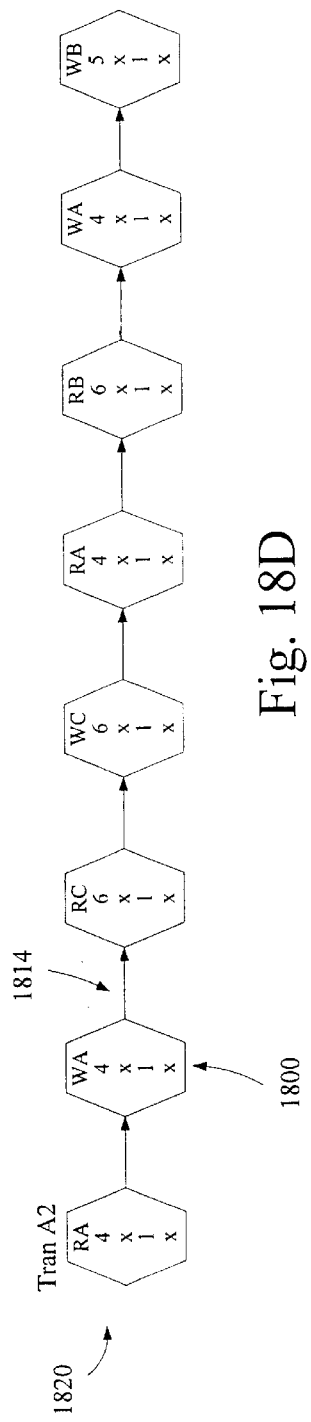
Figure 18E:
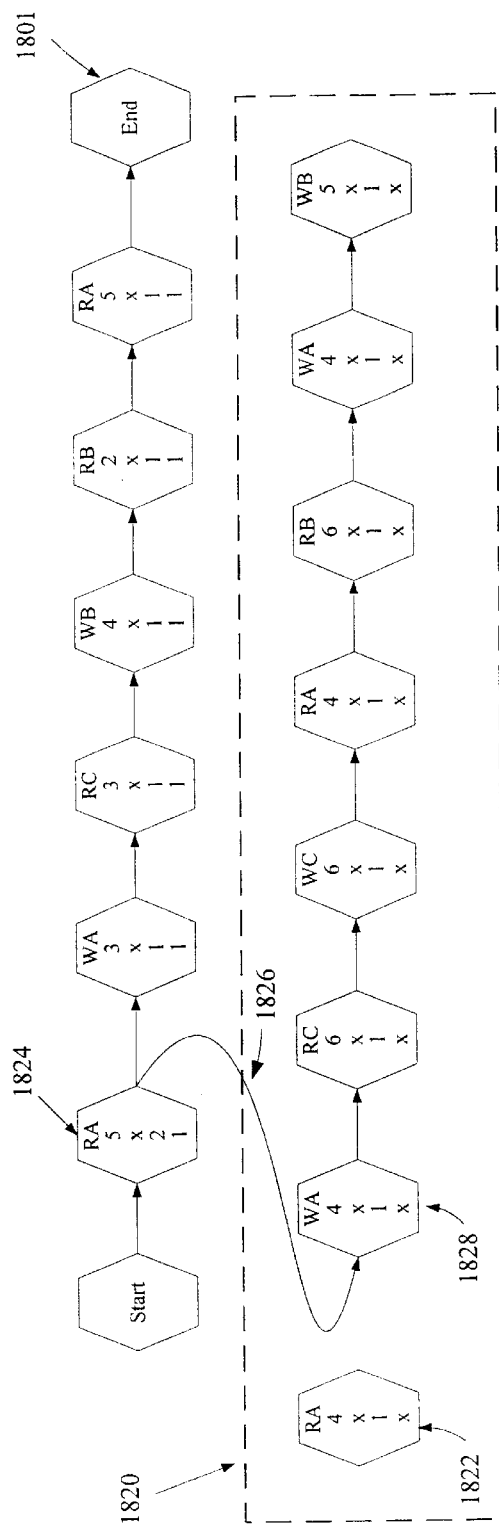

Next, PECB chain building task 802 builds a PECB chain 1820 for the second recorded transaction instance A2 as shown in FIG. 18D. FIGS. 18E and 18F illustrate the incorporation of PECB chain 1820, a path with a starting path segment common to a segment already on the path map. Since PECB chain 1820 is not the first chain on the path map, path reduction task 808 of FIG. 8 is performed on PECB chain 1820. Because there are no loop events in this example, path reduction begins with forward-processing task 1004 of FIG. 10 shown in greater detail in FIG. 12. Beginning with the first PECB 1822 in the new chain 1820, the event type is compared to the event type of the starting events (that is, each of the PECBs immediately following the header PECB) already on the path map 1801 to determine whether they match. In this case, the event type of PECB 1822, "RA", is compared to the event type of PECB 1824, "RA", and a match is found. Accordingly, the event data of PECB 1822 are combined with that of PECB 1824 and the remainder of the new PECB chain 1820 is chained to the matching PECB 1824 already on the math map. In particular, the event duration (4) and event count (1) of PECB 1822 are added to the respective fields in PECB 1824, and a second forward pointer 1826 is written into PECB 1824 which points to the next PECB 1828 on the new chain 1820. Since the event data from PECB 1822 has been combined into the path map 1801, the storage space for PECB 1822 may be freed.

As shown in FIG. 18F, forward processing task 1004 proceeds in a similar manner by combining event data from PECBs 1828 and 1832 on the new chain 1820, which sequentially match PECBs 1830 and 1834, respectively, on the path map 1801, until a non-matching event type is found in PECB 1836 on the new chain 1820. In particular, the event type "WC" of PECB 1836 on the new chain 1820 does not match the event type "WB" of the sequentially corresponding PECB 1838 on the path map 1801. Thus, a new path segment beginning with PECB 1836 has been found, and this new path segment is linked to the path map 1801 by setting a new forward pointer 1840 in the last matching PECB 1834 on the path map 1801 pointing to the first non-matching PECB 1836 on the new chain 1820. Any forward pointers previously written into PECBs on the path map 1801 as a result of processing this new PECB chain 1820 are cleared, and all of the matching PECBs on the new chain 1820 (i.e. PECBs 1822, 1828 and 1832) may be freed.

Backward-processing task 1006 would then be performed to determine whether the new PECB chain 1820 contains an ending path segment which matches an ending path segment already on the path map 1801. Since PECB chain 1820 ends with a different sequence of events than the PECB chain 1812 which was first incorporated into the path map 1801, backward-processing task 1006 merely chains the last PECB 1842 in the new PECB chain 1820 to the trailer PECB 1818 on the path map by setting a new forward pointer 1844 in PECB 1842. Finally, since a new path segment has been added to the path map 1801, the next available path number, "2", is set in each PECB in the new path segment which begins with PECB 1836 and ends with PECB 1842.

Figure 18H:
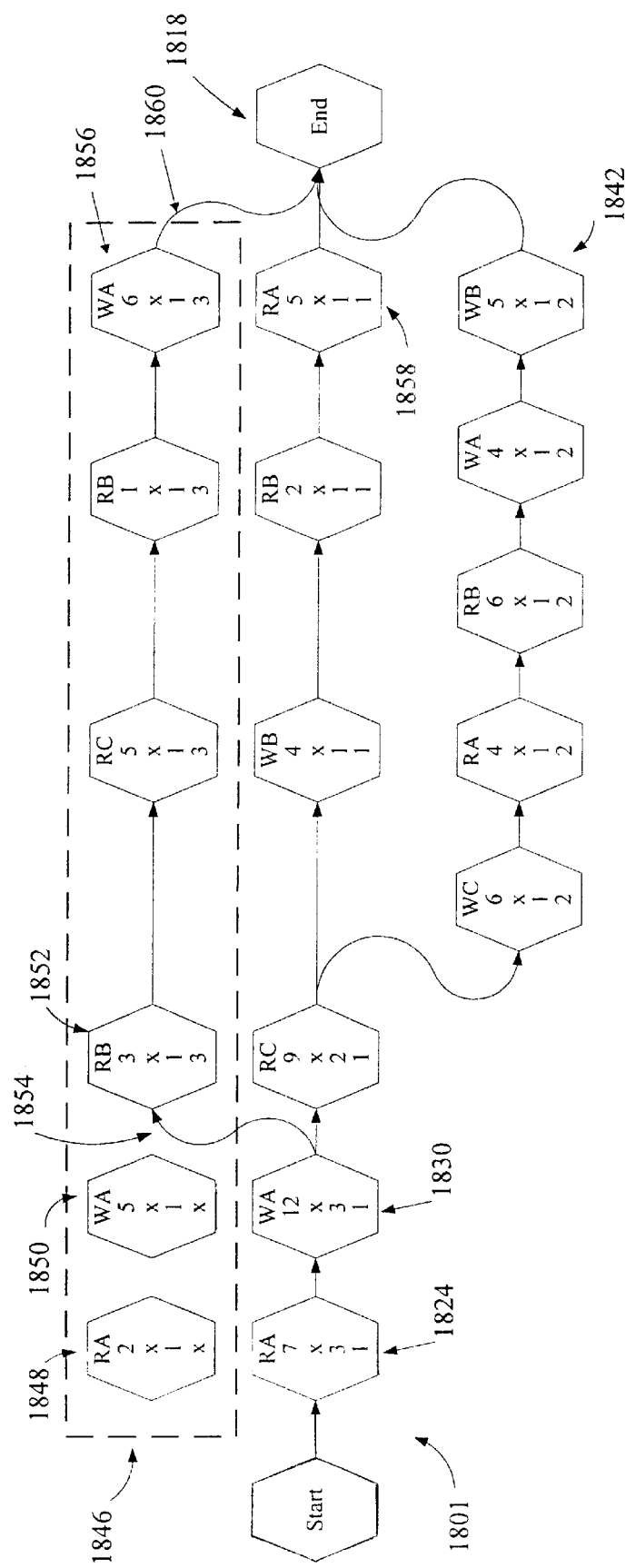

FIGS. 18G–18H illustrate the incorporation of another path with a common starting path segment to the path map. A new PECB chain 1846 is built to represent the third transaction instance A3 as shown in FIG. 18G. Forward-processing task 1004 once again combines matching PECBs in the new chain 1846 which match those already on the path map 1801. In particular, the data from PECBs 1848 and 1850 are combined with the data in matching PECBs 1824 and 1830. A new path segment beginning with non-matching PECB 1852 on the new chain 1846 is then chained to the path map 1801 by setting a new forward pointer 1854 in PECB 1830. Once again, backward-processing task 1006 determines that the last PECB 1856 on the new chain 1846 does not match any ending event (i.e. PECBs 1842 or 1858) on the path map 1801, so the last PECB 1856 on the new chain 1846 is linked to the trailer PECB 1818 by forward pointer 1860. In addition, the next available path number, "3", is written into each PECB on the new path segment beginning with PECB 1852 and ending with PECB 1856.

Figure 18I:
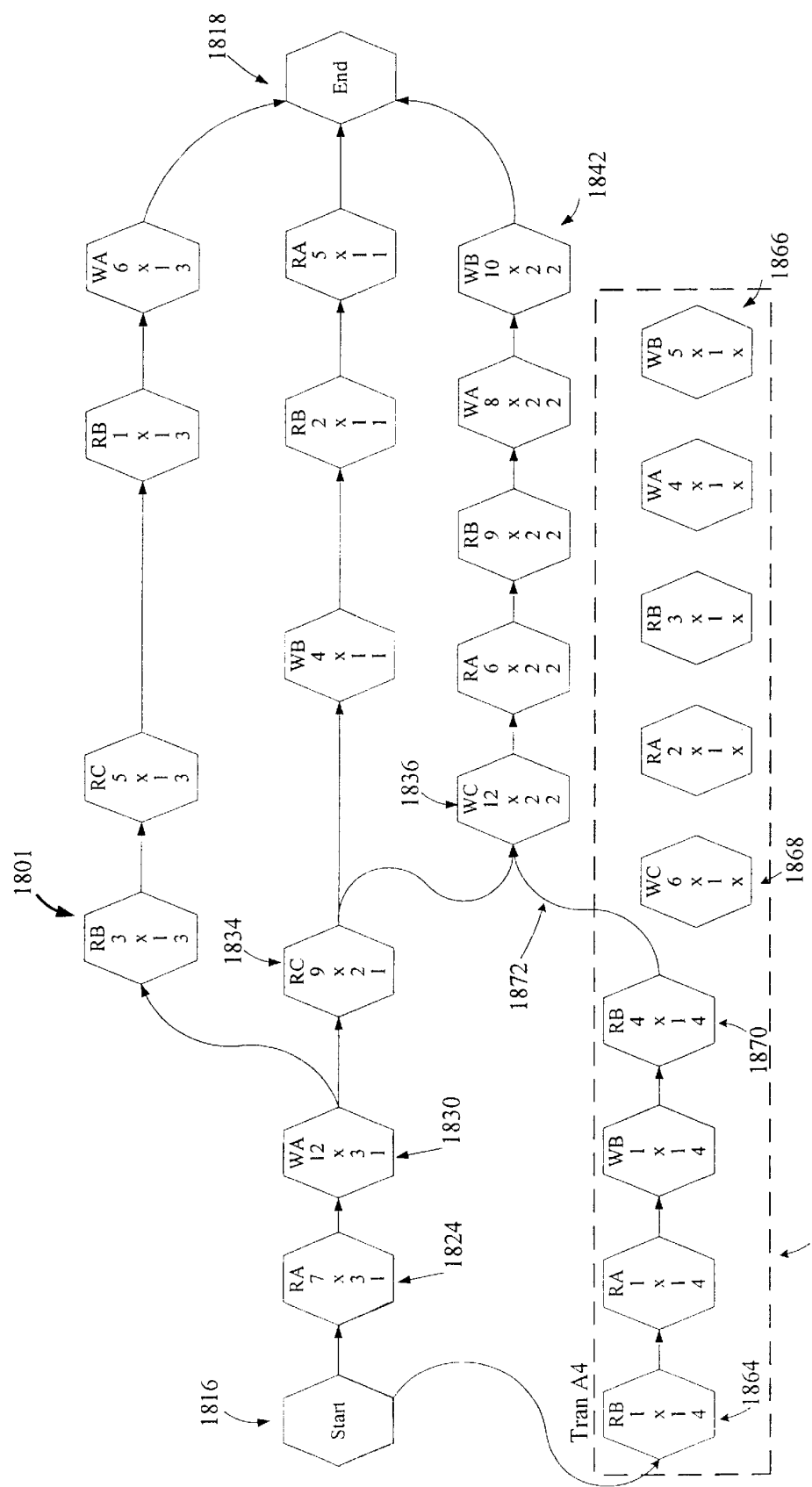

FIG. 18I illustrates the incorporation of a path with a common ending path segment to the path map. A new PECB chain 1862, shown in FIG. 18I, is built to represent transaction A4. The event type of the first PECB 1864 of the new chain 1862 does not match the event type of the first PECB 1824 already in the path map 1801, so a new starting event has been found by forward-processing task 1004. The PECB 1864 representing this new starting event is therefore chained directly to the header PECB 1816. However, backward-processing task 1006 finds that new chain 1862 contains an ending path segment in common with an ending path segment already on the path map 1801. In particular, working backward from the trailer PECB 1818 using backward pointers (not shown) in the PECBs in the path map 1801, and similarly working backward from the last PECB 1866 on the new chain 1862, backward-processing task 1006 finds that a path segment represented by PECBs 1868–1866 matches a path segment represented by PECBs 1836–1842. Accordingly, the event data from the matching PECBs on the new chain 1862 are combined with the event data in the matching PECBs on the path map 1801, the new path segment bounded by PECBs 1864 and 1870 on the new chain 1862 is chained to the path map 1801 by a pointer 1872, and the next available path number, "4", is then set in each of the PECBs on the new path segment. As always, the matching PECBs on the new chain 1862, whose event data have been combined into the path map 1801, may then be freed.

At this point, it is evident that the path map 1801 contains several split points and merge points. Split points, which are indicated by PECBs with multiple forward pointers, are found at PECBs 1830 and 1834, while a merge point, which is indicated by a PECB with multiple backward pointers (or more than one forward pointer leading to it as shown in the figures) is found at PECB 1836.

Figure 18J:
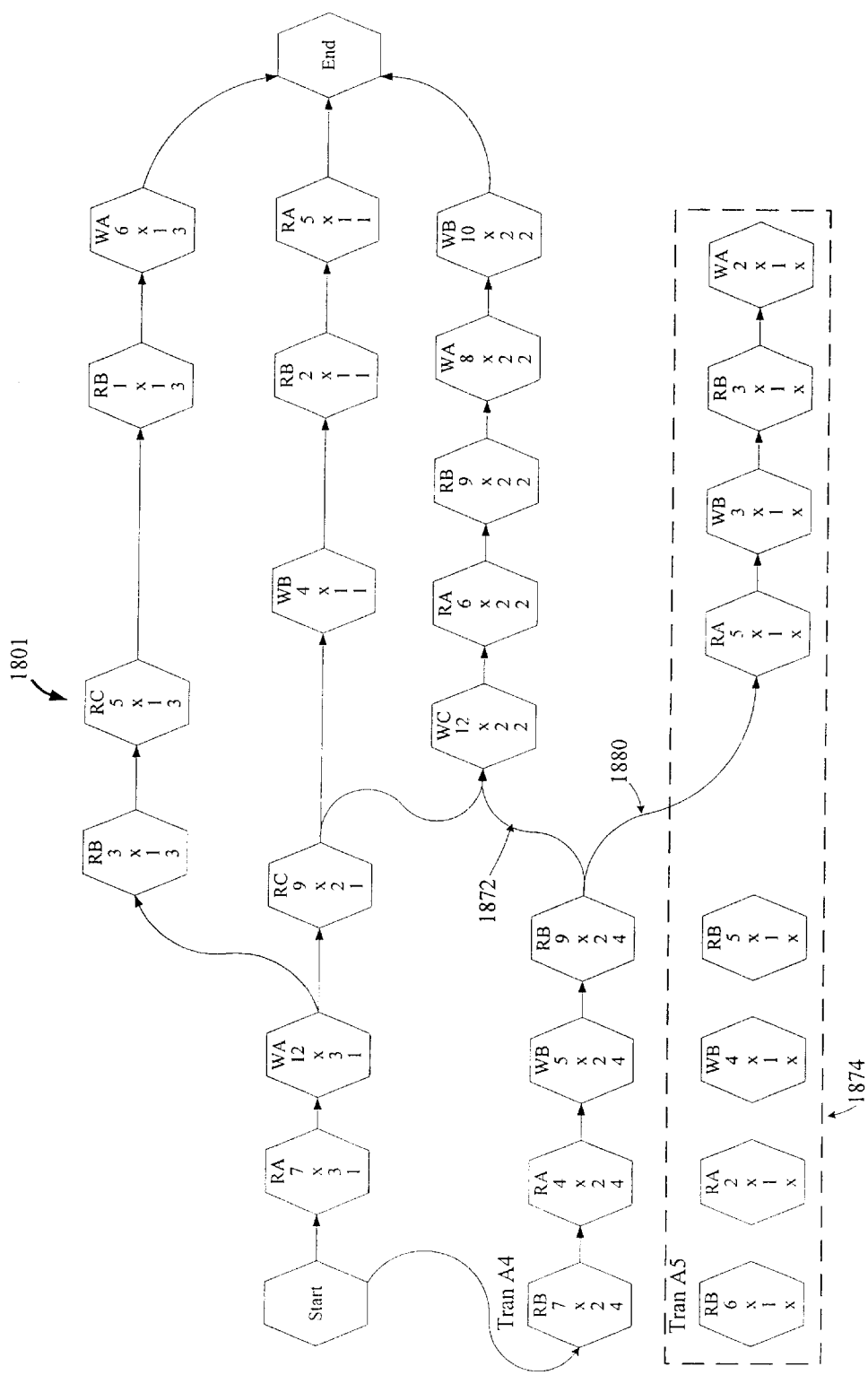
Figure 18K:
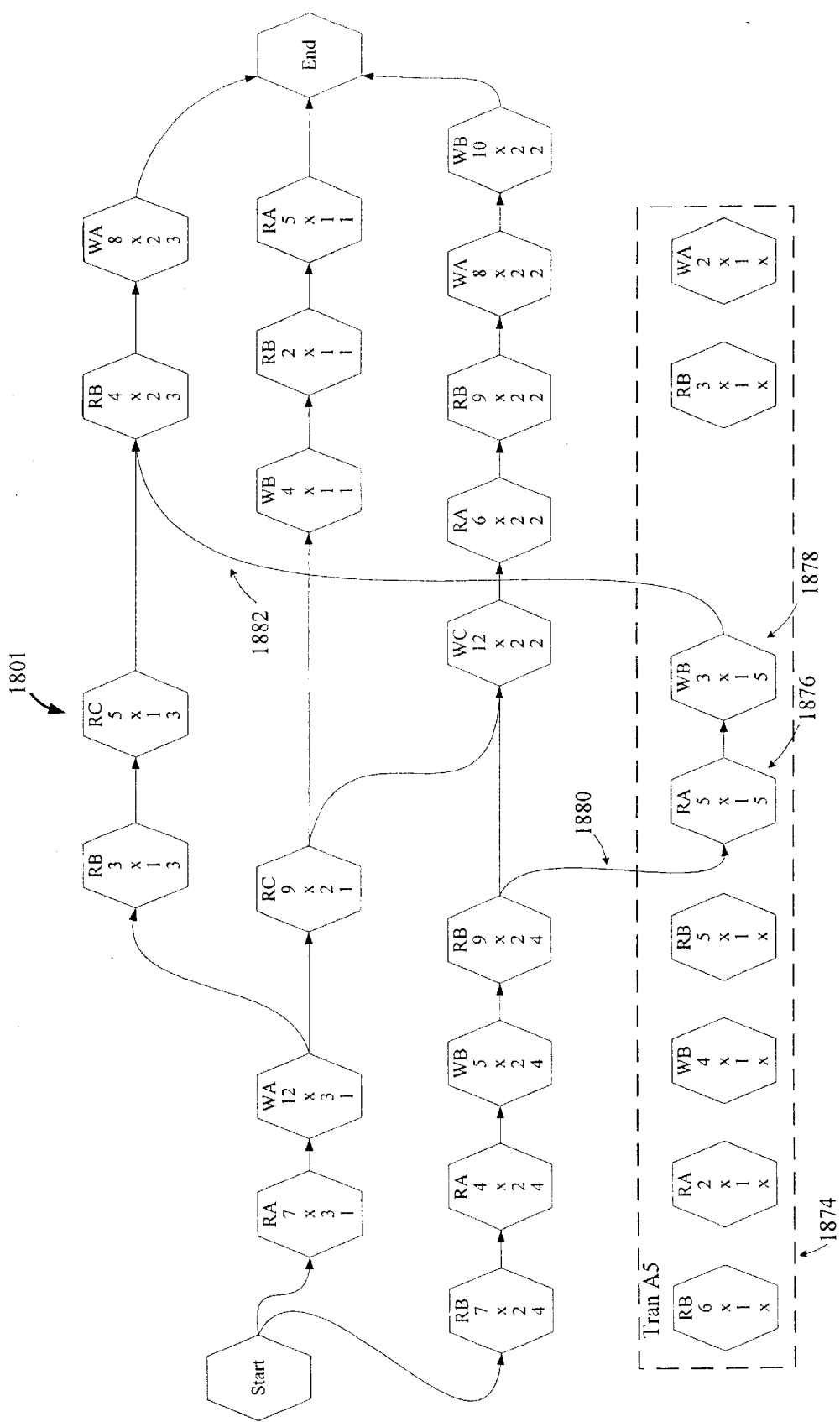

FIGS. 18J–18K illustrate the incorporation of a path with both a common beginning and a common ending path segment to the path map. As shown in FIG. 18J, the first four PECBs of a new PECB chain 1874 representing transaction A5 are combined with the first four elements of path number 4 on the path map 1801 by forward-processing task 1004. Next, as shown in FIG. 18K, the last two PECBs of new chain 1874 are combined with the matching ending path segment represented by the last two PECBs in path number 3 on the path map 1801. The only new path segment on the new chain 1874 is represented by the fifth and sixth PECBs on the chain, 1876 and 1878 respectively, which are accordingly added to the path map 1801 in a manner similar to that described above using new pointers 1880 and 1882, and the next available path number, "5", is set forth in these two new PECBs 1876 and 1878. The remaining PECBs on the new chain 1874 may then be freed.

Figure 18L:
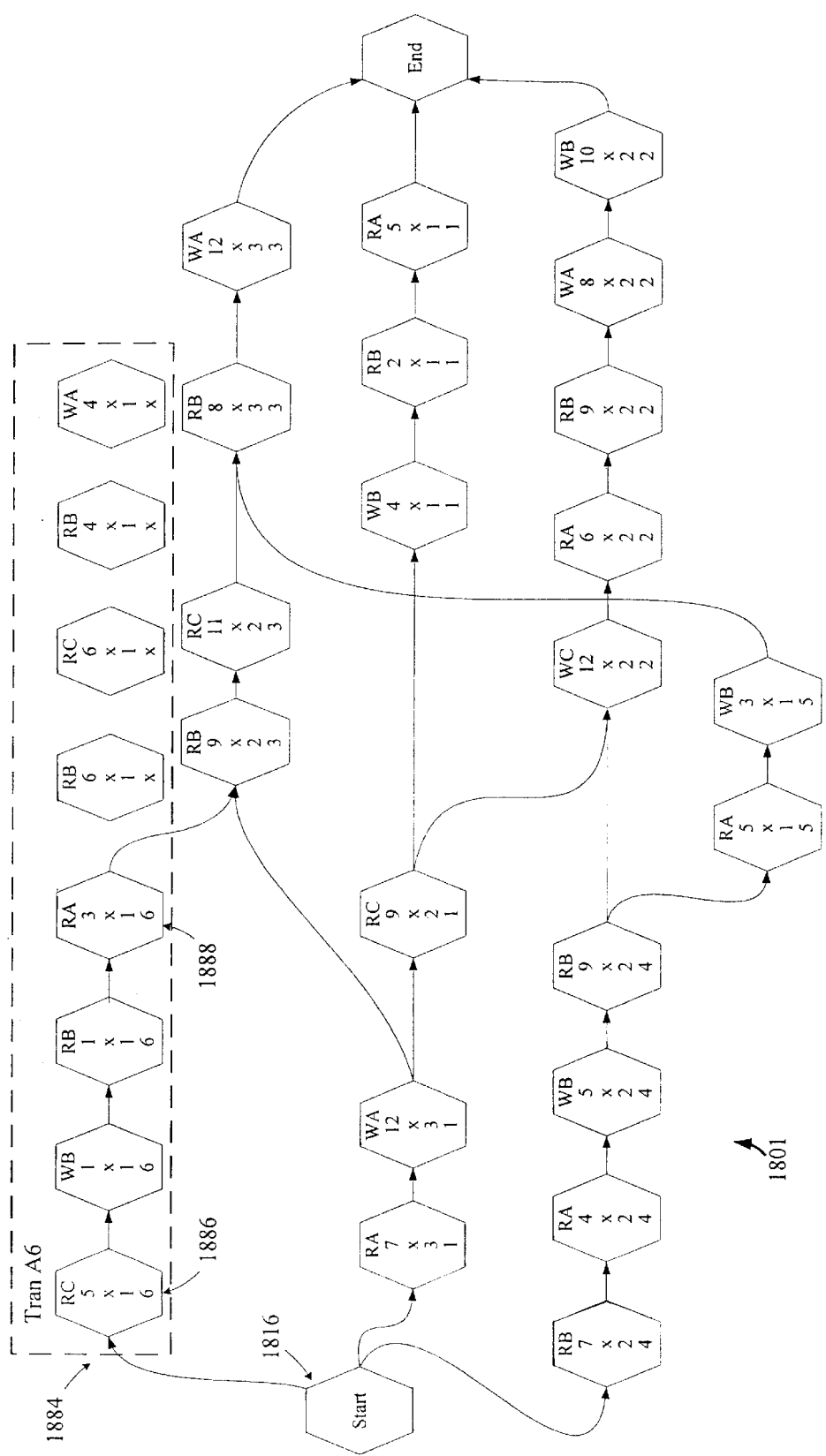

FIG. 18L illustrates the incorporation of another path with a common ending path segment to the path map. A new PECB chain 1884 is built to represent transaction A6. Since the new chain 1884 begins with a starting event type, "RC", which does not match any starting event type already on the path map, the first PECB 1886 of this new chain 1884 is chained directly to the header PECB 1816. Backward-processing task 1006, however, finds that the last four elements of new chain 1884 match the last four elements of path number 3, and these matching PECBs are therefore combined in a manner similar to that described above. Once again, the new path segment on the new chain 1884 bounded by PECBs 1886 and 1888 is chained to the path map 1801 and the matching PECBs on the new chain 1884 may then be freed. In addition, the next available path number, "6", is set in each of the new PECBs added to the path map 1801.

Figure 18M:
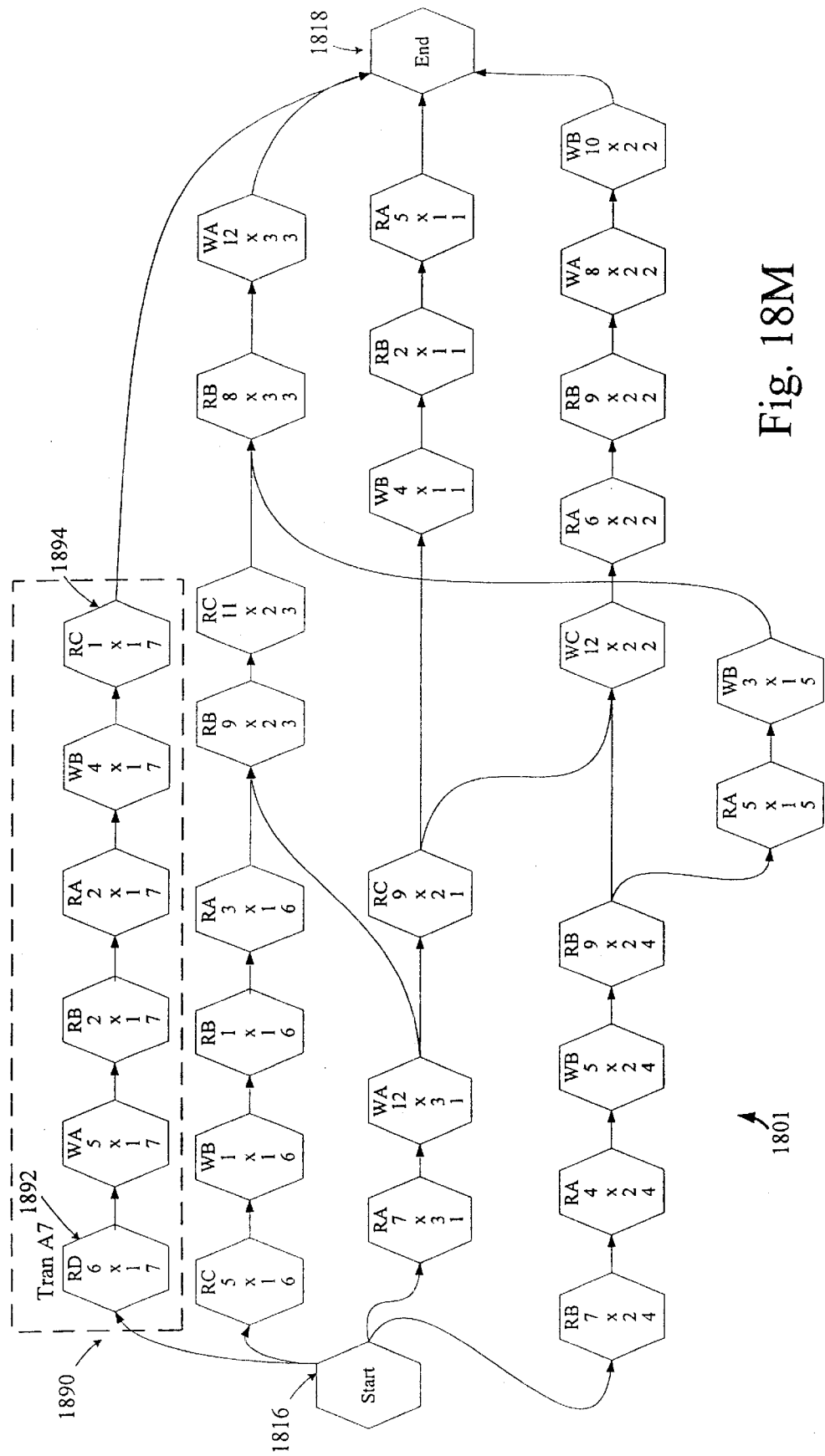

FIG. 18M illustrates a path map incorporating an entirely new path. Both forward-processing task 1004 and backward-processing task 1006 determine that the first and last PECBs 1892 and 1894 respectively on the new chain 1890 do not match any of the starting or ending PECBs already on the path map 1801. Accordingly, the entire new chain 1890 is added to path map 1801 by chaining the first PECB 1892 to the header PECB 1816 and by chaining the last PECB 1894 to the trailer PECB 1818. The event data in each PECB in the new chain 1890 is left intact and the next available path number, "7", is set in each PECB on the newly added chain 1890. None of the PECBs in the new chain 1890 are freed.

Figure 18N:
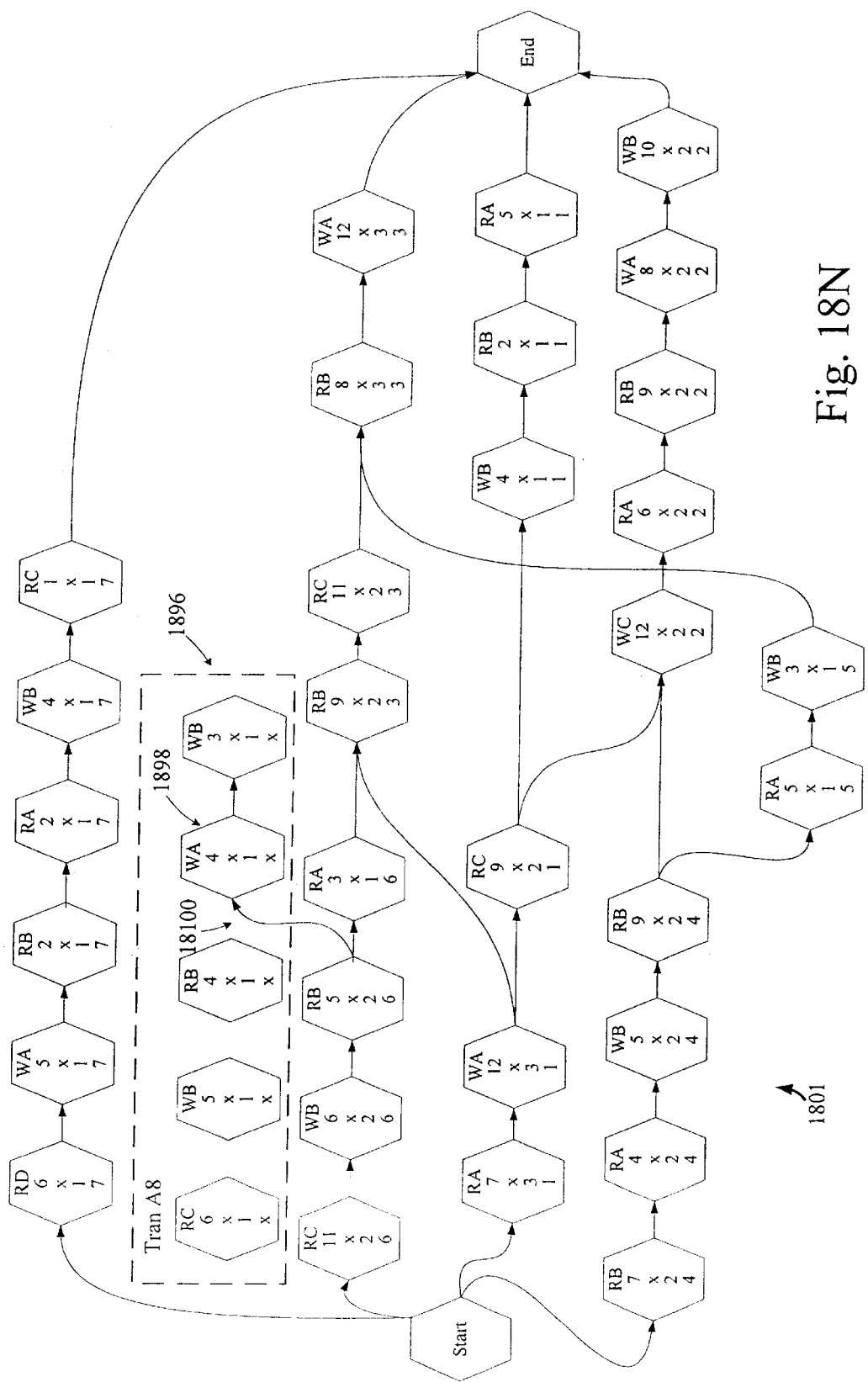
Figure 18P:
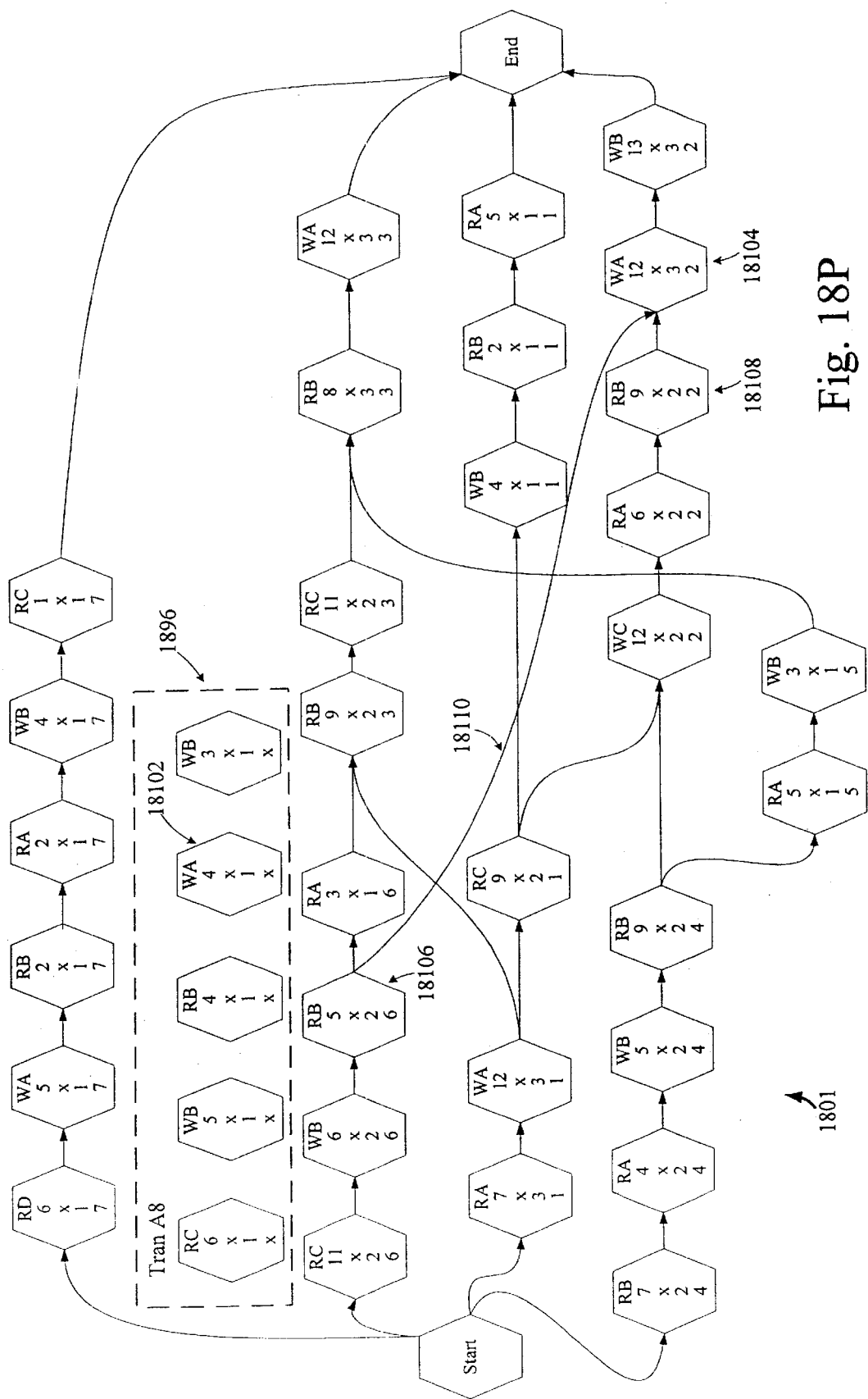

FIGS. 18N and 18P illustrate the incorporation of a path having starting and ending path segments which are common to those already on the path map, and which also illustrate the restrictions which should be observed during path reduction. A new PECB chain 1896 is built representing transaction instance A8. As shown in FIG. 18N, the first three elements of new chain 1896 match the first three elements of path number 6 already on the path map 1801, so the event data from these matching PECBs are combined with those already on the path map 1801. The remainder of the new chain 1896, beginning with PECB 1898, is linked to the path map with a pointer 18100. As shown in FIG. 18P, backward processing is then performed on new chain 1896, and the last two elements of new chain 1896 are found to match the last two elements of path number 2 already on the path map 1801. Accordingly, the event data from the last two elements of chain 1896 are combined with the matching elements on the path map 1801, thereby combining the event data for all of the events on the new chain 1896, and no new path segments are added to the path map 1801 for transaction instance A8.

At this point, it will be noted that if backward-processing task 1006 were to continue working backwards from PECB 18102 on the new chain 1896 and from matching PECB 18104 on the path map 1801, it would be found that the event type for PECB 18106 matches the event type for PECB 18108. Although these two PECBs represent the same event type, they cannot be combined because they have two distinct sets of preceding events. In particular, the PECB 18106 is preceded by a "WB" event, while PECB 18108 is preceded by a "RA" event. Combining PECBs 18106 and 18108 would make the combined PECB a merge point. However, PECB 18106 is already a split point. Therefore, combining PECBs 18106 and 18108 would create a split point after a merge point in violation of the restrictions discussed above, and it would not be possible to clearly relate the flow of events among the various paths represented in the path map at this point if such a combination were allowed to occur. Accordingly, backward-processing task 1006 is stopped, PECBs 18106 and 18108 are not combined, and a pointer 18110 is instead created to link PECB 18106 to PECB 18104.

Figure 18Q:
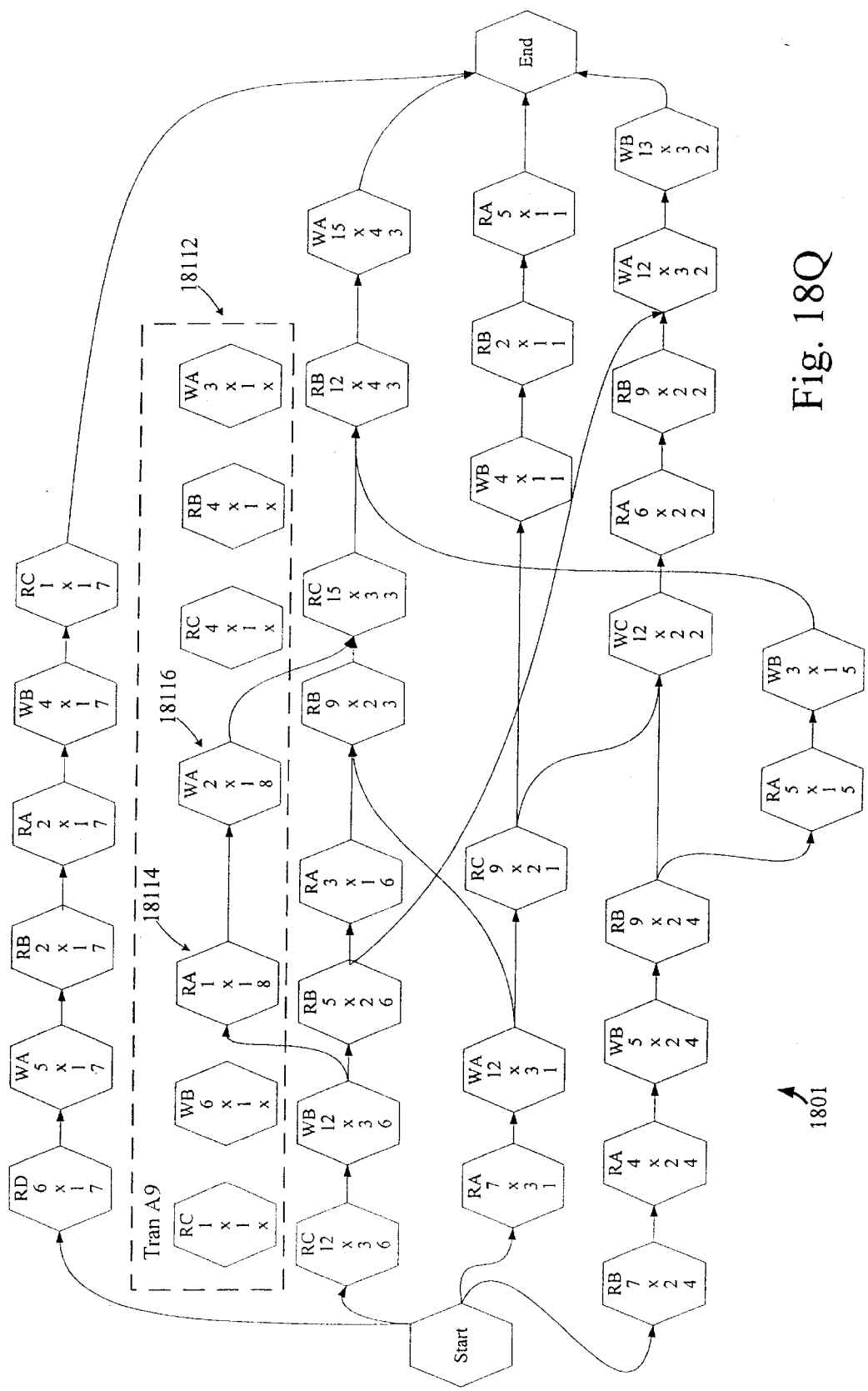

FIG. 18Q illustrates the incorporation of another path containing both a starting and ending path segment common to segments already on the path map. A new chain 18112 is built representing transaction instance A9. The first two and last three PECBs on the new chain 18112 match path segments already on the path map 1801 so that the event data from these matching PECBs on the new chain are appropriately combined with the matching PECBs on the path map 1801. The remaining non-matching PECBs 18114 and 18116 on the new chain are then added to the path map 1801 as a new path segment represented by the next available path number, "8".

Figure 18R:
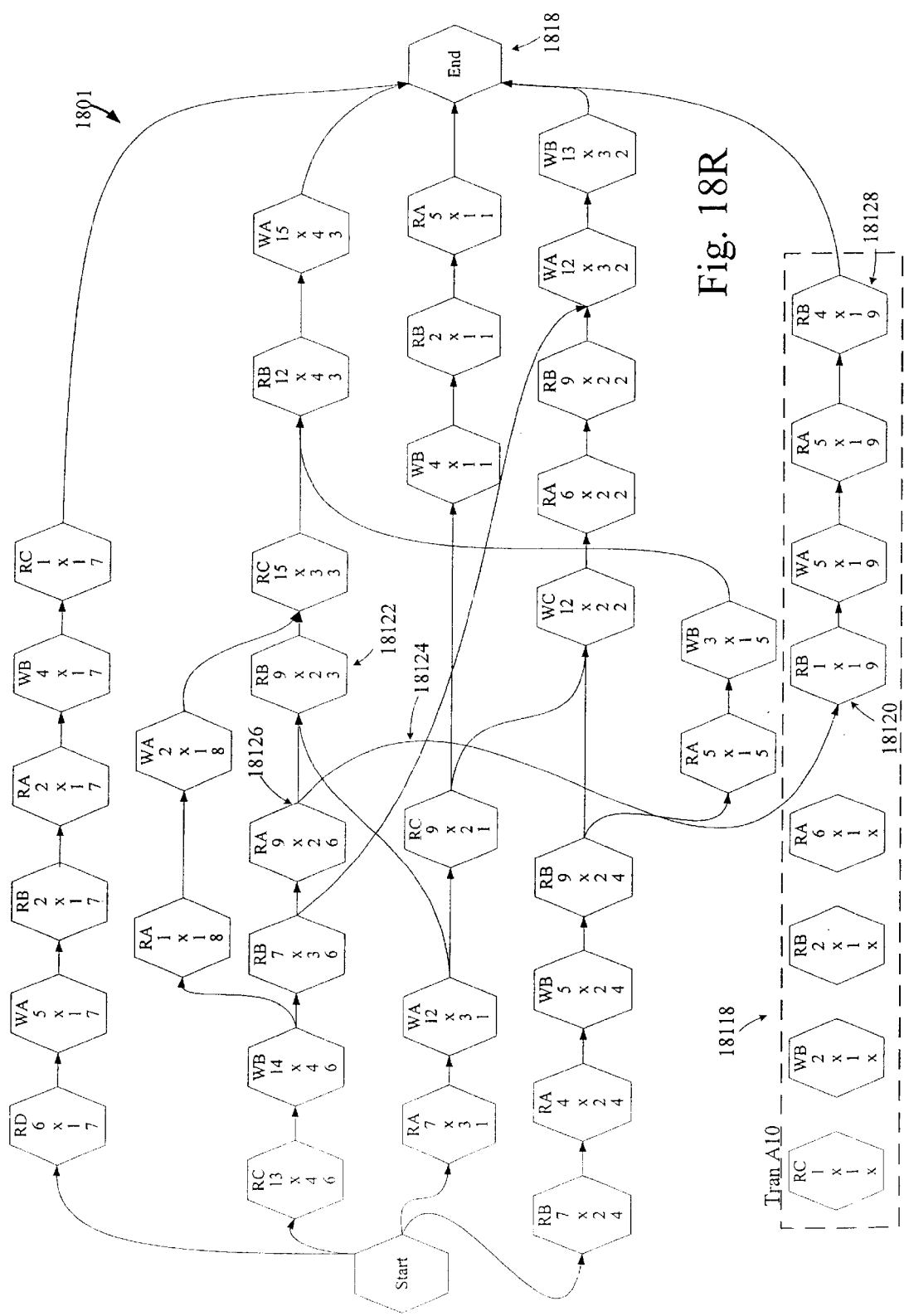

FIG. 18R illustrates another restriction observed during path reduction in which forward-processing is prematurely stopped to avoid creating a path map in which it is impossible to determine the true path taken by a transaction instance. A new PECB chain 18118 is built representing transaction instance A10. Forward-processing task 1004 matches and combines the first four PECBs of new chain 18118 with the first four PECBs of path number 6 already on the path map 1801. The next PECB 18120 of the new chain 18118 matches the next PECB 18122 on the path map, and PECB 18120 could ordinarily be combined with PECB 18122. PECB 18122 points to an "RC" event, while PECB 18120 points to a "WA" event, and the resulting combined PECB would accordingly be a split point. However, the PECB 18122 already on the path map 1801 is already a merge point. As discussed above, creating a PECB which is both a split point and a merge point, or permitting a split point to exist in a path following a merge point, would make it impossible to determine which paths were taken by the original transaction instances at these points. Accordingly, forward-processing task 1004 is stopped after combining the first four PECBs from the new chain 18118, and the remaining four events (beginning with PECB 18120) of the new chain 18118 are linked to the path map 1801 by a pointer 18124 from the PECB 18126 on the path map 1801 immediately preceding the "problem" PECB 18122. The newly added PECBs from the new chain 18118 represent a new ending path segment, so the last event 18128 of the new chain 18118 is chained to the trailer PECB 1818. Finally, the next available path number, "9", is set in each of the PECBs newly added to the path map 1801.

Figure 18S:
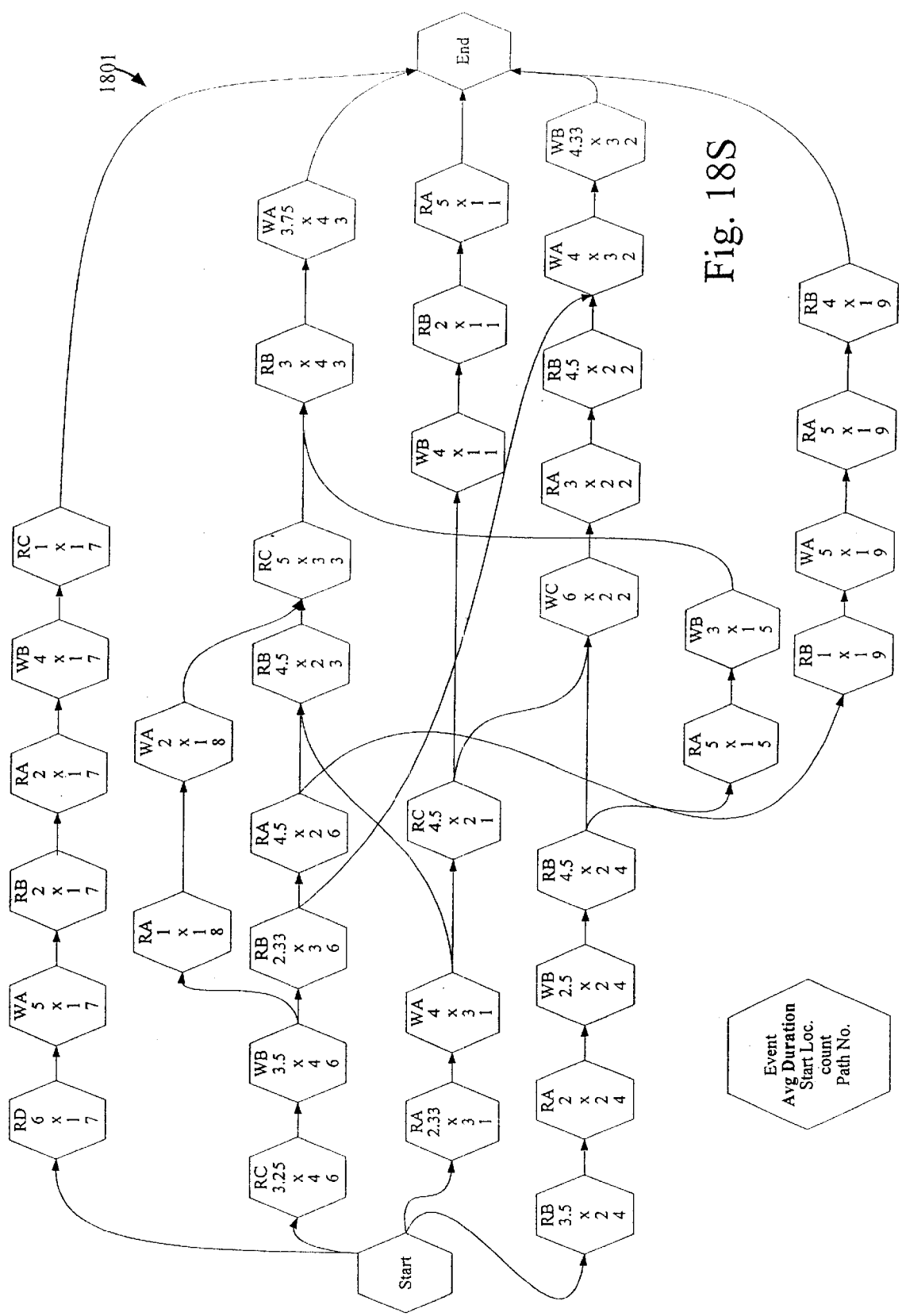

FIG. 18S illustrates the path map 1801 after the data from all of the recorded transaction instances A1–A10 have been incorporated. At this point, the path map 1801 represents a minimal map of the recorded events for all recorded transaction instances. The path map 1801 is next preferably modified by determining the longest path and main path through the path map. The main path is the most frequently occurring path from start to end through the path map 1801. The longest path is that set of linked events which, taken together, span the longest time period from start to finish. First it is necessary to calculate the average event time for each event. This is accomplished by dividing the accumulated event durations in each PECB by the event count in each PECB (i.e. the number of times the event represented by the PECB was executed in all of the recorded transactions). The resulting average event duration is then stored in the PECB. As shown in the figures, the average event duration may be stored in the same field, time field 1804 which was previously occupied by the total accumulated event duration, although a separate field may be used if desired. FIG. 18S shows the resulting path map 1801 after the average event durations have been calculated and stored.

Figure 18T:
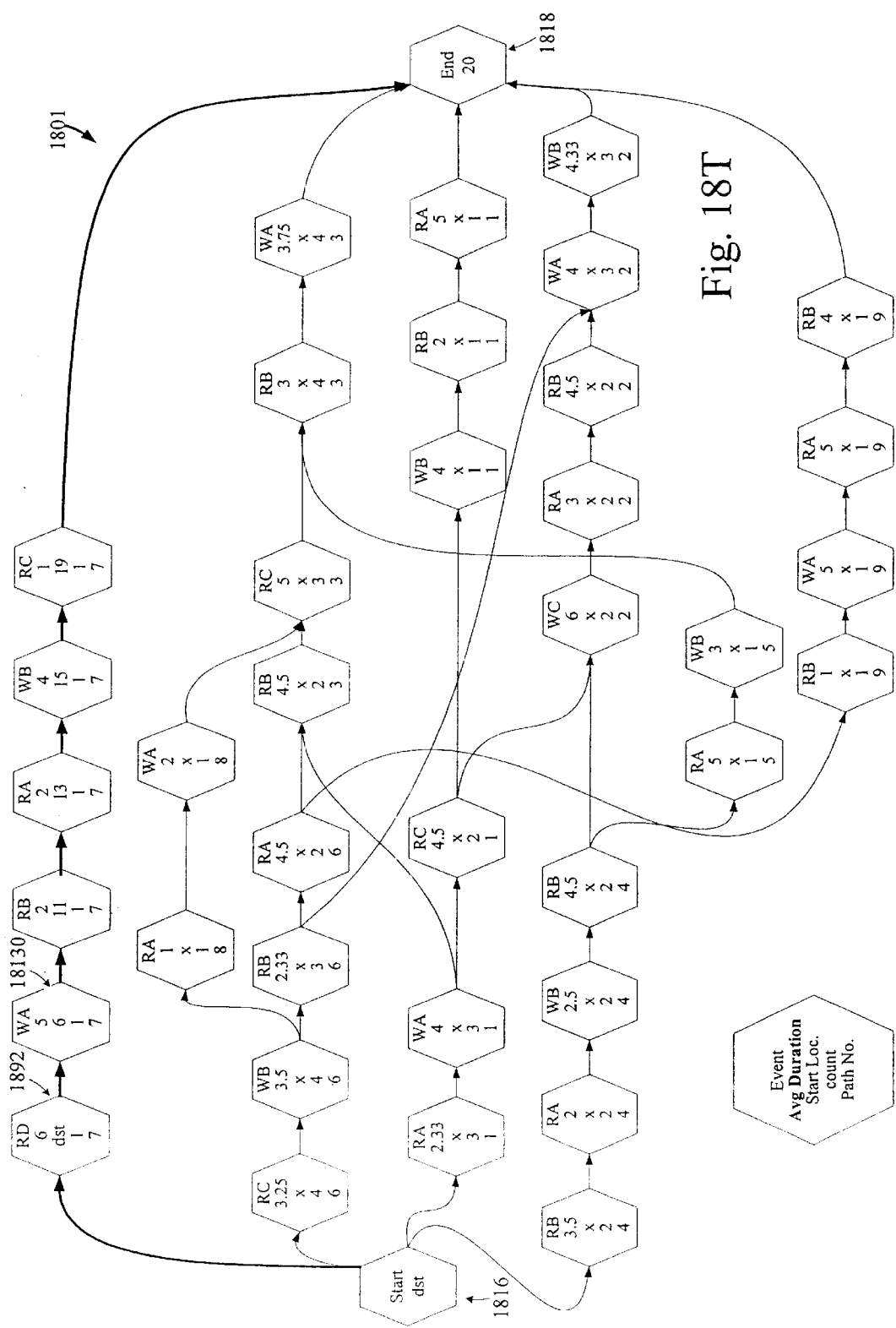

FIGS. 18T–18EE illustrate the determination of each event's position in the time dimension of the output diagram (that is, the start location, which is the vertical location of each event when the time dimension is vertically disposed in the output diagram) as well as the determination of which path on the path map is the longest path. Determining each event's position in the time dimension is accomplished in step 1404 shown in FIG. 14, and this information is stored as the event duration in the PECBs comprising path map 1801. The default start time DST (that is, the duration of time consumed by processing prior to the first recorded event of the transaction) is stored in the header PECB 1816. For simplicity of this example, it will be assumed that the default start time DST is 0, although in practice the default start time would typically be greater than 0. Next, the start location for each event represented by a PECB on the path map 1801 is calculated by adding the start location in the previous PECB to the average event duration in the previous PECB. The start location of the header PECB 1816 is preferably set to 0. Accordingly, as shown in FIG. 18T, working through path number 7 at the top of the path map 1801, the start location of the first PECB 1892 is calculated as the start location of the previous PECB, which is the header PECB 1816, whose start location is defined to be 0 plus the default start time DST stored in the header 1816 which we assume in this example is 0. As a result, the start location for PECB 1892 is the default start time DST, or 0 in this example. The start location for the next PECB 18130 in path number 7 is calculated as the start location of the previous PECB 1892 (0) plus the average event duration of the previous PECB 1892 (which is 6), resulting in a start location of 6 for PECB 18130. This calculation is performed and stored in each PECB in path number 7 until the trailer PECB 1818 is reached. A final start location is then calculated for the trailer PECB 1818 in the same manner as the start locations described above, which in this example results in a value of 20 which is also stored in trailer PECB 1818. The final start location currently represents the total duration of time consumed by the transaction instance represented by path number 7 corresponding to transaction instance A7 added to the path map as shown in FIG. 18M.

Figure 18U:
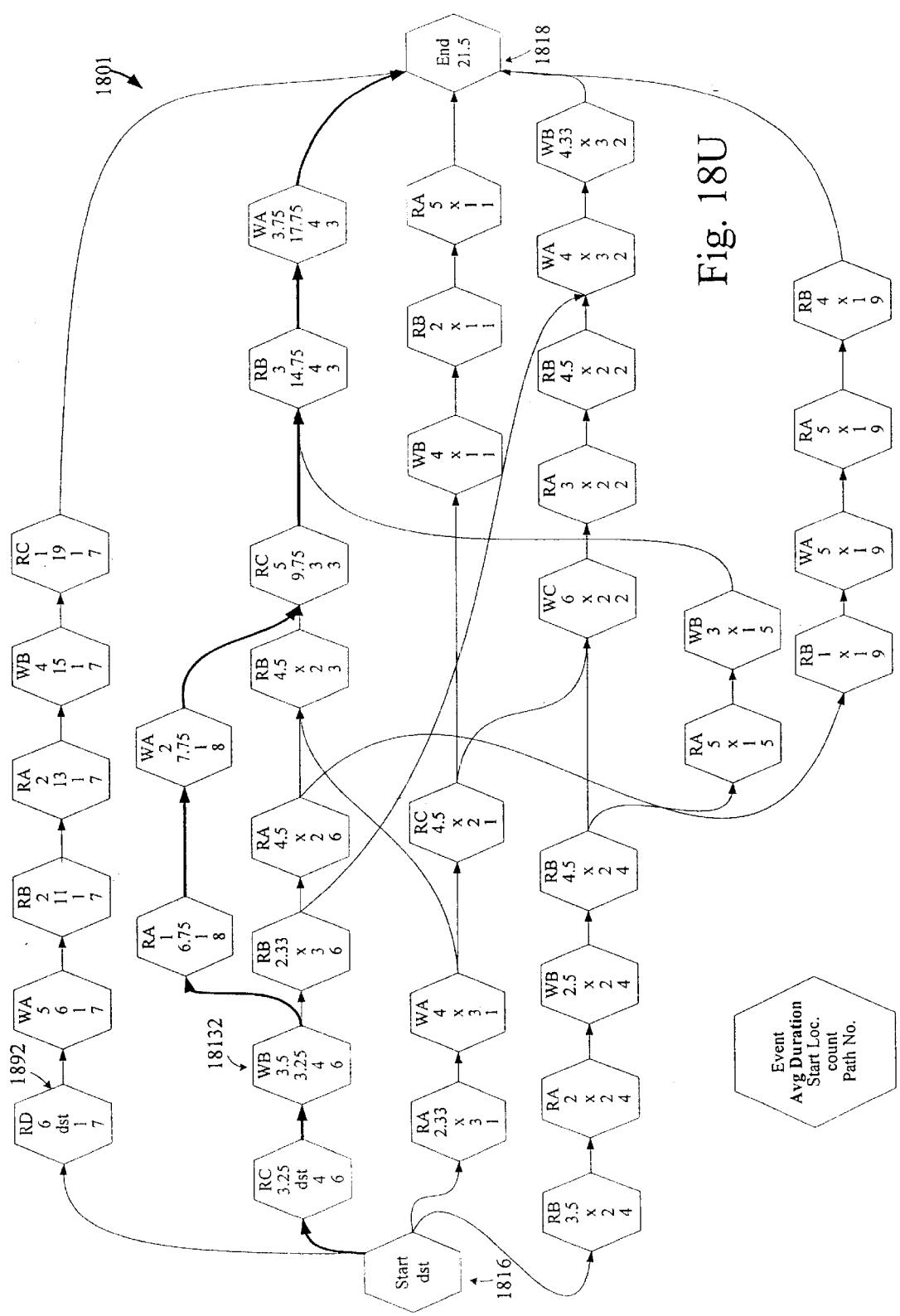

Traversing the path map 1801 backwards as shown in FIG. 18U along the path just processed and returning to the header PECB 1816, it may be determined by attempting to traverse the path map 1801 again along path number 7 that path number 7 has been processed for determining locations as indicated by the presence of a start location stored in the first PECB 1892 of path number 7. Thus, another path on the path map may be selected and traversed at this time for similar processing. In this example, the next path chosen is that indicated by the highlighted forward pointers in FIG. 18U. The start locations for each PECB in the selected path are calculated and stored in each PECB in a manner similar to that described above. However, in this instance when the trailer PECB 1818 is reached and the final start location is calculated, the result is 21.5 for this path. Because this is greater than the final start location of 20 calculated previously, the higher value of 21.5 is stored in trailer PECB 1818. Storing the highest final start location value in trailer PECB 1818 after each path on the path map 1801 has been processed ensures that the value stored in trailer PECB 1818 represents the total execution duration for the longest path on the path map 1801. Similarly, while traversing the path map 1801 and calculating the start locations for each PECB, whenever a PECB is reached which already has an entry for the start location stored in it (such as a merge point PECB), the greater of the newly calculated and the previously stored start locations is preferably stored in the PECB. This assists in preparing an easily readable output diagram by ensuring that linking lines between events in the output diagram generally move forward through the time dimension rather than looping backward. This also ensures that the total duration of the longest path in the path map 1801 represents the overall time dimension shown in the output diagram.

Figure 18V:
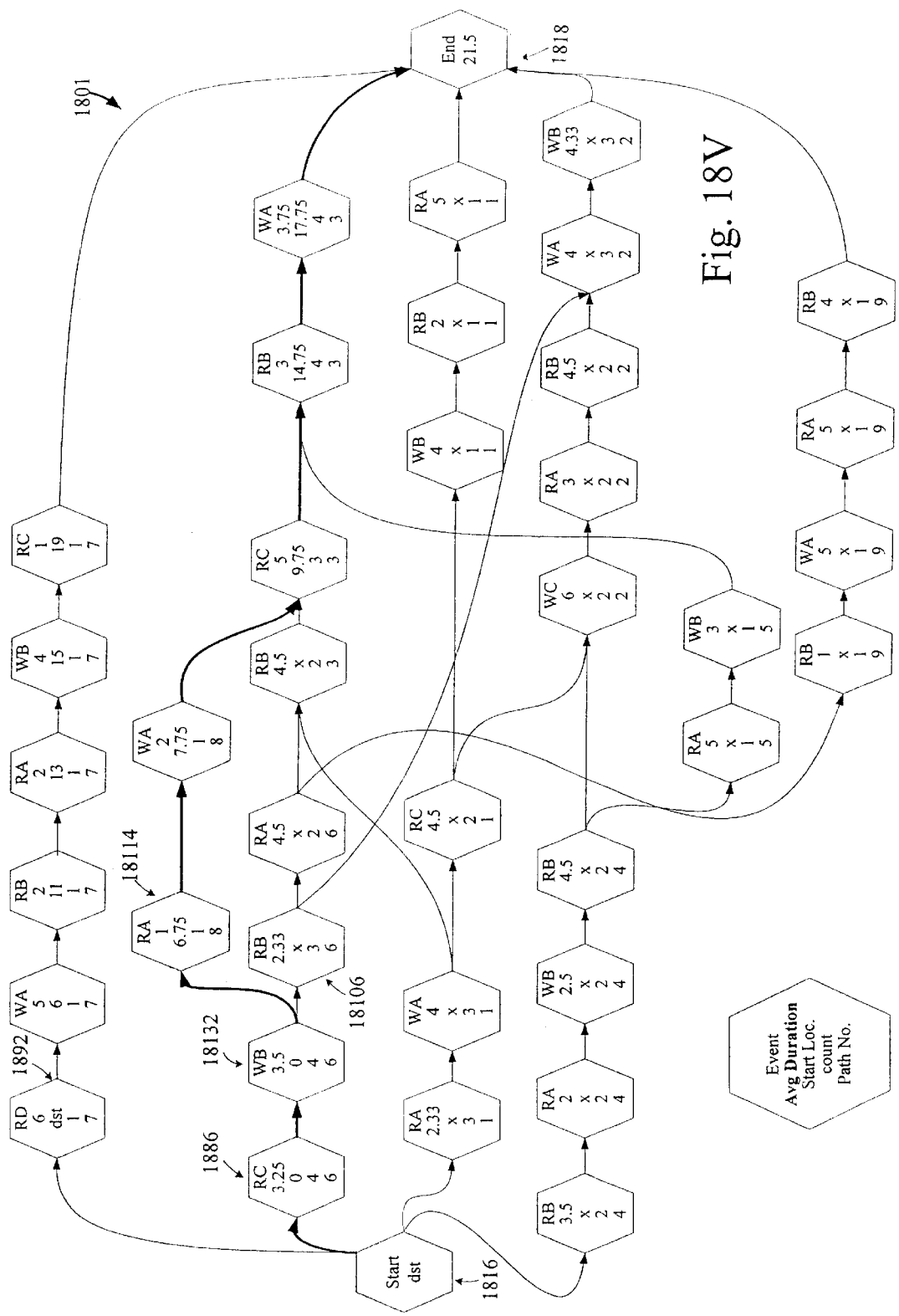

The preferable method for ensuring that all paths are processed for the determination of start location values is illustrated in FIG. 18V. After the new final start location is calculated and stored in trailer PECB 1818 as described above, the path just processed is followed backwards (using backward pointers not shown) toward the header PECB 1816. However, when PECB 18132 is reached, it is determined from the presence of multiple forward pointers in this PECB that this is a split point. Accordingly, more than one forward path exists from this PECB, and it must be ensured that all of them are processed. Checking the PECBs 18114 and 18106 pointed to by these two forward pointers shows that one of these PECBs, namely PECB 18106, does not yet contain a start location stored in it. This indicates that the path must be traversed again to process the path segment beginning with PECB 18106. As the highlighted path continues to be traversed backward from PECB 18132, an identifier, such as "0" or "−1", is stored in the start location field of each PECB until the header PECB 1816 is reached. In this example, the identifier used is "0" as shown in PECBs 1886 and 18132 of FIG. 18V.

Figure 18X:
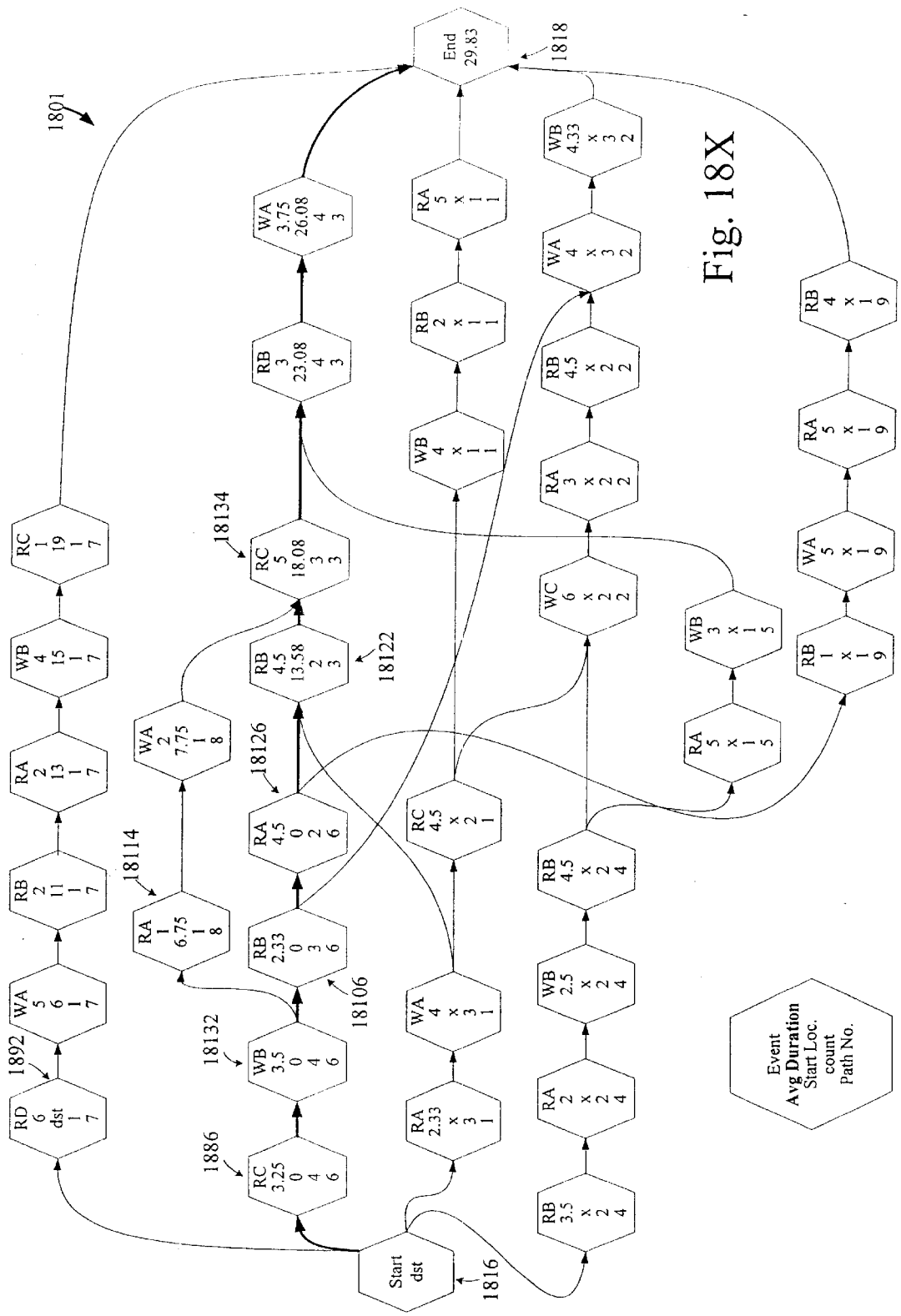

Resuming start location processing from header PECB 1816 once again as shown in FIG. 18X, the "0" identifier set in the start location field of PECB 1886 indicates that this path must be traversed again for further processing. Thus, the start location for PECBs 1886 and 18132 are recalculated and stored in these respective PECBs (not shown), and the split point at PECB 18132 is again confronted. The start location value already stored in PECB 18114 coincides with the start location value which would be calculated for it during this path traversal, indicating that the path segment beginning with PECB 18114 has already been processed. As a result, the other forward path emanating from PECB 18132, beginning with PECB 18106, is selected for processing. PECB 18106 is also a split point, so the "0" indicator is stored in each of the PECBs on this path from PECB 18106 backward to the header PECB 1816. One of the two PECBs pointed to by PECB 18106 is then selected; in this case, PECB 18126. PECB 18126 is also a split point, so all of the PECBs from this PECB 18126 backward to the header PECB 1816 are set with a "0" indicator in the start location field to indicate the need for further processing. Again, one of the two PECBs pointed to by PECB 18126, namely PECB 18122, is selected. The start location for PECB 18122 is calculated and stored, and the next PECB on the path, namely PECB 18134 is selected. PECB 18134 has a start location already stored in it, but the start location calculated for it based on the current path traversal (18.08) is higher than the start location previously stored in it (9.75). Accordingly, the higher value is stored in this PECB 18134. Continuing the traversal along the highlighted path forward to the trailer PECB 1818, a new final start location of 29.83 is calculated and stored in trailer PECB 1818 since this value exceeds the value previously stored therein.

Figure 18Y:
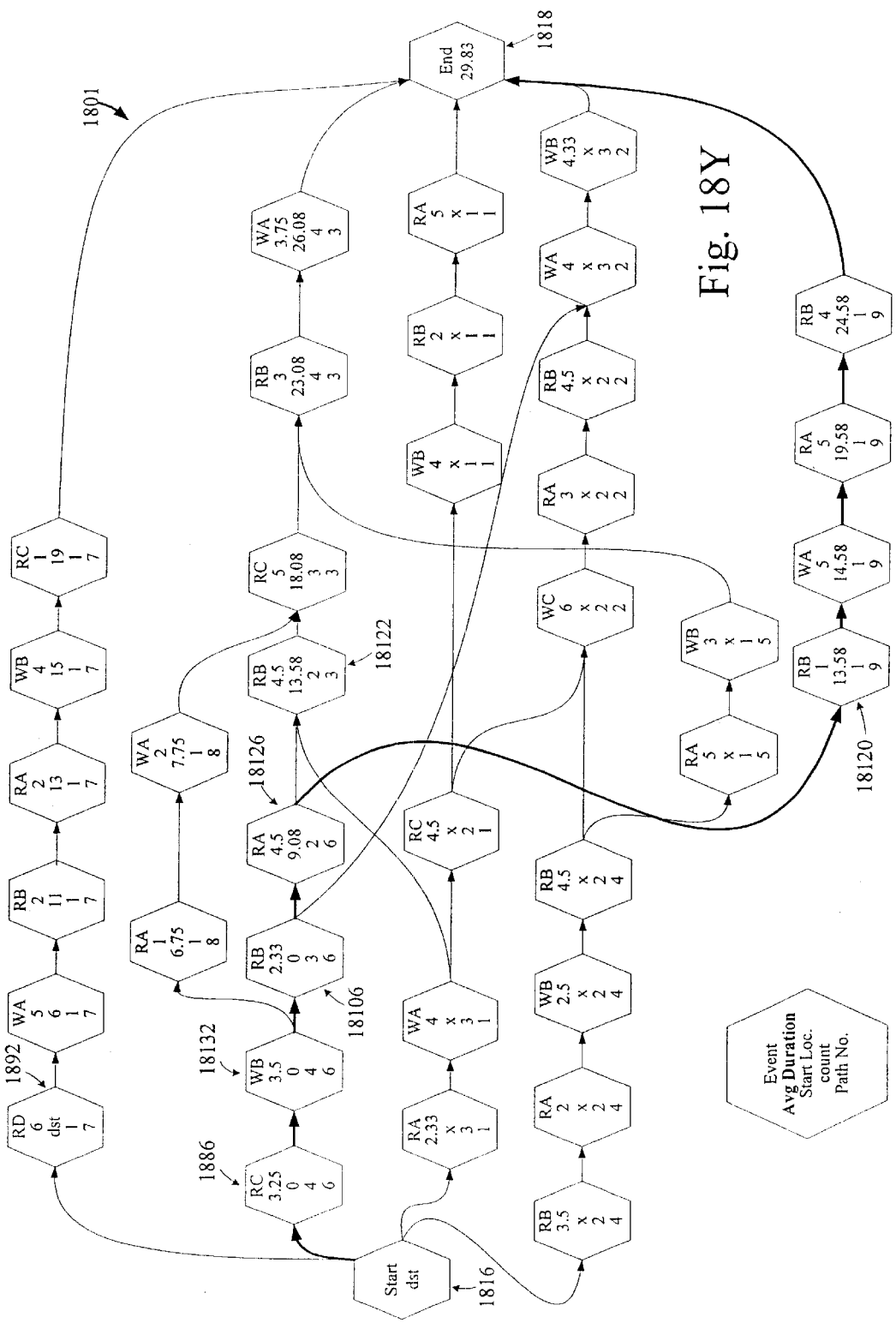
FIG. 18A is a table of sample event data for processing by a computer program profiler constructed in accordance with the present invention.
Figure 18A:
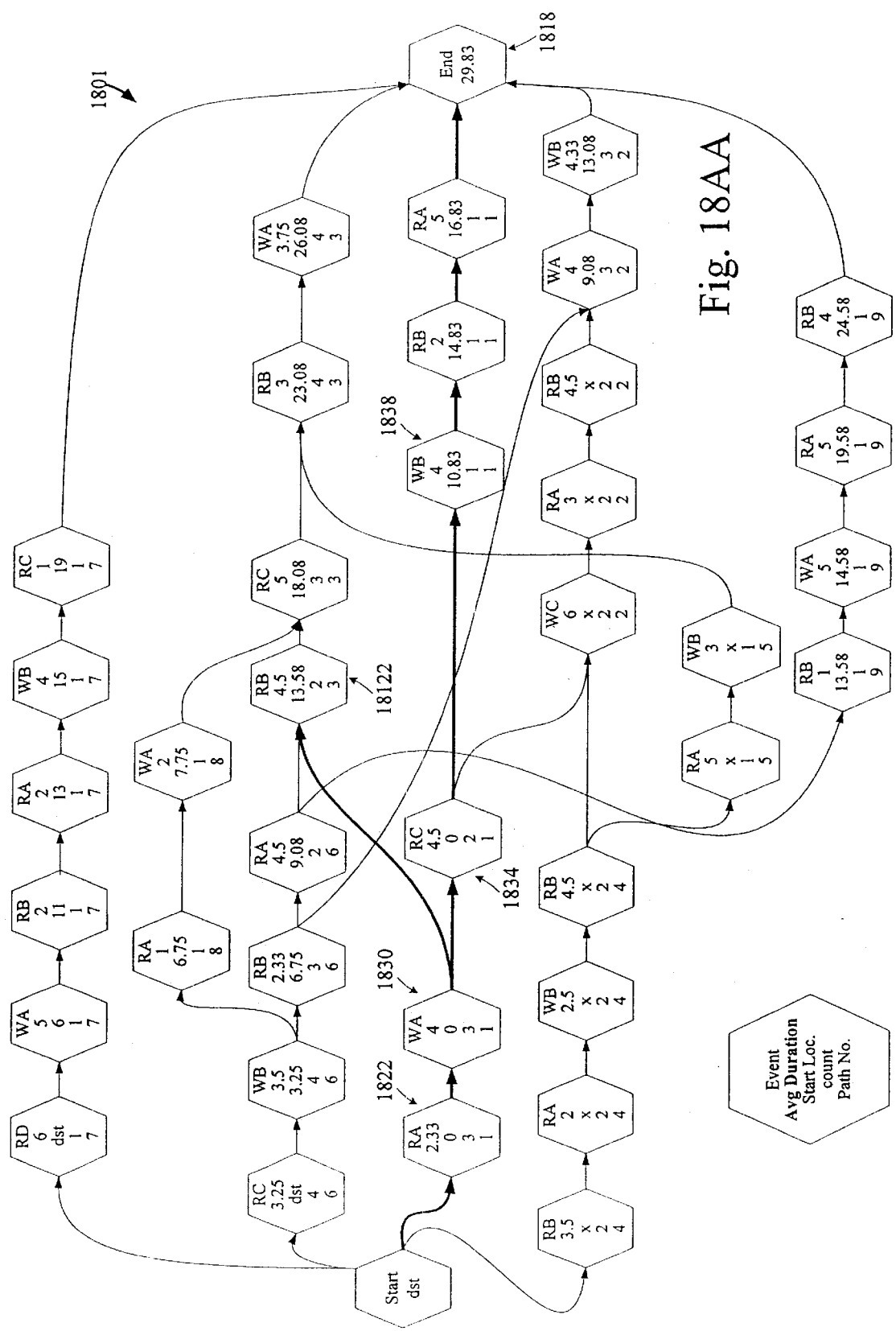
Figure 18B:
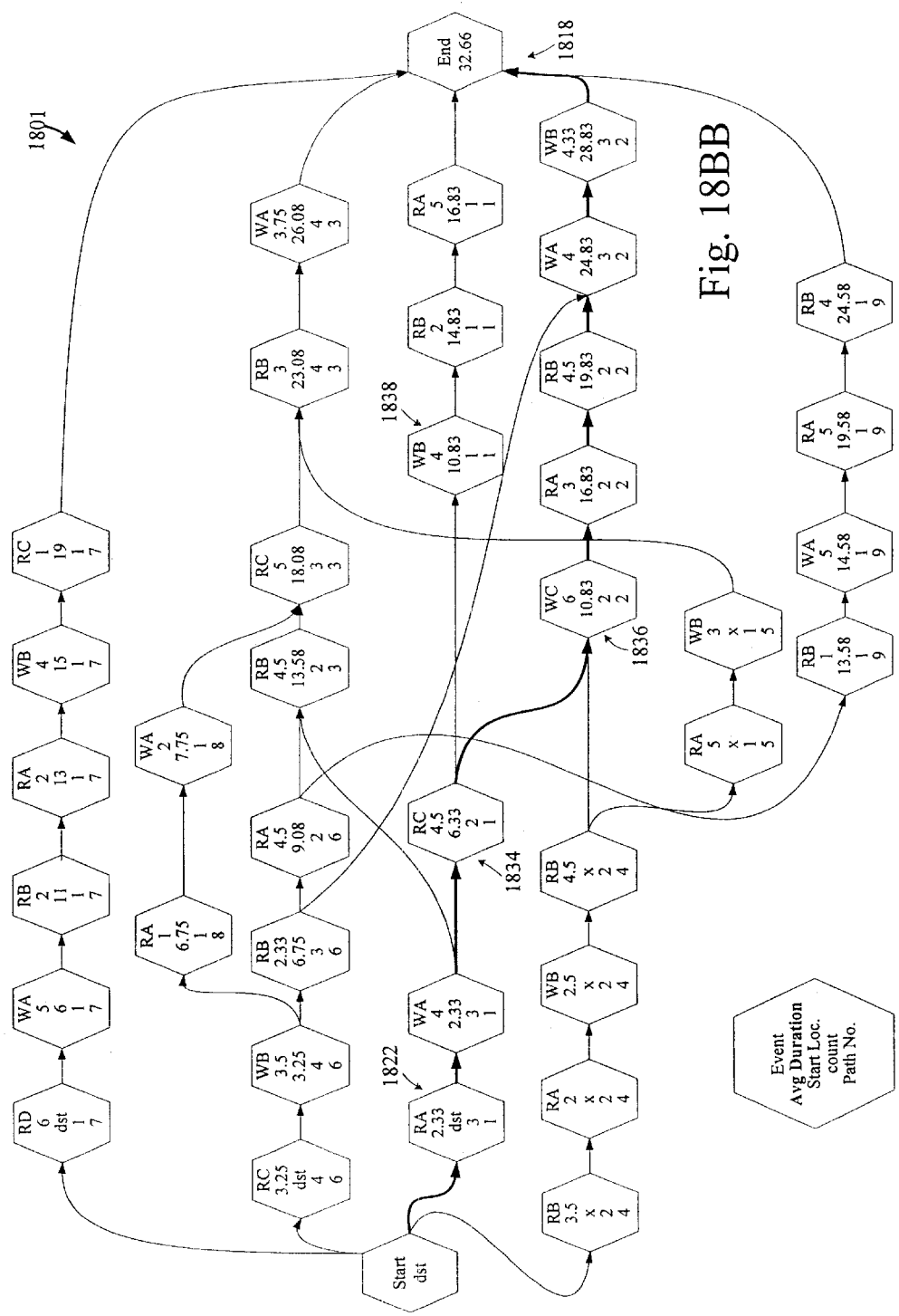
Figure 18D:
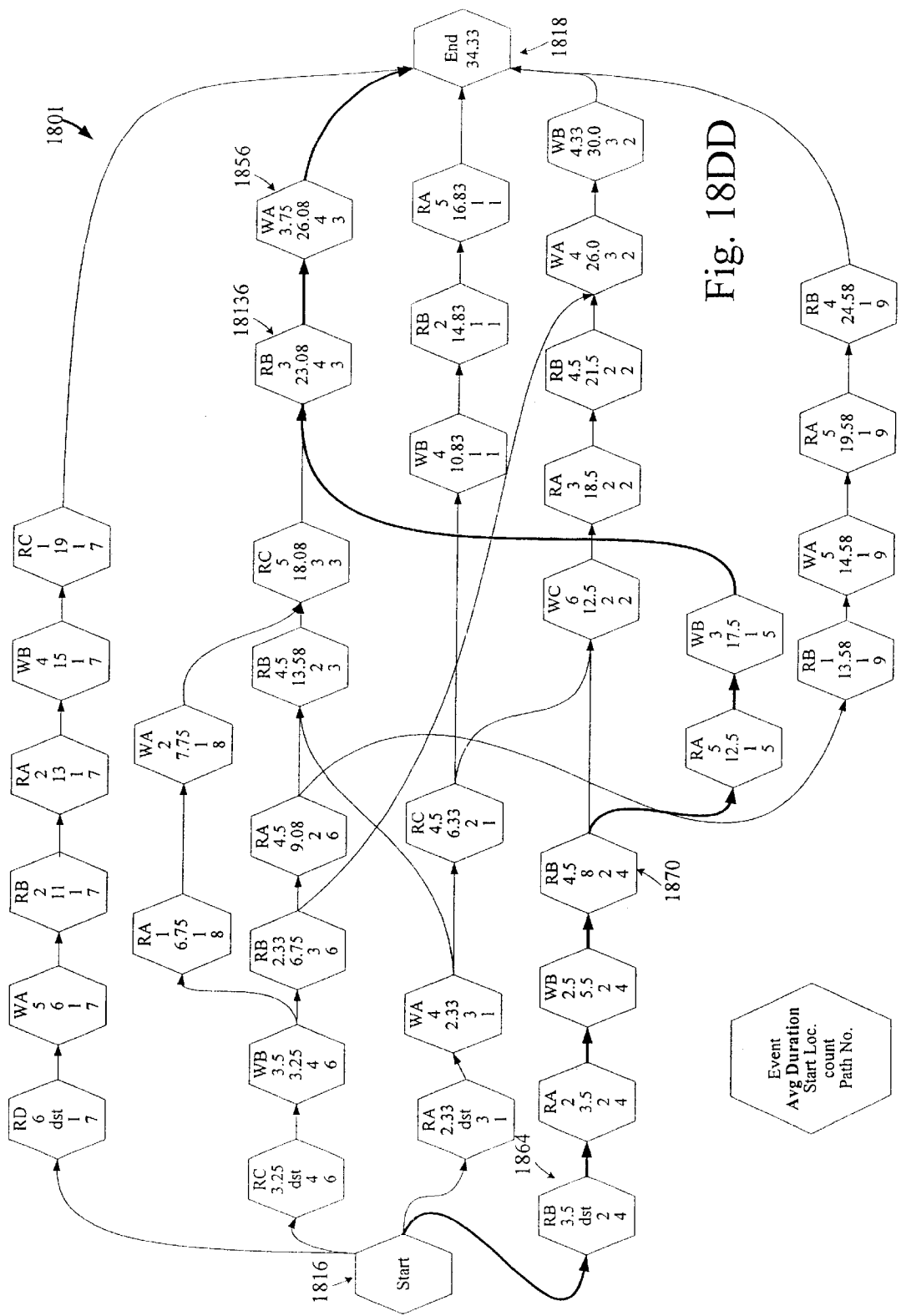
Figure 18E:
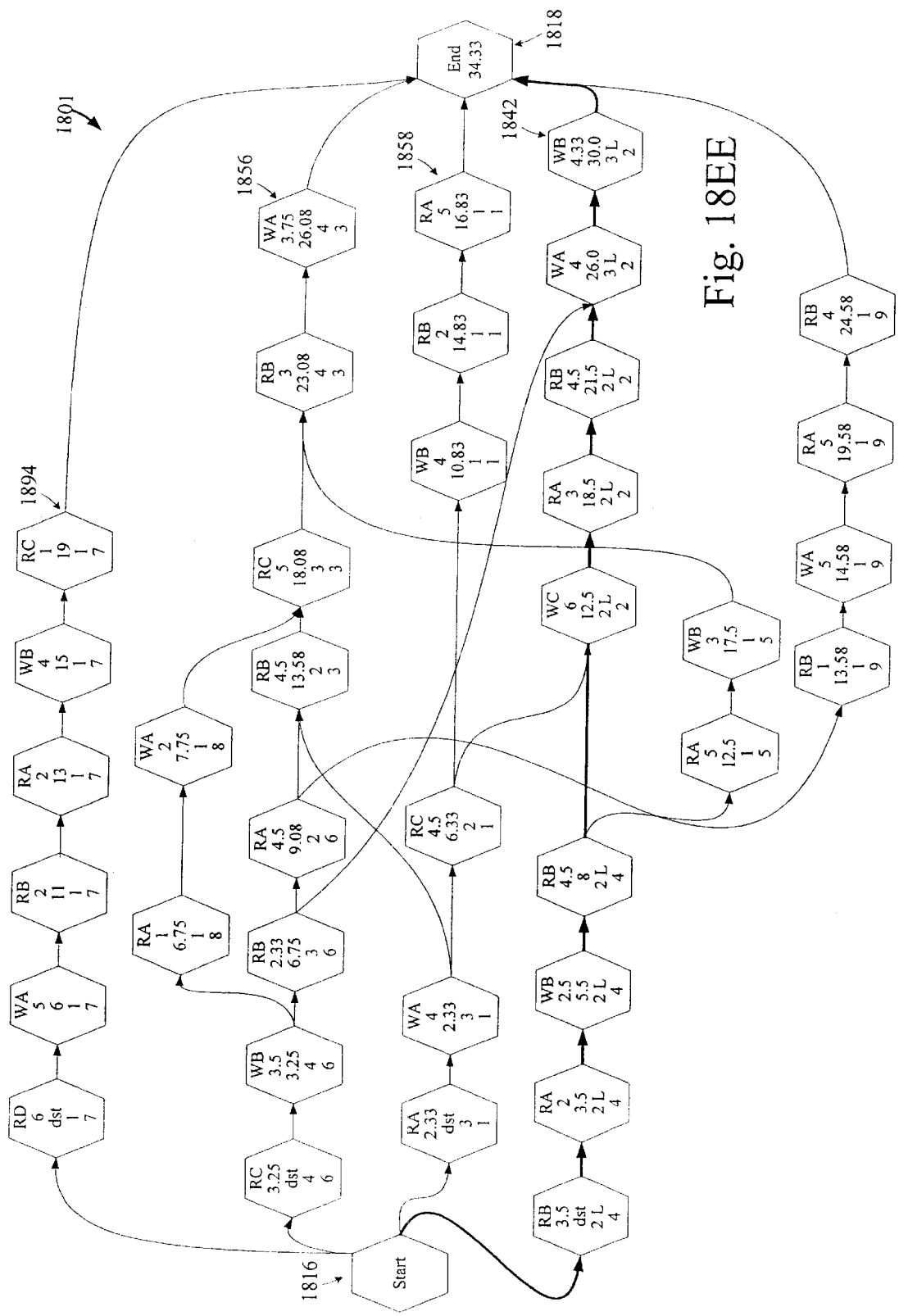
Figure 18F:
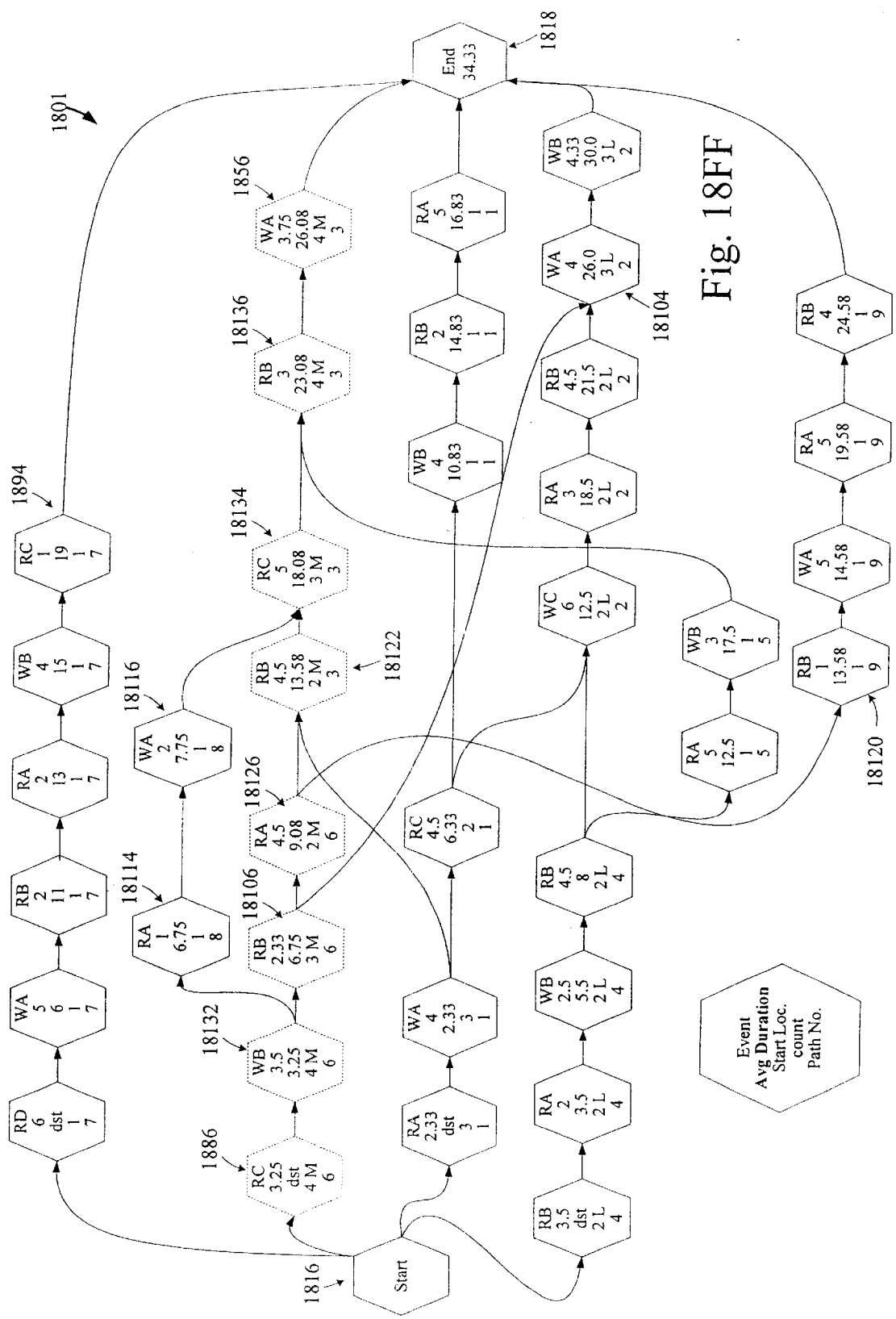

Resuming start location processing again from header PECB 1816, the path beginning with PECB 1886 is again selected because it contains a "0" indicator in the start location field. The start locations for PECBs 1886, 18132 and 18106 are recalculated and stored. PECB 18106 is still a split point from which forward path segments emanate which have not been processed, so the start location values for all PECBs from this PECB 18106 backward to the header PECB 18106 are set with the "0" indicator. Continuing the forward traversal, PECB 18126 is selected since it contains a "0" indicator set in the previous traversal as shown in FIG. 18X. The start location value for PECB 18126 is recalculated and stored therein as shown in FIG. 18Y. PECB 18126 is still a split point, but one of the forward paths emanating from PECB 18126 has already been processed as indicated by the start location value stored in PECB 18122, the same value which would be calculated for PECB 18122 based on the current traversal. Accordingly, the other PECB pointed to by PECB 18126, namely PECB 18120, is selected. The start location values for this PECB and the remaining PECBs in the highlighted path shown in FIG. 18Y are calculated and stored, and a new final start location value of 28.58 for trailer PECB 1818 is calculated. Since the final start location value previously stored in trailer PECB 1818 of 29.83 is greater than the value calculated during this most recent traversal, the previously stored value is left unchanged in trailer PECB 1818.

The final remaining path emanating from PECB 1886 is processed for start location determination as shown by the highlighted path of FIG. 18Z. The start location values for each PECB on this path are calculated as described above, and since the paths from all split points following PECB 1886 have been processed, no "0" indicators need be set in any of these PECBs. The final start location value for the highlighted path shown in FIG. 18Z is 17.41. Once again, since the start location value previously stored in trailer PECB 1818 is greater than the value calculated after traversing the highlighted path, the final start location of trailer PECB 1818 is not updated.

Referring now to FIG. 18AA, the next set of paths beginning with PECB 1822 are processed. Following the highlighted path, PECB 1830 is found to be a split point. One of the PECBs following PECB 1830, namely PECB 18122, already has a start location stored in it. Moreover, this stored start location in PECB 18122 is greater than the start location calculated for this PECB for the current path traversal. Accordingly, processing for the path segment beginning with PECB 18122 is already complete and attention may instead be turned to the other PECB pointed to by PECB 1830, namely PECB 1834. PECB 1834 is a split point with more than one unprocessed path segment following it, so the "0" indicator is set in each PECB from PECB 1834 backward to the header PECB 1816 to once again indicate the need for further processing along this path. For the current traversal, PECB 1838 is selected next and the start locations for this and each of the remaining PECBs along this path are calculated and stored as shown in FIG. 18AA. The final start location value for this path traversal is 21.83, so the final start location previously stored in trailer PECB 1818 is not updated.

Beginning again with PECB 1822 which contains the "0" indicator, the start locations for each of the PECBs along the highlighted path shown in FIG. 18BB are calculated and stored. When PECB 1834 is reached again, it is found that PECB 1838 already contains a start location matching the value calculated for it during the current traversal, and therefore has previously been processed. Instead, the path segment beginning with PECB 1836 is selected for processing following PECB 1834. The start location values for PECB 1836 and each PECB thereafter in the path are calculated and stored, and a new final start location value of 32.66 is calculated. Since this value exceeds that already stored in trailer PECB 1818, the new final start location value is stored therein. Based on the paths processed thus far, the highlighted path shown in FIG. 18BB is the longest path on the path map 1801.

The paths beginning with PECB 1864 are next selected for processing as shown in FIG. 18CC. Processing begins at PECB 1864 and continues along this path in the manner described above, and eventually PECB 1836 is reached. PECB 1836 has a start location of 10.83 previously stored in it from earlier processing. However, the start location calculated during the current traversal of the path map 1801 for PECB 1836 is 12.5, which is greater than the value previously stored in PECB 1836. Accordingly, the higher value is stored in PECB 1836 and the start locations for each of the PECBs following PECB 1836 on the path map 1801 are recalculated based on the new start location stored in PECB 1836. A new final start location value of 34.33 is the highest calculated thus far and is therefore stored in trailer PECB 1818. At this point, the highlighted path shown in FIG. 18CC is the longest path on the path map 1801.

Since the path processed in FIG. 18CC included a split point at PECB 1870, the start location values from this PECB backward along the path to the start PECB 1816 would have been set with the "0indicator" (not shown). In traversing the path map beginning with PECB 1864 again, the highlighted path shown in FIG. 18DD is traversed. A merge point is found at PECB 18136 which contains a start location already stored in it. The start location calculated for PECB 18136 as a result of the current traversal of the path map is 20.5, which is less than the start location of 23.08 previously stored in PECB 18136. This condition indicates that start location processing for the path segment beginning with PECB 18136 is complete, and the start locations previously stored in PECBs 18136 and 1856, as well as the final start location stored in trailer PECB 1818, are left unchanged.

At this point, the start locations for all PECBs in the path map 1801 have been calculated and stored in the path map 1801. Moreover, the trailer PECB 1818 indicates that the total duration of the longest path on the path map is 34.33 time units, which will be used to determine the overall time dimension shown in the output diagram.

Referring now to FIG. 18EE, the longest path is now located on the path map 1801. Preferably beginning with the trailer PECB 1818 and working backwards toward the header PECB 1816, each of the PECBs in the path map 1801 immediately preceding the current PECB are checked to determine whether the sum of their start location and event duration equals the start location stored in the current PECB. For example, beginning with trailer PECB 1818, the sums of the start location and event duration in PECBs 1894, 1856, 1858 and 1842 are each checked to determine whether they equal the start location value 34.33 stored in trailer PECB 1818. Alternatively, this calculation may be performed by subtracting the event duration of the previous PECB from the start location value of the current PECB and comparing the result to the start location stored in each of the previous PECBS. In this case, PECB 1842 is found to satisfy this condition. An indicator, such as the letter "L" shown in the PECBs of FIG. 18EE, is set in each PECB found to be on the longest path. Processing continues in the manner above described, proceeding backward from the last PECB found on the longest path (in this case PECB 1842) until header PECB 1816 is reached. The highlighted path shown in FIG. 18EE comprises the longest path in the example.

The main path through the path map 1801 should also be identified and indicated in the data structure of path map 1801. Beginning with the header PECB 1816, each of the PECBs immediately following header PECB 1816 (the "starting event" PECBs) is checked to determine which PECB has the highest event count. In this example, PECB 1886 has the highest count of 4 and is therefore determined to be on the main path. An indicator, such as the letter "M" as shown in FIG. 18FF, is set in each PECB determined to be on the main path. Likewise, each of the PECBs immediately preceding the trailer PECB 1818 (the "ending event" PECBs) are checked to determine which PECB contains the highest event count. In this example, PECB 1856 is found to have the highest event count of 4. A search of the path map 1801 is then conducted to determine whether a common path exists between the starting event and ending event PECBs found to be on the main path. In the example, the path map is traversed forward from PECB 1886. The next PECB 18132 may also be marked as part of the main path as it is the only PECB following the previous PECB. Because PECB 18132 is a split point, any one of the forward paths emanating from this PECB may be chosen. Alternatively, that PECB following a split point PECB may be chosen which contains the highest event count. In this case, choosing PECB 18106 results in another split point. If PECB 18104 is next chosen, continuing the traversal along this path ends at the trailer PECB 1818 and not PECB 1856 as desired. Accordingly, the path segment beginning with PECB 18104 is not on the main path. Returning to PECB 18106, the next path segment beginning with PECB 18126 is chosen. This, too, is a split point. Proceeding in this manner eventually results in the determination that PECBs 18132, 18106, 18126, 18122, 18134 and 18136 comprise a path connecting PECBs 1886 and 1856. Each PECB along this path is marked as a main path PECB as described above.

It may be the case that there is more than one path or path segment connecting PECBs 1886 and 1856. In the example shown in FIG. 18FF, PECBs 18114 and 18116 comprise just such a path segment. In such a case, it is preferable to choose the path segment which contains PECBs with the highest event count as the main path. In the example of FIG. 18FF, the path segment represented by PECBs 18114 and 18116 represents only one instance of these events, while the path segment represented by PECBs 18106, 18126 and 18122 represents at least two instances of each of these events, so this path segment is chosen for the main path. The main path through the path map 1801 is shown by the dashed line hexagons depicted in FIG. 18FF.

Figure 16:
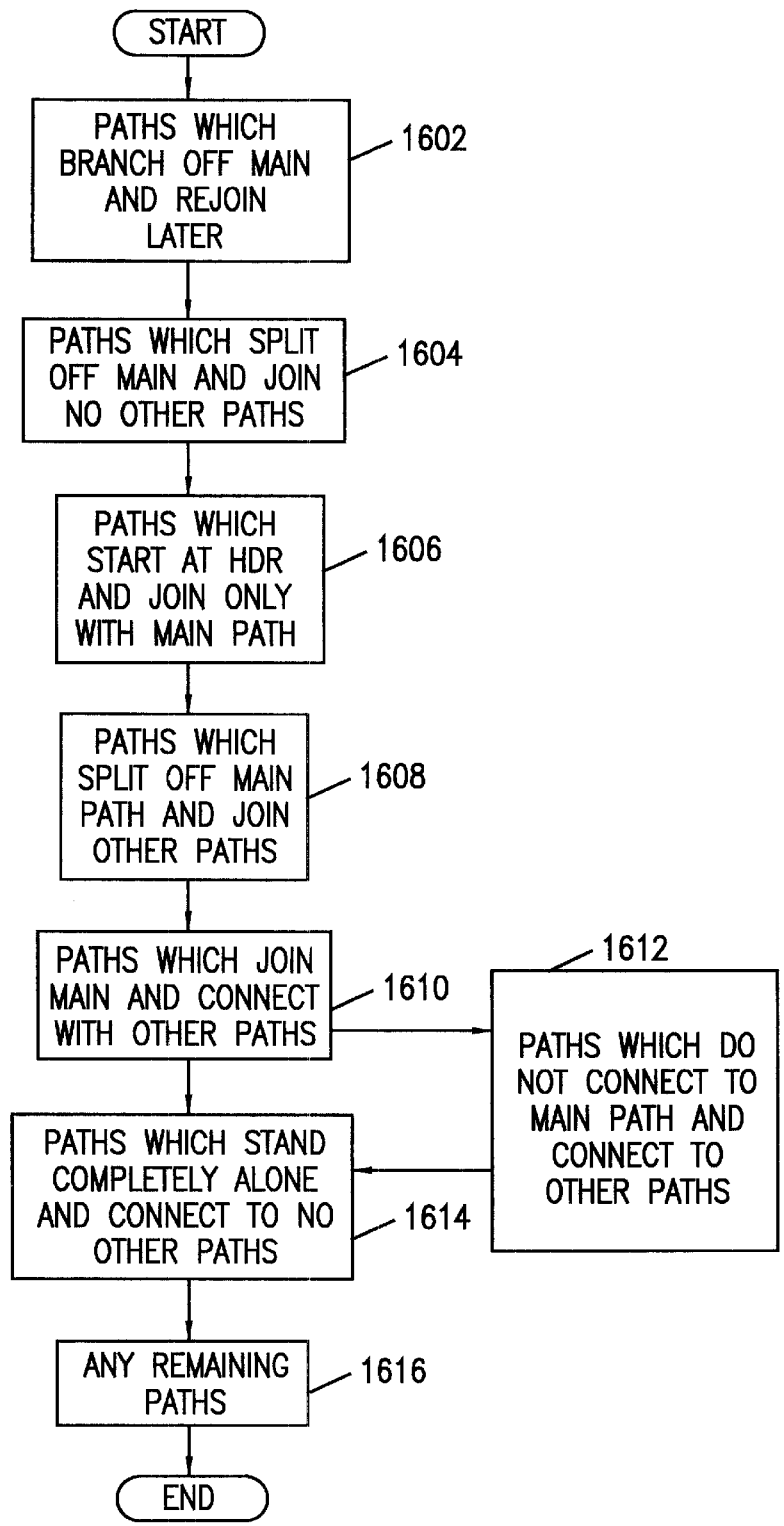

The final step of presentation phase 504 is step 1412 in which the horizontal positions of all paths other than the main and longest paths are allocated in such a way as to minimize the number of connecting lines between events which would cross one another. As shown in FIG. 16, allocating the positions of these paths is preferably accomplished by analyzing the path map and searching for certain predictable categories of paths and path segments based on their relationship to the main path determined above. As these paths and path segments are found, they will be located alternately on the output diagram to the left and right of the main path to balance the appearance of the final output.

The general layout of the final output diagram involves placing the main path in the center of the output diagram and placing the remaining path segments to the right and left of the main path. As used herein, "placing" a path or path segment means either determining the relative location of the path or path segment on the output medium or actually depicting its representation on the output medium. Events will be represented by event symbols on the output diagram and the relationship between events may be represented by connecting lines between events, adjacency of event symbols or by other appropriate depictions. The output diagram may be conceptually divided into a number of vertical columns spaced at a horizontal distance away from each other as desired based on the size and shape of the event indicators chosen for the output diagram and the width of the output medium. After the main path is placed, each path segment processed in the presentation phase 504 is generally placed in a column further away from the main path than the path segments processed before it. Each path segment will be assigned a column number representing a particular column of the output medium.

One method for separating the path segments to be placed to the left of the main path from those to be placed to the right of the main path is to assign odd column numbers to path segments to be placed to the right of the main path and even column numbers to path segments to be placed to the left of the main path. These column numbers are preferably stored in the respective PECBs in the path map comprising the processed path segment. The column numbers will ultimately be used to place the event data on the output diagram and to assist in drawing connecting lines as required between sequential events on the output diagram.

The readability and understandability of the output diagram may be greatly enhanced by choosing the placement of path segments so as to eliminate, as much as possible, connecting lines which cross through other path segments (including their event symbols and connecting lines) on the output diagram. One method for achieving this is to create a path segment plot table data structure for allocating the path segments comprising the output diagram to the left and right sides of the main path. The plot table preferably contains an entry for each path segment to be placed on the output diagram. Each plot table entry preferably includes the column number assigned to the associated path segment, the start location of the first event of the path segment, and the end location of the path segment. The end location is generally defined as the start location of the last event in the path segment plus the event duration of the last event of the path segment. As each path segment is processed, its placement on the output diagram to the left or right of the main path depends on the path segments previously processed, which can be readily ascertained from the plot table.

It may be possible to allocate more than one path segment per column on the output diagram where the path segments do not overlap each other in the time dimension. For example, if one path segment ended at a time of 10.0 and second path segment began at a time of 12.0, these two path segments could be placed in the same column without overlap. Allocating non-overlapping path segments in this manner allows the information presented in the output diagram to be placed more densely in a given area of the output medium. In particular, the quantity of information displayed in a given column of the output diagram is increased. In some cases, this increase in information density may make the output diagram more readable, while in other cases too much information might be placed on a particular page or screen of the output medium thus hampering ready understanding of the relationship of the events depicted. The decision as to whether to depict more than one path segment in a particular column of the output diagram for a particular output diagram should be based on these countervailing considerations and on the specific data to be depicted.

The output diagram generally comprises event symbols and connecting lines. Connecting lines will be depicted on the output diagram between event symbols to show the sequential relationship of the depicted events to one another. Likewise, connecting lines will be drawn between various path segments (sequential groups of connected events) on the output diagram to show how sequences of events transpire from one path segment to another. The connecting lines between events within a path segment are generally drawn vertically downward from one event to the next event on the output diagram in the time dimension. Connecting lines between path segments are generally drawn directly left or right to the beginning or from the end of the connecting path segment. In most cases, a connecting line will exist at the end of the path segment connecting it to another path segment. However, it may also be the case that a connecting line is drawn from an event within a path segment to another path segment. That is, there may be more events, and consequently more PECBs in the path map, following an event from which a connecting line is drawn which have the same path number and column number such that they will be placed immediately below the event in question on the output diagram. In such cases, it will be necessary to draw a short connecting line either left or right of the event in question before drawing the connecting line in the vertical dimension to the remaining event symbol or symbols for the currently processed path segment.

When selecting the appropriate side of the main path to position a new path segment, it is preferable to determine whether the connecting line to and/or from a path segment can be drawn directly to the point to be connected, or if the connecting line might pass through a path segment which has already been placed on the output diagram. This can be determined by checking the data in the path segment plot table data structure described above.

In particular, if the location of the connecting line lies between the start and end locations of any path segment on one side of the path map, the connecting line would have to be drawn through that path segment. This would be undesirable because it would present overlapping and convoluted paths on the output diagram which would impair the readability and understandability thereof. To prevent such a result, the path segments on the other side of the main path are checked. If the connecting line would pass through a path segment on the other side of the main path as well, a left/right preference indicator is checked to see where the next path segment should be placed to balance the depicted path segments on the left and right of the main path. Each time the left/right preference indicator is used, it is "flipped" to indicate the opposite preference for the next time it is checked. For example, if the left/right preference indicator currently indicates "left" and is then used to place a path segment, it is flipped to "right" after such use. The new path segment is placed on the preferred side indicated by the left/right preference indicator by creating an entry in the path segment plot table with the next column number for that side and the start and end locations for this new path segment. If connecting lines for this path segment are still blocked by path segments on both side of the path map, then a special connecting line or other symbol would preferably be used to indicate the connection across a path segment on the output diagram.

As shown in FIG. 16, the horizontal location determination 1406 preferably begins with a step 1602 in which paths which split from the main path and later merge with the main path are located. This type of path segment will have two lines connecting it to the main path on the output diagram and therefore should be handled first in order to have access to the most free space available on the output diagram to draw the connecting lines. This type of path segment is also most likely to have a close relationship to the logic of the main path itself, and it is therefore preferable to position this path close to the main path for ease of comparison. These path segments are found by checking each PECB on the main path to determine whether it has more than one forward pointer. If so, the pointer or pointers leading to PECBs not on the main path are followed to determine whether any PECB along that path segment contains a main path flag, indicating that the path segment has merged with the main path. Alternatively, the main path PECBs could be checked for the presence of more than one backward pointer, and the associated path segments not on the main path could be followed backward to determine whether any of the PECBs on such path segments contain a main path flag.

Paths which split from the main path and merge with no other paths are preferably allocated next in step 1604. These are paths which split from the main path and connect directly to the trailer PECB. This type of path segment is a highly likely occurrence. Therefore, such path segments should also be placed near the main path on the output diagram. Starting with the first main path PECB and working forward along the main path, each main path PECB is checked for the presence of multiple forward pointers. When found, the path or paths beginning with a PECB not on the main path are followed forward until the trailer PECB is reached or another PECB with multiple forward pointers is found. If the trailer PECB is reached, then a desired path which splits from the main path and joins no other paths has been found, and this path is added to the output diagram. If instead multiple forward pointers are found, then this path is not selected at this time because it has other branches and is reserved for processing in another step. It should be understood that, although paths are checked in a forward manner in step 1604, both forward and backward checking is needed as part of the overall processes used to identify all paths.

The next paths to be located in step 1606 are those which begin at the header PECB and merge with the main path only. These paths merge with the main path and connect to no other paths. Using the forward pointers in the PECBs, each path leading from the header PECB is followed forward. If any element on the path has multiple forward pointers, the path is skipped in this phase and will be processed later. If a main path element is found on the path being followed, the path is selected for processing at this time.

The next paths selected for processing are those which split from the main path and merge with paths other than the main path as determined in step 1608. The main path is followed forward from the header PECB as described above with respect to steps 1602 and 1604. When a main path PECB with multiple forward pointers is found, the pointer or pointers to a path segment not on the main path are followed forward. This path segment or these path segments will have a path number different from the main path. These paths which split from the main path are followed forward, and if a PECB is reached which has yet a different path number from that being followed, then this indicates that the path segment being followed has merged with another path. Once such a path segment has been identified, it is advantageous to process all path segments connected to this one which have not yet been processed before searching for another segment relating to the main path in order to keep all interconnected paths on the same side of the main path on the output diagram to reduce crossing connection lines between events.

Likewise, paths which split from paths other than the main path and later merge with the main path are processed in step 1610. These paths are located and processed in the same manner as those described in step 1608, with the exception that main path PECBs with multiple backward, instead of forward, pointers are located to find where such paths may merge with the main path, and these paths are followed backward in an attempt to determine whether they split from paths other than the main path. As with the paths identified in step 1608, all path segments connected with this type of path identified in step 1610 should be processed at this point so as to group these paths on the same side of the main path in the output diagram to minimize connection lines drawn through the main path itself on the output diagram.

Paths which have no connection to the main path but do connect to other paths are next processed in step 1612. As these paths have no relationship to the main path, they can be processed in any order. However, these paths should be grouped together on the output diagram with the paths to which they connect to minimize the crossing of connection lines on the output diagram.

Paths which do not connect with the main path or to any other paths are then processed in step 1614. These paths begin at the header PECB and proceed forward and connect only with the trailer PECB. These paths have no other branch points, and therefore each PECB in such a path has only one forward and one backward pointer. Since these types of paths are not related to any of the other paths on the path map, they are preferably placed on the output diagram near the outside or edge of the display area as there will be no connections from these paths to any other paths on the diagram.

Finally, each PECB is checked in step 1616 to ensure that it contains a column number indicating that it has been processed in one of the steps above. Any PECBs or paths not already processed are processed at this stage. Once all PECBs have been processed as described above, presentation phase 504 is complete, and the final output component 108 may be executed.

FIGS. 19A–19I illustrate an example of the determination of horizontal positions for the event data on the output diagram in accordance with step 1406 shown in FIG. 14 and the processing illustrated in FIG. 16. FIGS. 19A–19I include path maps which are depicted in a manner similar to those shown in FIGS. 18A–18FF above. It should be noted that some of the path maps of FIGS. 19A–19I correspond to portions of the path map of FIG. 18FF; however, many of the path maps shown in FIGS. 19A–19I differ from the path map 1801 of FIG. 18FF in order to illustrate processing of categories of path segments not shown in path map 1801. Accordingly, new reference numerals will be used for the PECBs of the path maps shown in FIGS. 19A–19I to avoid confusion.

FIGS. 19A–19I also include output diagrams displayed in one particular presentation format. Specifically, events are represented by rectangular event symbols, each of which has a length related to the event duration for the represented event and a width related to the event count for the related event. Within each rectangle, the event type is shown as well as the relative dimensions of the rectangle in the format "length (event duration) x width (event count)". Events are displayed sequentially in the vertical time dimension wherein time increases in the downward direction of the output diagram. Sequential events in a given path segment share adjacent lower and upper rectangle sides. Alternatively, connecting lines between the events within a path segment could be used. Path segments are connected to one another by connecting lines drawn as arrows drawn from the bottom side of the rectangle representing the first event in the sequence to the top side of the rectangle representing the second event in the sequence. The information shown in each rectangle in the output diagrams of FIGS. 19A–19I is provided merely to show how the events in connecting lines may be placed on a sample output diagram. Different labeling and information would generally appear in an output diagram in practice. Moreover, a variety of shapes and symbols may be used to represent the events and the connections between them in an output diagram.

Figure 19:
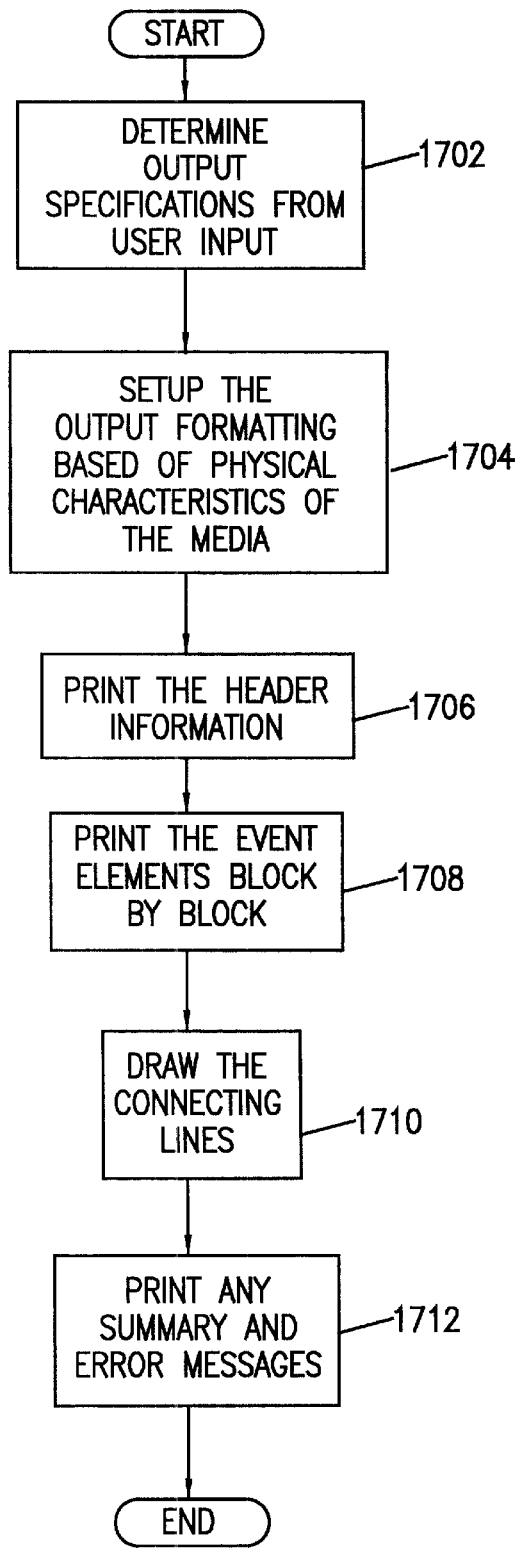
FIG. 19 is a flowchart of setup and output functions.
Figure 19A:
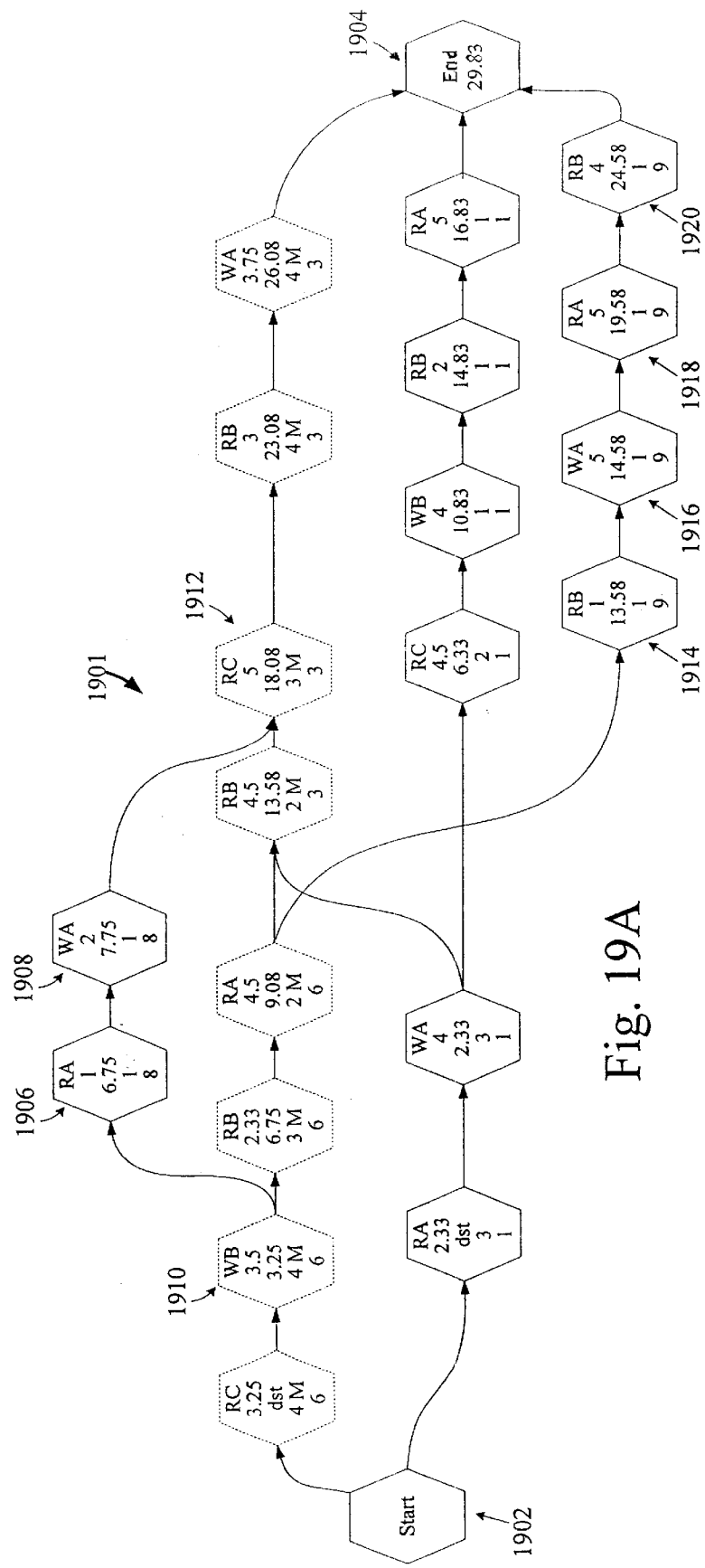
FIGS. 19A–19J are path maps generated by a computer program profiler constructed in accordance with the present invention.

Referring now to FIG. 19A, a portion of a path map 1901 containing information to be plotted in an output diagram is shown. Events on the main path are identified with the letter "M" in each PECB on the main path. The main path events would first be placed vertically in the center of the output diagram. Processing other path segments on the path map 1901 in accordance with the order generally disclosed in FIG. 16, path segments which split from the main path and later rejoin the main path are first selected for processing. Such a path segment is found in path map 1901 at PECBs 1906 and 1908 which split from the main path after PECB 1910 and later rejoin the main path at PECB 1912. A path segment plot table entry is created for this selected path segment containing the start point of the path segment, 6.75, and the end point of the path segment, 7.75+2 or 9.75, and a column number. In this example, the selected path segment is arbitrarily placed on the right side of the main path on the output diagram, and it is determined that odd column numbers will be used for path elements on the right side of the main path while even column numbers will be used for path segments on the left side of the main path. The resulting plot table entry for this path segment could be represented as follows:

| Col. | Start | End |
|---|---|---|
| 1 | 6.75 | 9.75 |

After the plot table entry is created, the left/right preference indicator should be set. Since it was arbitrarily chosen to place this path segment on the right side of the main path, the next path segment should be placed on the left side if it fits in order to balance the appearance of the final output diagram. Accordingly, the left/right preference indicator is set to "left".

Figures 19B, 19C:
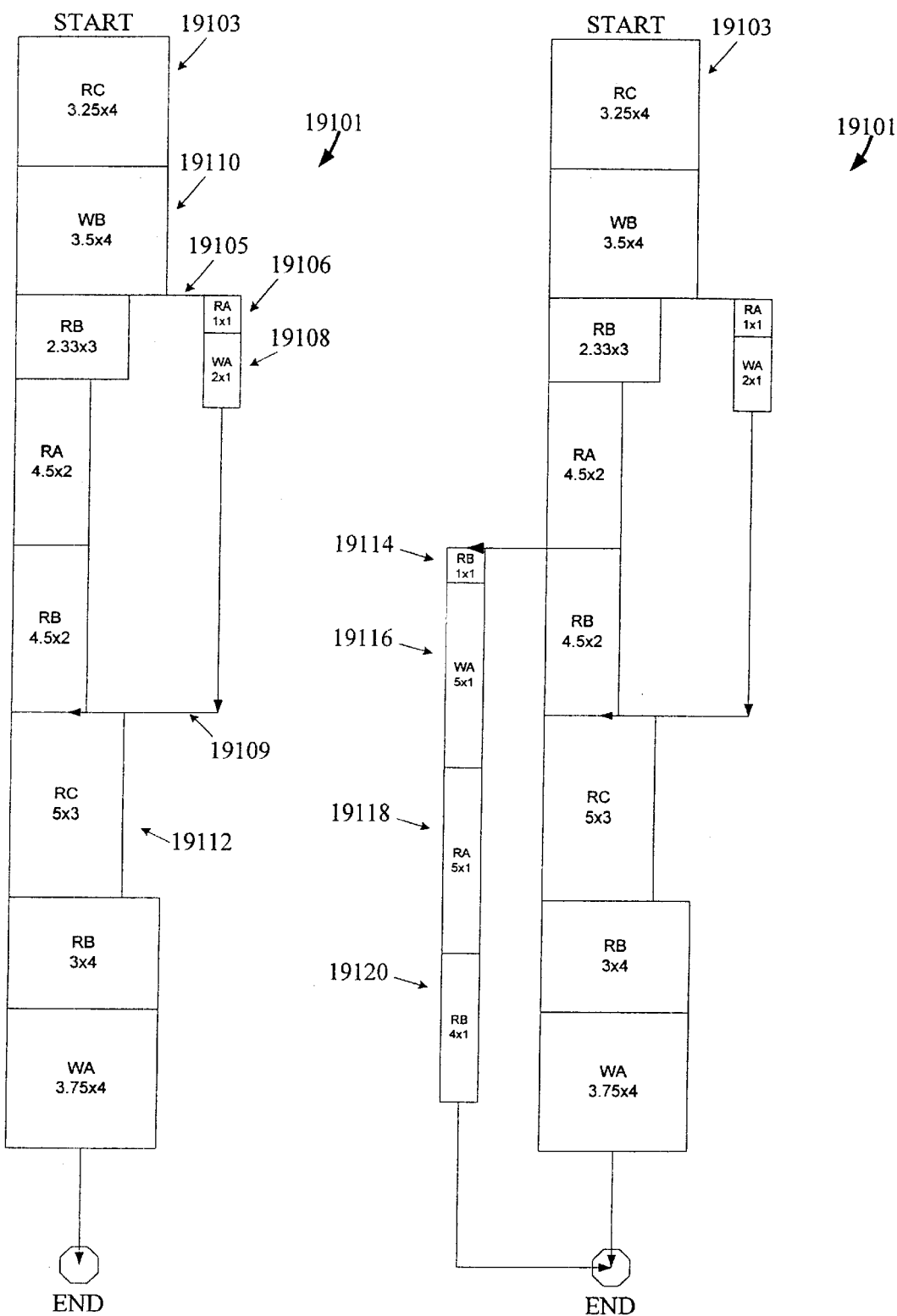
Figure 19D:
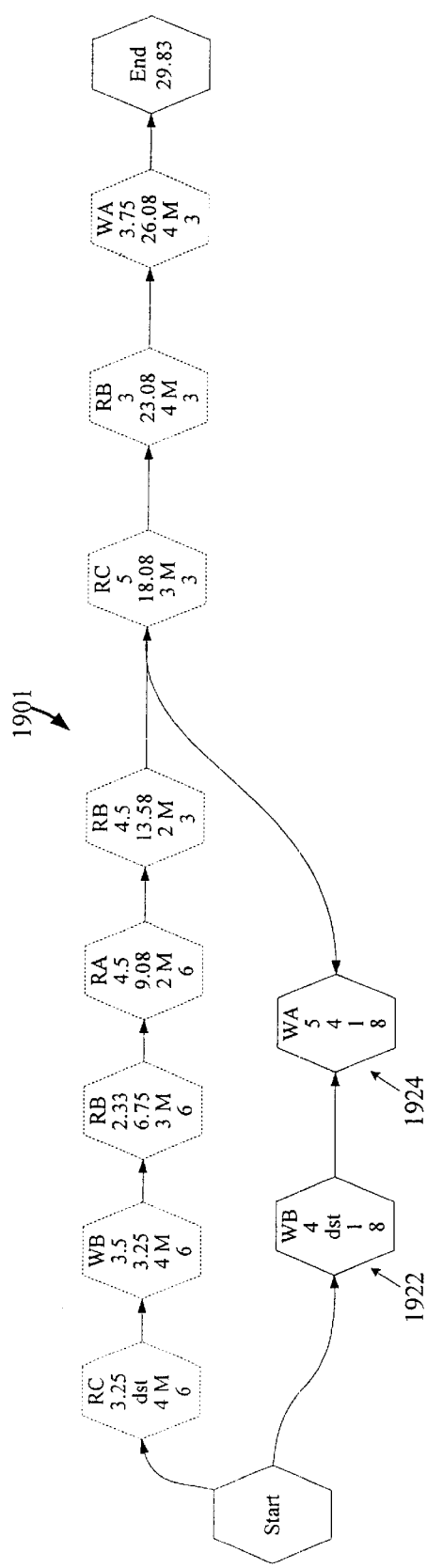

FIG. 19B shows how an output diagram 19101 for path map 1901 might look after plotting the main path and the path segment represented by PECBs 1906 and 1908. The main path events are shown in a vertical column 19103 of adjacent event symbol rectangles in the center of the diagram. The path segment represented by PECBs 1906 and 1908 is shown by two vertically disposed, adjacent event symbol rectangles 19106 and 19108 positioned in a column on the right side of the main path 19103. The sequential relationship of the path segment of 19106–19108 to the main path 19103 is indicated by the connecting lines 19105 and 19109 which indicate that this path segment is preceded by event 19110 and followed by event 19112.

As shown in step 1604 of FIG. 16, path segments which split from the main path but do not merge with the main path and merge with no other path are processed next. Referring again to FIG. 19A, the path segment represented by PECBs 1914, 1916, 1918 and 1920 comprises such a path segment. The locations for the connecting lines to this path segment from the main path is compared to the data contained in the path segment plot table. The connection location for a path segment is the same as the start location of the first PECB in the path segment. In this example, the connection location for the selected path segment is 13.58. The connecting line from a path segment is the same as the end location for the path segment, which is the sum of the start location and event duration of the last PECB in the path segment: 28.58 in this example. The data in the plot table shows that the currently selected path segment does not overlap with any path segment in the plot table. In fact, this path segment could be placed in Column 1 since it does not overlap with the path segment already placed therein. Nevertheless, for purposes of this example, this most recently processed path segment is assigned a new column. Using the left/right preference indicator, which currently indicates "left", the new path segment is placed to the left of the main path using the next available even column number (2) to so indicate. The resulting plot table now might appear as follows:

| Col. | Start | End |
|---|---|---|
| 1 | 6.75 | 9.75 |
| 2 | 13.58 | 28.58 |

The left/right preference indicator should then be flipped. The resulting output diagram could then be displayed as shown in FIG. 19C in which the new path segment is represented by the depicted events 19114, 19116, 19118 and 19120, which are all placed in a new column to the left of the main path 19103.

As shown in step 1606 of FIG. 16, path segments which merge with the main path but connect to no other paths are preferably processed next. These paths are identified in the path map as originating directly from the header PECB and later merging only with the main path. An example of such a path is shown by PECBs 1922 and 1924 in FIG. 19D. The path segment plot table entry for this selected path segment, assuming that the default start time DST is 0 and that no other path segments (aside from the main path) have yet been processed, would be as follows:

| Col. | Start | End |
|---|---|---|
| 1 | 0 | 9.00 |

Figure 19E:
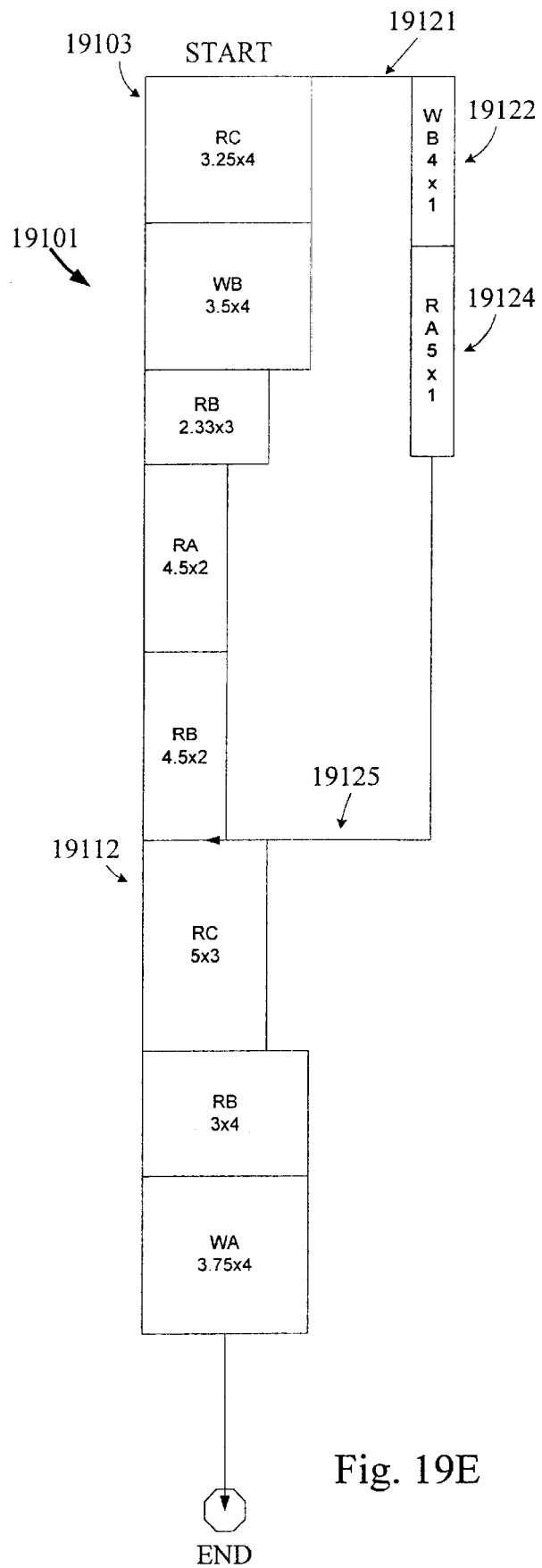

The resulting output diagram 19101 could be drawn as shown in FIG. 19E in which event indicators 19122 and 19124 represent the newly processed path segment. Connecting lines 19121 and 19125 indicate that this new path segment is a beginning path segment and merges with the main path immediately prior to event 19112.

As shown in step 1608 of FIG. 16, path segments which split from the main path and merge with path segments other than the main path are preferably processed next. Such a path segment is shown by PECBs 1926 and 1928 in FIG. 19F. This type of path segment complicates the output diagram, and it is preferable to group all paths related to such path segments on the same side of the main path to reduce any crossing of connection lines on the final output diagram and to thereby improve the readability and understandability thereof. The path segments processed in step 1608 are identified by locating a main path PECB with multiple forward pointers and following the pointers to PECBs not on the main path. The path number of the first PECB on such a path segment contains a path number not on the main path. If, while traversing this path segment forward, PECBs with still another path number are found, then this path segment has merged with another path and consequently should be processed in accordance with step 1608.

Figure 19F:
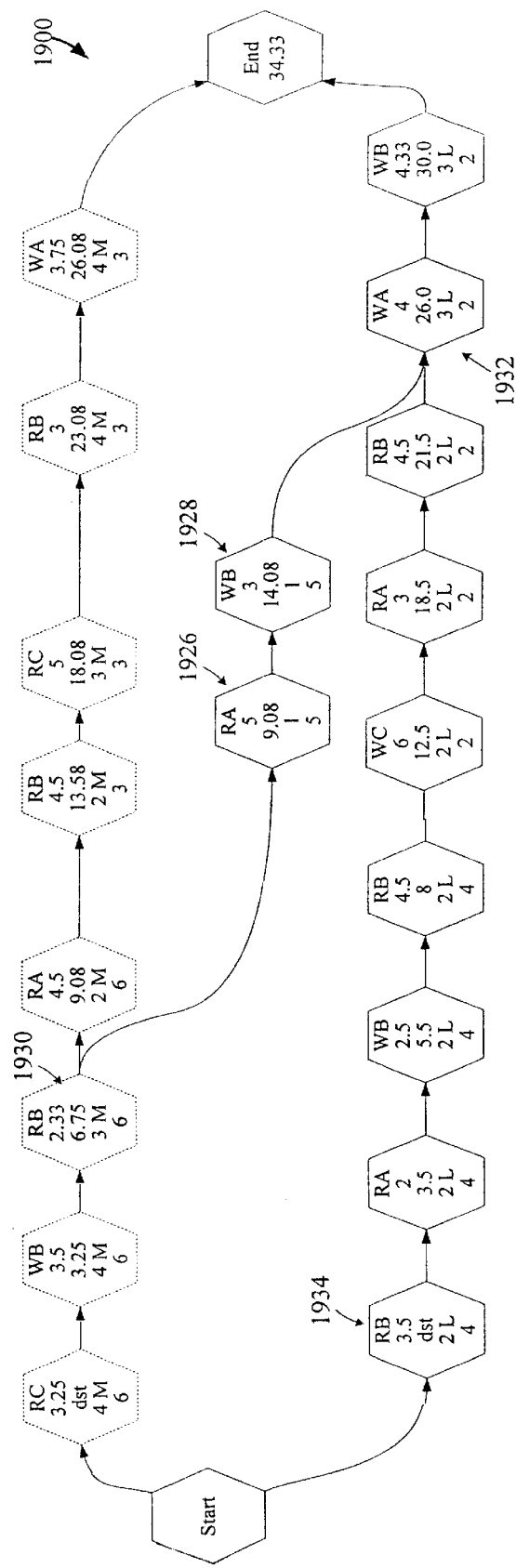

For example, as shown in FIG. 19F, PECB 1930 is a split point on the main path having multiple forward pointers. Following the path segment beginning with PECB 1926, the path number has changed from 6 to 5. Following the path forward, the path number changes again to 2 when PECB 1932 is reached, thus indicating that PECBs 1926 and 1928 split from the main path and merge with another path. A path segment plot table entry could be created for this path segment as follows:

| Col. | Start | End |
|---|---|---|
| 2 | 9.08 | 17.08 |

In order to keep the path that this path segment merges with (which begins with PECB 1934) on the same side of the main path as described above, it is preferable to process that path (beginning with PECB 1934) next, even before processing other paths of the category identified by step 1608. The resulting plot table would appear as follows:

| Col. | Start | End |
|---|---|---|
| 2 | 9.08 | 17.08 |
| 4 | 0 | 34.33 |

Figure 19G:
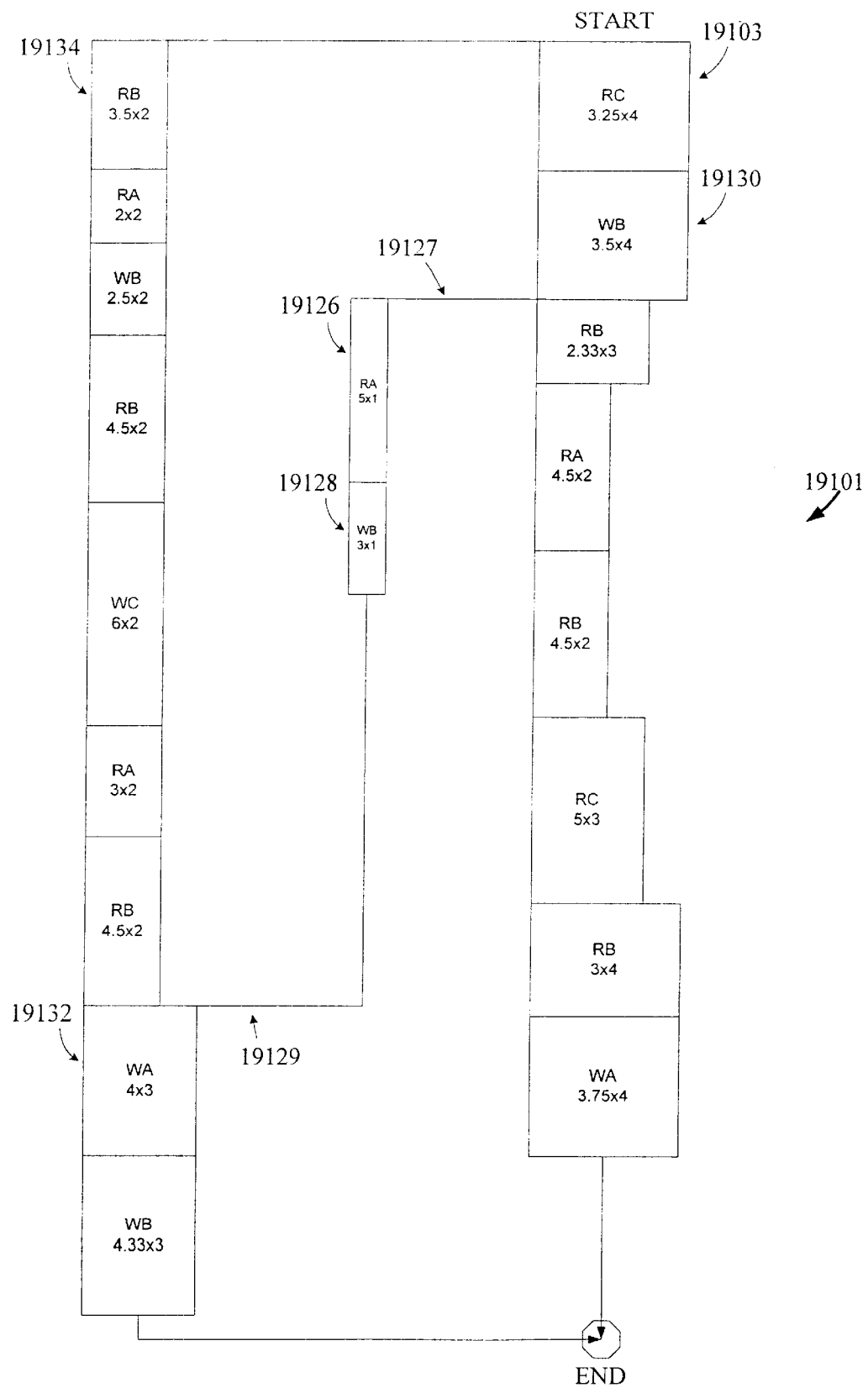

The output diagram for the path map shown in FIG. 19F could be drawn as shown in FIG. 19G. The path segment which splits from the main path and merges with another path is identified by event symbols 19126 and 19128 and is positioned in a first column to the left of the main path 19103. This path segment splits from the main path 19103 after event symbol 19130 as shown by connecting line 19127. The path beginning with PECB 1934 is displayed in a second column to the left of the main path 19103 beginning with event symbol 19134. The path segment which merges with this path after splitting from the main path does so immediately prior to event 19132 as indicated by connecting line 19129.

As shown in step 1610 of FIG. 16, path segments which merge with the main path and have connections to other paths not on the main path are preferably processed next. Such a path segment is shown by PECBs 1936 and 1938 in FIG. 19H. These paths may begin at an alternate starting point or are themselves branched to by other paths. As with the previous category of path segments, it is preferable to group together all of the path segments related to this type of path segment on the same side of the main path to enhance the readability and understandability of the output diagram by preventing connecting lines from being drawn through the main path. Thus, a path segment plot table entry for the path segment represented by PECBs 1936 and 1938 is created first, and a path segment plot table entry for the path beginning with PECB 1934 and ending with PECB 1940 is created next. The resulting plot table might appear as follows:

| Col. | Start | End |
|---|---|---|
| 2 | 8.00 | 16.00 |
| 4 | 0 | 34.33 |

Figure 19H:
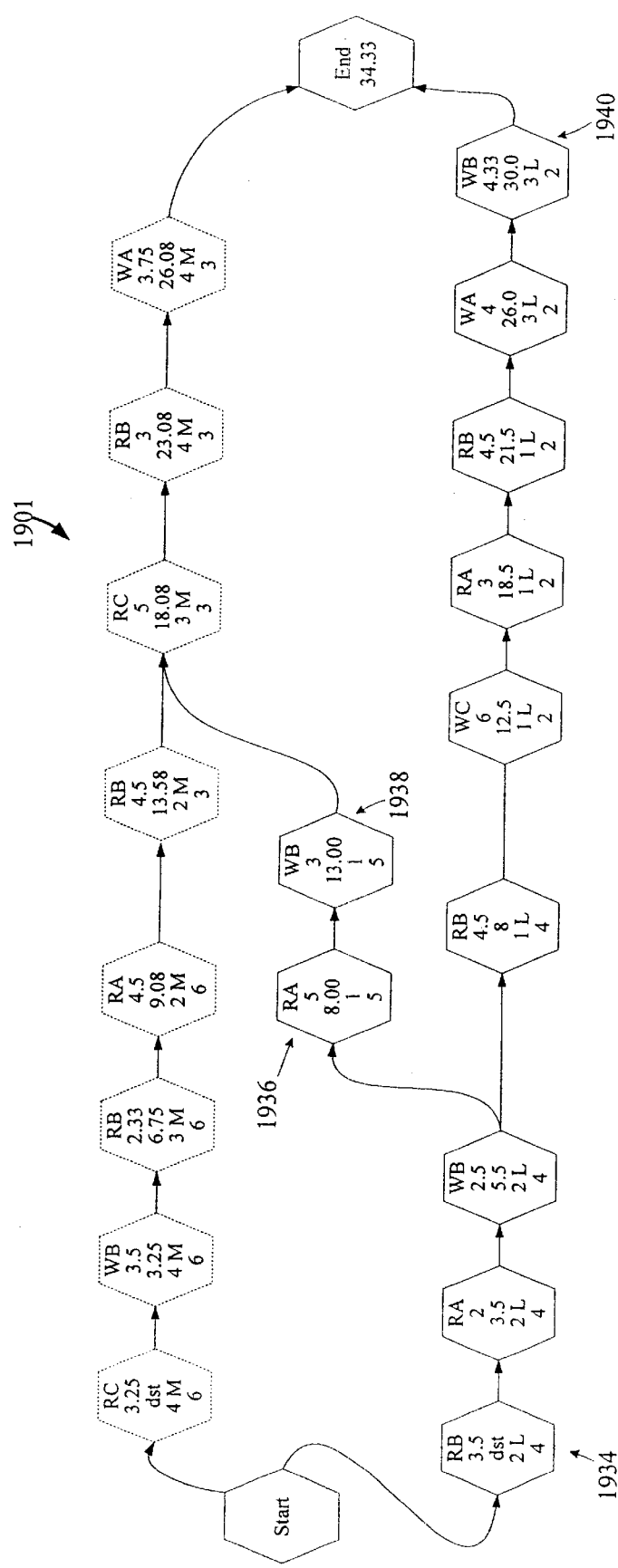
Figure 19I:
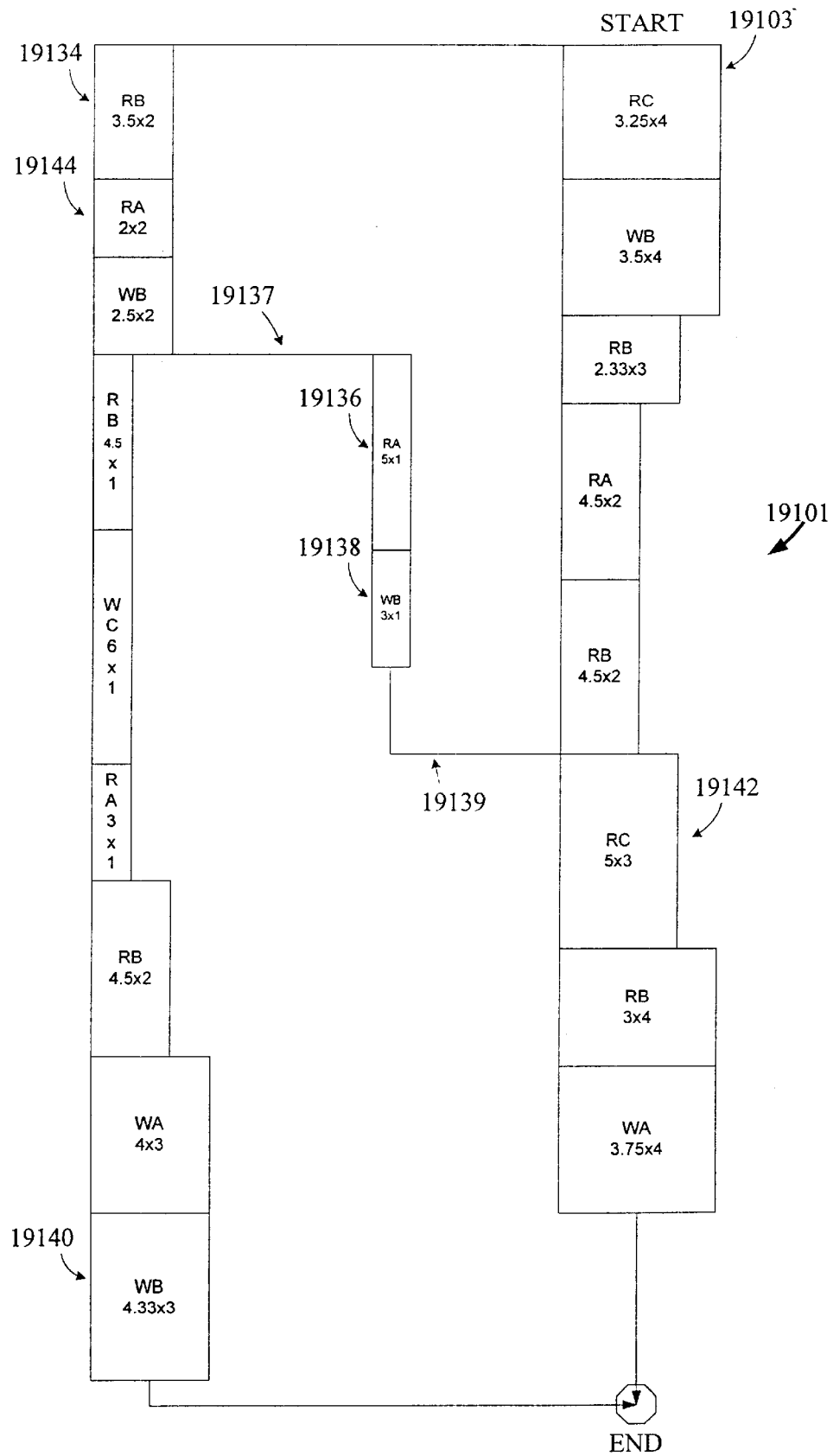

The output diagram for the path map 1901 shown in FIG. 19H could be drawn as shown in FIG. 19I. The path which merges with the main path 19103 is shown in a first vertical column to the left of the main path 19103 and comprises event symbols 19136 and 19138 and merges with the main path 19103 immediately prior to event 19142 as indicated by connecting line 19139. The related path beginning with event symbol 19134 is shown in a second column to the left of the main path 19103 and splits after event 19144 to the path shown in the first column to the left of the main path 19103 as indicated by connecting line 19137.

Figure 19J:
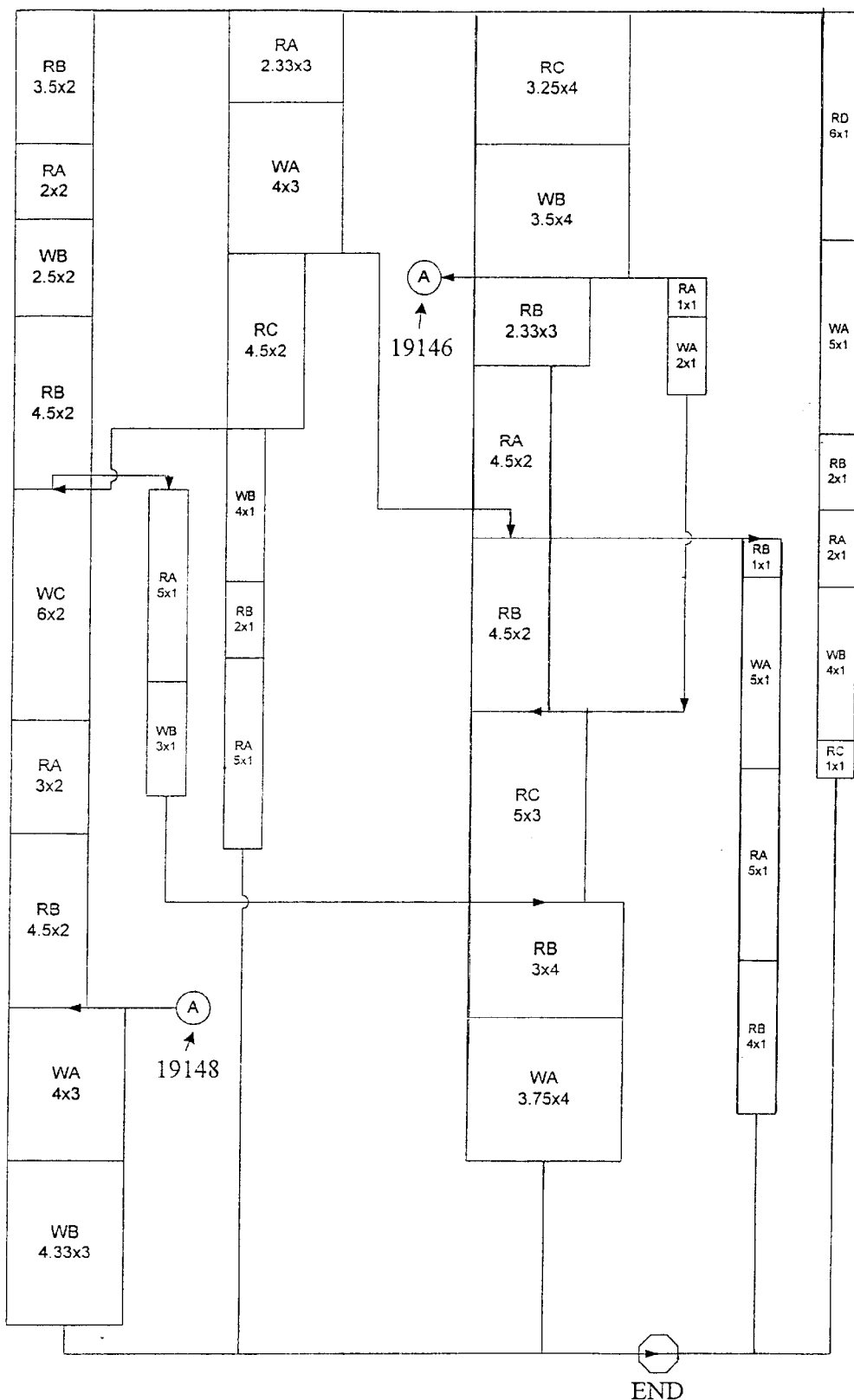

An output diagram depicting the path map shown in FIG. 18FF is shown in FIG. 19J.

Figure 17:
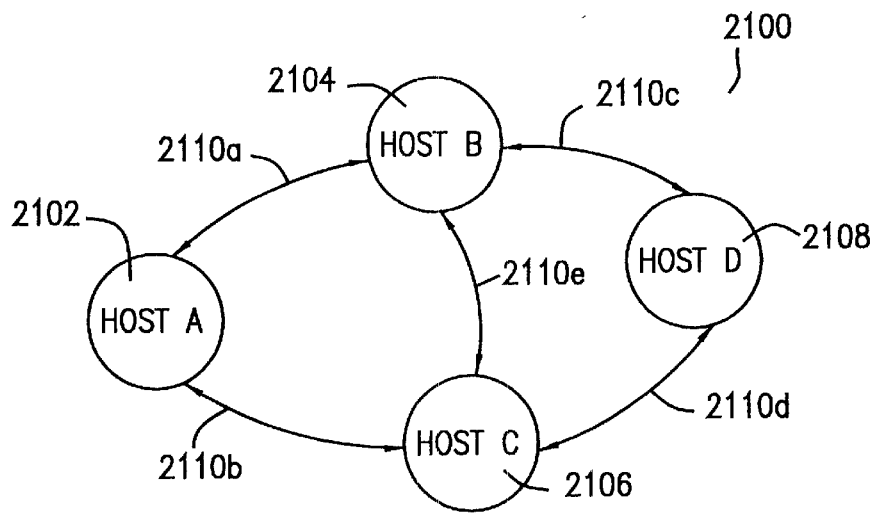

The preferred sequence of steps for performing the output component 108 is shown in FIG. 17. Because the presentation of the output on the physical output medium is partly dependent on the characteristics of that medium, the first step of the output component 108 typically is to determine the specifications of the output medium as shown in step 1702. For example, if the output medium is paper which will be printed upon by a printer attached to the computer embodying the invention, the specifications might include the dimensions of the paper, the printer type or make and model, the characteristics of the fonts available for use on the printer, etc. These specifications are typically specified by the user but may be obtained from other sources, such as configuration files stored on the computer embodying the software running the output component 108.

After the output characteristics are defined, the output data calculated in the analysis phase 504 is further modified by the given media characteristics in step 1704. At this point, any scaling necessary to relate the output diagram to the dimensions of the physical medium is performed. The data necessary to plot each event on the output diagram exists in each PECB in the path map. However, the output data for each event exists in raw form and must be scaled to the dimensions of the physical output medium chosen by the user, such as the dimensions of paper on which the output diagram is to be printed if the user desires a paper copy of the output diagram. In particular, it is preferable in many cases, especially when the output is to be printed, that the length and width of each path element (representing each event or loop event) be related to "point" sizes for output processing. Point sizes are a standard printing convention wherein each point represents $1/72$ of an inch.

The first dimension represented on the output diagram is the time dimension. The time dimension is preferably displayed vertically on the output medium with time increasing from the top to the bottom of the output medium, although the time dimension may instead be displayed in other orientations, such as horizontally, for example. Each succeeding event is displayed below its immediate predecessor. The length of the longest path, as determined above in step 1404 and stored in the trailer PECB, is preferably used to determine the overall length of the time dimension to be shown.

It will also be necessary to scale the output diagram to ensure that the shortest event duration is visible on the output diagram. For example, a minimum length of at least one quarter of an inch may be specified as a length for the shortest event duration. Dividing the shortest average event duration of all the PECBs on the path map into the total time consumed by the longest path and dividing by four thereby yields the length of the longest path in inches on the output diagram. The result of this calculation can be used to determine whether the longest path will span more than one page (if printed output is specified) or screen (if video display is specified). If more than one page or screen is required, the time location of a breakpoint between such pages or screens must be maintained to properly determine which events will appear on which page or screen. A separate symbol or other indication may be necessary to identify a connection between events on different pages or screens.

The second dimension shown on the output diagram corresponds to the event count for the depicted events, or the number of times each event was executed in all of the recorded transactions. Where the time dimension is displayed in the vertical dimension of the output medium, this second, event count dimension is preferably displayed in the horizontal dimension of the output medium. There are two steps in scaling the information in the event count dimension.

First, the width of each event symbol (when the event count is shown in the horizontal dimension) depicting a recorded event must be related to the event count for that event. A maximum width is chosen for any event symbol based on the specifications of the output medium as determined in step 1702 of the output component. For example, a maximum event symbol width of one-half of an inch might be chosen. Although not necessary, start and end event symbols are preferably depicted on the output diagram denoting the beginning and end of the time dimension represented in the output diagram. These start and end symbols may be related to the header and trailer PECBs in the path map. Accordingly, the start and end symbols, if used, would have the greatest event counts of all event symbols on the output diagram and, in particular, would each have an event count equal to the number of transaction occurrences recorded. Accordingly, in the instant example, these start and end symbols would be set to the maximum width of one-half of an inch. The width of every other event symbol to be depicted on the output diagram, each of which corresponds to exactly one PECB on the path map, is calculated as a fraction of the maximum width based on the ratio of the event count of the event to the total number of recorded transaction instances. For example, if a particular event was found to have an event count of 2, and 8 total transaction instances had been recorded, the width of the event symbol for this event would be one-quarter of the maximum width chosen for the event symbols, or one-eighth of an inch in the example described above.

The second step for scaling the event data information in the event count (and, in this example, the horizontal) dimension is to determine the position of the columns allocated for each event in step 1406 on the output medium. A minimum column spacing between adjacent columns is preferably set. The minimum column spacing is based on the maximum width of all the event symbols to be depicted on the output diagram (except for the start and end symbols, if any), the space needed to draw connecting lines in the direction of the time dimension between columns, and any space necessary to print desired text describing the event data. The text spacing will be based on the font size used as determined in step 17 of text. The arrangement of the columns can then be determined based on the minimum column spacing, the number of columns of data to be depicted (which may be determined from the path map or the path segment plot table data structures) and the width of the physical media.

If the media width is greater than the sum of the column space required, the columns may be further adjusted to be spaced farther apart and to thereby make maximum use of the media as desired. If, however, the media width is less than the sum of column space required, the output diagram must be divided into multiple pages of screens of the output media in the event count dimension. This may be accomplished by, for example, selecting one or more pages to represent the event data to be placed to the left or right of the main path as necessary. For example, if two output media pages are necessary to depict the event count dimension, a first page could be used to depict the columns placed to the left of the main path and a second page could be used to depict the columns placed to the right of the main path. The main path is preferably included on both such pages near the right or left edge thereof. Where multiple pages are also required to represent the time dimension, it is preferable to print all pages in sequence for the events on one side of the main path first, and then to print all remaining pages in sequence to depict the events plotted on the other side of the main path.

Figure 20:
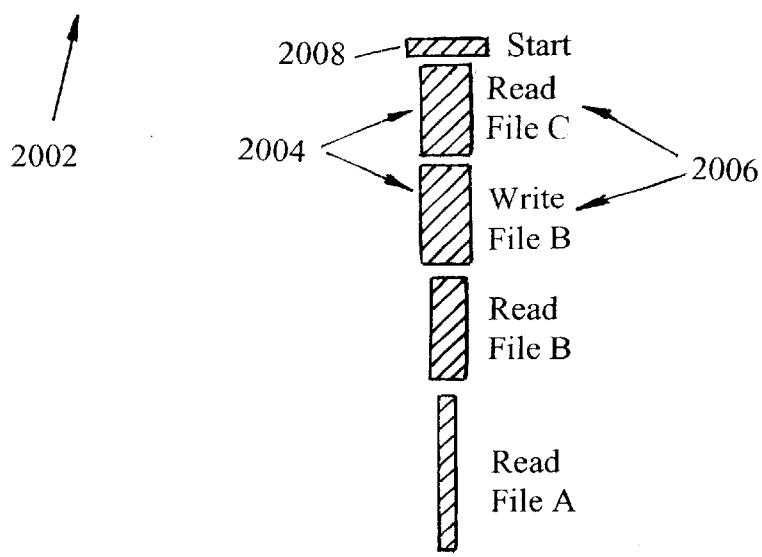
FIG. 20 is an output diagram generated by a computer program profiler constructed in accordance with the present invention.

After scaling has been performed the actual output begins in step 1706 by printing header information 2002 on the output medium, preferably at or near the top thereof as shown in FIG. 20. This header information is not necessary but may be output to provide useful information about analyzed transactions, such as the time period specified for analysis, the number of events executed within that time period, the date of the report, a page number, etc.

The event-specific data is then plotted on the output medium for each event recorded for the analyzed transaction in step 1708. The output diagram will usually contain a combination of graphics and text. The output process for the event data preferably proceeds by specifying planar coordinates for each item (such as an event symbol, associated text, or a connecting line) on the output medium. The average event duration and event count for each event may be displayed as an event symbol having a width corresponding to the event count and a length corresponding to the average event duration. The placement of the event symbol is determined by its start location and column allocation previously calculated and stored in the PECB representing the event in the path map. Since each event represented in the path map was allocated a start location based on the latest value of its start time, all connecting lines can be drawn forward through the time dimension (in the present example, downward through the output medium) and either to the left or to the right to connect with other event symbols.

Each PECB in the path map contains sufficient data to specify its placement on the output diagram. The scaling factors determined earlier are now applied to the data in the PECBs, and the event represented by each PECB may now be plotted on the output medium as an event symbol based on the data in that PECB. The PECBs of the path map may be processed in any order since each PECB contains all of the data necessary, in combination with the scaling factors and output medium characteristics as described above, to plot the event represented by the PECB on the output diagram. The start location and average event duration fields of the PECBs are used to determine the vertical coordinates of the event symbols. The column identifier and event count fields are used to determine the horizontal coordinates of the event symbols. Each PECB is preferably marked with a completion indicator after the event which it represents has been placed on the output diagram.

As described above, event symbols plotted in the same column on the output diagram are preferably depicted adjacent to one another in the vertical dimension to show their sequential relationship, and connecting lines are preferably drawn only to show the sequential relationship among path segments plotted in different columns of the output medium. The pointers in the PECBs of the path map are used to determine if a connecting line is to be drawn from the currently processed event symbol to an event symbol in another path segment or column of the output diagram. For example, if the PECB pointed to by the forward pointer of the current PECB has a different column identifier than that of the current PECB, or a start location greater than the end location (the start location plus the average event duration) of the current PECB, then a connecting line must be drawn on the output diagram. If the column identifier in the next PECB is the same as that for the current PECB, then the event symbol for the next PECB will be plotted in the same column below the event symbol for the current PECB. It should be noted that in some instances where more than one choice exists for including a path segment on the main path, the decision as to which path segment to include was preferably based on the event count for the events in the path segments in the path segment, with the path segment having the greatest event count being chosen. This could lead to event symbols on the main path of the output diagram which are not adjacent to one another. In such a case, a connecting line may be required between event symbols even on the main path itself.

While traversing the path map to plot the event data, multiple forward pointers will generally be found to exist in certain PECBs. When a multiple forward pointer PECB is selected, if the column number of the PECB pointed to by one of the multiple forward pointers is the same as the column number for the selected PECB, then the event symbol for that next PECB is displayed below that for the current PECB. If the column number is not the same, a short connecting line should be drawn to the left or the right of the event symbol for the current PECB as required and the remainder of this connecting line should be drawn as described below.

As described above, the preferred output path map is a sequence of lines of varying widths and lengths used to denote frequency of occurrence and time length of occurrence, respectively. There are a number of alternative ways that the output map can be expressed in order to effectively represent the transactional paths along with the frequency and duration data for each event.

In particular, the use of color, greyscale and shading patterns can be used separately or in combination in the output path map to distinguish frequency of occurrence data, and possible time length of occurrence data. For example, the main path can be set apart from the other paths by presenting the main path in a color other than that used for the other paths. In addition, the use of color, greyscale and shading can ease display restrictions caused by line width in producing a map containing numerous paths on a display or a printer. These presentation alternatives are particularly important and useful when the output is large and needs to be scaled to fit on one output page or display screen; techniques for which are described below.

As an alternative to altering the width of the path elements, color graduations can be used, for example, from black to red. Different frequencies or time lengths of occurrence are individually represented different colors, or are grouped within a banded range, such that each range is represented by a particular color. Color changes can also be implemented in proportion to line width or length by varying the hue at a fixed luminosity and saturation. For example, white can be used to represent the smallest value and black the largest, or violet can be used to represent the smallest value and red the highest.

As another alternative, greyscaling and/or shading can be used separately or in combination with color. Color can be used as described above on a color monitor, with the printed output being represented using greyscaling or shading.

Colors, greyscales and shading can be used to distinguish combinations of high event occurrence quantity and/or high event durations to indicate potential bottlenecks. For example, the value of event occurrences multiplied by event duration can be represented by varying colors, greyscales or shades (or combinations thereof) for values within a group of banded ranges. Using this approach, a user can quickly identify problematic areas. By setting the uppermost band to red, for example, a user is quickly alerted that the depicted event requires further attention.

As described above, the preferred method for presenting event duration data is via the length of the output path element. However, transactions spanning a long period of time may not fit onto one page and may cause the output map to extend onto multiple pages, or require a display window to be scrolled to view the entirety of the output map. The present invention overcomes this potential limitation in several ways.

The user can select from a suite of "time rulers" or customize his own. A "time ruler" defines how time should be mapped, i.e. scaled, onto the output. "Time rulers" can be linear such that one distance unit equates with one time unit, for example, inches to tenths of seconds. "Time rulers" can also be logarithmic such that the length of the event output equals:

$$Z*log(1+\text{time})$$

where Z is a scaling factor defined by the user. "Time rulers" can also be defined parabolically such that the length of the event output equals:

$$Z*(a+sqrt(b+c*\text{time}))$$

where a, b and c are parabolic constants defined by the user. Similarly, a user can select from a suite of "event rulers" or customize his own in order to scale event frequency of occurrence output. Of course, rulers are not limited to "time rulers" and "event rulers." A ruler can be created to scale any event variable being expressed vertically (time in the example described above) or horizontally (frequency of occurrence in the example described above).

The present invention also allows a user to specify a magnification factor to expand or shrink the output map to occupy an entire page or display window. The output can be scaled using a magnification factor such that one or both of the event duration (length) or the event occurrence (width) dimensions can be enlarged or shrunk.

In the case where a magnification factor is applied to a large output path map to allow it to fit on one page or display window, the resolution of the output path map decreases. Color, greyscaling and shading can aid the user's ability to ascertain differences between event symbols when presented with a low resolution path map. For example, a color such as red can be used to indicate particularly important event symbols such as areas of high processing activity. A user can then "zoom in" on this area by establishing new or refined viewing criteria and be presented with a higher resolution view of the event symbol and its surrounding symbols in order to better ascertain the problem.

In addition to the path map, other data, both captured and calculated can be presented to the user in the form of output tables, charts, graphs, reports, etc. The data includes but is not limited to:

1) the identify of each operation such as the nature of the I/O, service request, etc.;

2) the identify of the dataset or database under operation;

3) statistics relevant to the elapsed time, CPU time, and other resources consumed by that operation, such as main and secondary storage. The statistics can represent averages, medians, modes, maximums, minimums, standard deviation, etc., depending on the user's requirements;

4) the number of times and relative frequency that an operation occurred;

5) the operation or series of operations immediately following a particular operation; and 6) the sequence of operations for a particular transaction.

These statistics, in conjunction with the path map, facilitate the asset management of the hardware and software resources being monitored. The multitude of types of outputs allow an efficient and expedient means for maximizing the use of these expensive assets.

In the case where one or more of the programs for all or a part of a transaction are concurrently executed on multiple computers within the enterprise, the computer program profiler 102 can present statistics to the user segmented both by process and processor. For example, a transaction may consist of multiple processes divided among multiple computer systems. It is further possible that some of these systems are capable of executing the same process. A given transaction, therefore, can take multiple paths throughout the enterprise. As a result, the results obtained for a particular transaction will differ due to the mix of computer systems, depending on which system executed a particular process. This is due to the fact that different computer systems may have different processor speeds, communication speeds, CPU utilization levels, peripheral input/output capabilities, etc.

Although it is possible that multiple CPUs can exist in the same computer, it is more likely that transactions will occur across a network when multiple computer systems are used to support a transaction. For example, the movement of data packets over a network, particularly the Internet, is a transaction when that movement is considered in its most basic form. In that case, each network node can have a program running to capture statistics regarding particular transactions. These statistics can be reported and presented to a user as described above. This allows a user to view the process flow in terms of network activity, network routing, network loading, etc., by transaction or one or more types of transactions.

In order to analyze the operation of a network of computers, transactions must be defined for the various nodes and incorporated by monitoring programs on the relevant nodes. As discussed above, transactions can therefore be defined and distributed across multiple nodes, and monitored using the aforementioned techniques of the present invention. For example, network nodes perform transactions defined by data contained in the network transmission protocol. The present invention can be applied to the Internet in which new protocols are being devised and refined to support particular communication needs. Examples include File Transfer Protocol (FTP) for transferring files, Hypertext Transfer Protocol (HTTP) for accessing Internet web pages, Simple Mail Transfer Protocol (SMTP) for transporting electronic mail messages, etc. The overall performance of the system based on these transactions can be profiled by defining the transactions to gain knowledge as to how much time is taken in executing these transactions across a network.

Figure 21A:
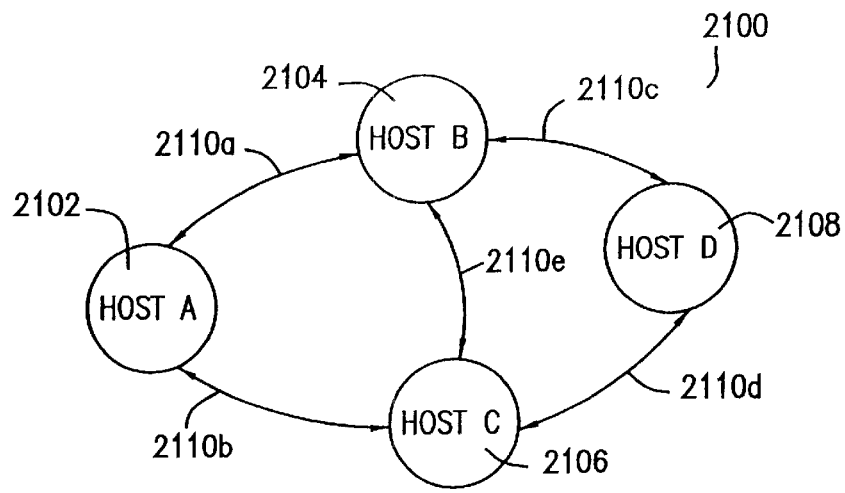
FIG. 21A is a diagram showing a multi-node network whose operation can be profiled using the present invention.

An example of defining transactions as distributed across multiple network nodes will be described with reference to FIGS. 21A and 21B. FIG. 21A shows an example of a network used to transport electronic mail ("e-mail") messages. As used throughout this example, the term "transaction" refers to both the overall process of sending an e-mail from one node to another (an "e-mail transaction") as well as the individual transactions occurring in each host node, i.e., forming a packet, sending a packet, receiving a packet, etc. Both types of transactions can be profiled using the subject invention.

As shown in FIG. 21A, a network 2100 is comprised of Host A 2102, Host B 2104, Host C 2106, and Host D 2108 interconnected by a series of links 2110a–e. Each of Hosts A–D 2102–2108 is capable of sending, receiving and forwarding electronic mail messages. For example, Host A 2102 can transmit an electronic mail message to Host D 2108 by assembling a message and transmitting it via link 2110a to Host B 2104 or link 2110b to Host C 2106. Host B 2104 or Host C 2106 can then route the electronic mail message to Host D 2108 via its respective link 2110c or 2110d. In a case where there is congestion or a transmission impairment on one of the links 2110c or 2210d, Host B 2104 can route the electronic mail message to Host C 2106 via link 2110e for subsequent transmission to Host D 2108. Thus, in the process of composing and routing the electronic mail message, routing might take several hops from node to node, and various segments of the message which have been assembled into multiple packets could take different paths in reaching their destination prior to reassembly in Host D 2108.

It is desirable, therefore, to be able to monitor the transactions in Hosts A–D 2102–2108 in order to determine the performance levels of the various Hosts such that their operational programs can be updated as necessary to maximize use of their resources, and to maximize network performance.

By way of further illustrating how a path map would present a representative picture of network operations, assume that each Host A–D 2102–2108 has certain basic transactional capabilities defined as: send a message (SM); receive a message (RM)—store the complete message; packetize a message for transmission (PM); re-assemble packets into a message (AM); forward packet to host 'X' (FPX); receive packet from host 'X' (RPX) and send packet to host 'X' (SPX).

The overall process of sending and receiving an electronic mail message is a combination of these transactions. To send a message form Host A 2102 to Host D 2108, each Host has certain transactions:

| Host A 2102: | PM Host A 2102 → SPB 2104 |
| | PM Host A 2102 → SPC 2106 |
| Host B 2104: | RPA 2102 → FPD 2108 |
| | RPA 2102 → FPC 2106 |
| | RPC 2106 → FPD 2108 |
| Host C 2106: | RPA 2102 → FPD 2108 |
| | RPA 2102 → FPB 2104 |
| | RPB 2104 → FPD 2108 |
| Host D 2108: | RPB 2104 → AM Host A 2102 |
| | RPC 2106 → AM Host A 2102 |

A path map would therefore present a representative picture of network operations for these types of transactions showing network performance and possibly overloaded or under utilized paths, routing, etc.

Figure 21B:
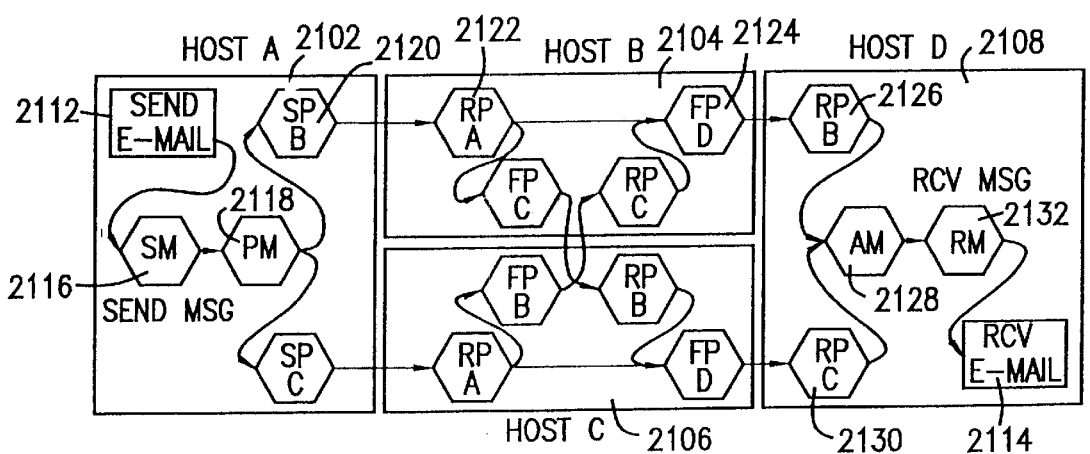
FIG. 21B is a path map showing electronic mail message transactions across the network of FIG. 21B.

FIG. 21B depicts the paths a message might take. Where Host A 2102 has a send e-mail process 2112, and Host D 2108 has a receive e-mail process 2114, a path map can be constructed using the basic transactional capabilities described above. One path of the numerous paths from send e-mail 2112 to receive e-mail 2114 is described as follows. Host A 2102 has a send message transaction 2116 which feeds a packetize message transaction 2118. The packetize message transaction 2118 disassembles the message into subparts for transmission through the network. The packetize message transaction 2118 sends one or more of packets to the send packet B 2120 transaction. Send packet B 2120 causes the packet to be transmitted on the network to Host B 2104.

On Host B 2104, the receive packet A transaction 2122 receives the packet from Host A 2102 and, for example, executes a forward packet D transaction 2124 to cause the packet to be forwarded to its destination node, Host D 2108. On Host D 2108, a receive packet B transaction 2126 receives the packet from Host B 2104 and executes an assemble message transaction 2128 to reassemble the packetized message. Assemble message transaction 2128 reassembles packets comprising the message from various receive packet transactions, such as the receive packet B transaction 2126 and the receive packet C transaction 2130. Receive message transaction 2132 represents the terminus in the path map.

Note that packets could be sent from Host B 2104 to Host C 2106 and vice versa rather than being forwarded directly to Host D 2108. Depending upon network traffic, a direct transmission to Host D 2108 might not be as responsive as routing it through another host and then on to the Host D 2108. For example, network link 2110d from Host C 2106 to Host D 2108 may be experiencing transmission errors, or the connection speed may be significantly slower than if the packet were routed through Host B 2106 and then on to Host D 2108 via link 2110c.

As is shown in FIG. 21B, a complete and comprehensive path map depicting all of the various transactions required within each node to effect the transmission and receipt of an electronic mail message can be created using the subject invention. This allows system owners and designers to effectively manage their resources, even resources distributed across a computer network.

In addition to using the present invention to create a path map depicting all of the transactions within each node as was described above with reference to FIGS. 21A and 21B, event data surrounding the network-based transactions can be profiled. An example of profiling network-based transactions using the network shown in FIG. 21A will be explained with reference to FIGS. 21C–21G.

Using the notation described above to define available transactional events, for the following example, assume that all hosts have equal characteristics and transmission links are equal except for link 2110d. In the case of link 2110d, data transmission takes three times longer to complete than does transmission across links 2110a–c and 2110e.

A profile of a network-based series of transactions three electronic mail transactions is analyzed and depicted in the following example. Each transaction is explained as follows:

Transaction 1

Host A 2102 sends a two packet message to Host D 2108. One packet, transaction 1A, is forwarded to Host B 2104 and then onto Host D 2108. The other, transaction 1B, is forwarded to Host C 2106 and then onto Host D. The transaction data for transaction 1 is shown by the following table in which the numbers below the event codes represent time units:

| | SM | PM | SPB | RPA | FPD | RPB | AM | |
|---|---|---|---|---|---|---|---|---|
| 1A | 1 | 1 | 1 | 1 | 1 | 1 | 1 | |
| 1B | | PM | SPC | RPA | FPD | RPC | AM | RM |
| | | 1 | 1 | 1 | 3 | 3 | 1 | 1 |

FIG. 12C shows the path map 2134 for transaction 1 as comprised of the path map for transaction 1A 2136 and transaction 1B 2138. Note that the path map is used to express the path of the transactions from node to node. As a result, each event can be a function of a separate computer program. Thus, the overall computer program to effect the transaction in this case is comprised of a group of smaller computer programs.

Transaction 2

Host A 2102 sends a two packet message to Host D 2108. Both packets are forwarded to Host B 2104 wherein one packet is sent directly to Host D 2108, transaction 2A, and the other packet is forwarded to Host D 2108 through Host C 2106, transaction 2B. The transaction data for transaction 2 is shown by the following table:

| | | | | | | | | | |
|---|---|---|---|---|---|---|---|---|---|
| 2A | SM | PM | SPB | RPA | FPD | RPB | | AM | |
| | 1 | 1 | 1 | 1 | 1 | 1 | | 1 | |
| 2B | | PM | SPB | RPA | FPC | RPB | FPD | RPC | AM | RM |
| | | 1 | 1 | 1 | 1 | 1 | 3 | 3 | 1 | 1 |

FIG. 12D shows the path map 2140 for transaction 2 as comprised of the path map for transaction 2A 2142 and transaction 2B 2144.

Transaction 3

Host A 2102 sends a single packet message to Host D 2108. The message is forwarded to Host C 2106 and then routed to Host D 2108 through Host B 2104. The transaction data for transaction 3 is shown by the following table:

| SM | PM | SPC | RPA | FPB | RPC | FPD | RPB | AM | RM |
|---|---|---|---|---|---|---|---|---|---|
| 1 | 1 | 1 | 1 | 1 | 1 | 1 | 1 | 1 | 1 |

FIG. 12E shows the path map 2146 for transaction 3.

Figure 21C:
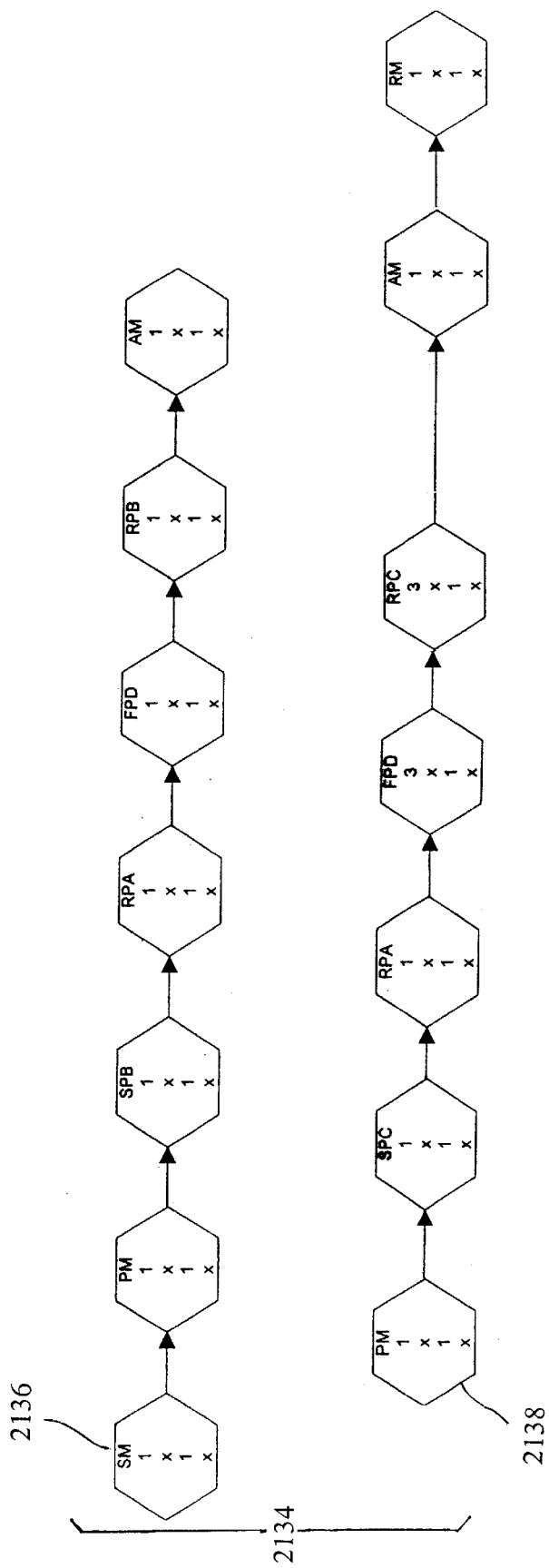
FIGS. 21C–21F are path maps of a series of network-based transactions generated by a computer program profiler constructed in accordance with the present invention.
Figure 21D:
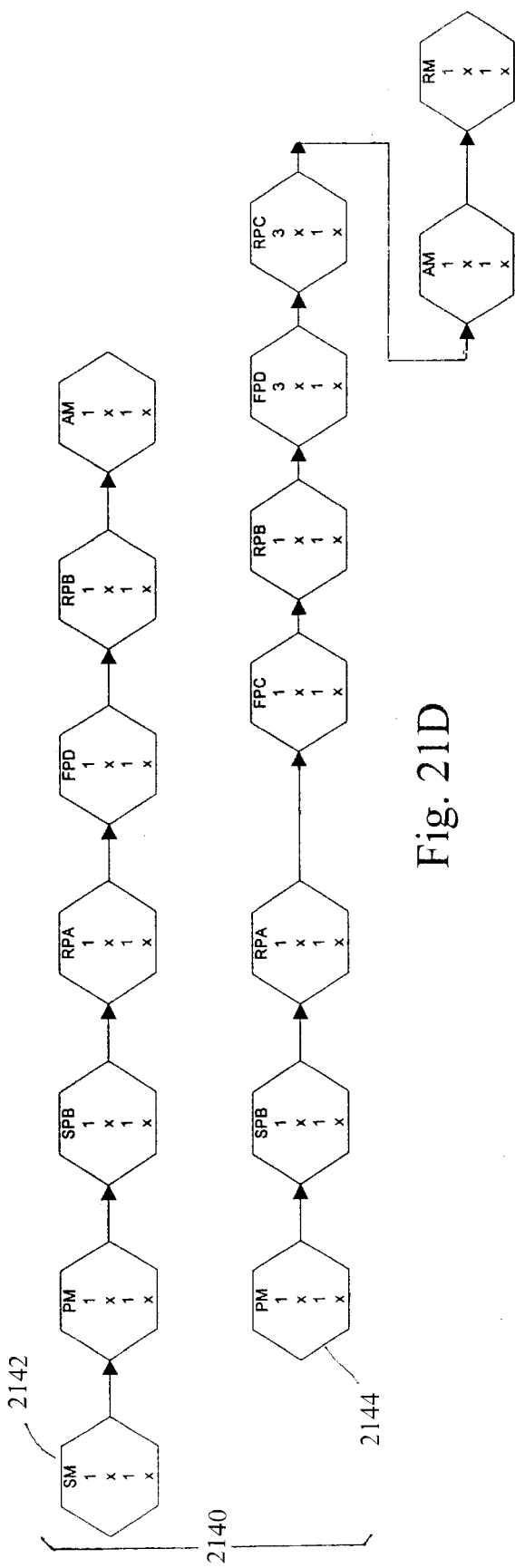
Figure 21E:
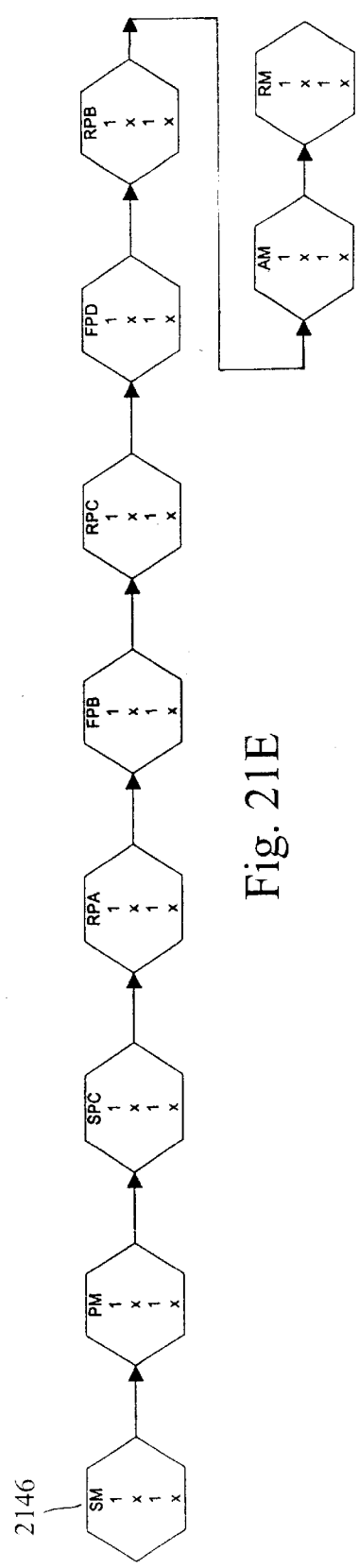
Figure 21F:
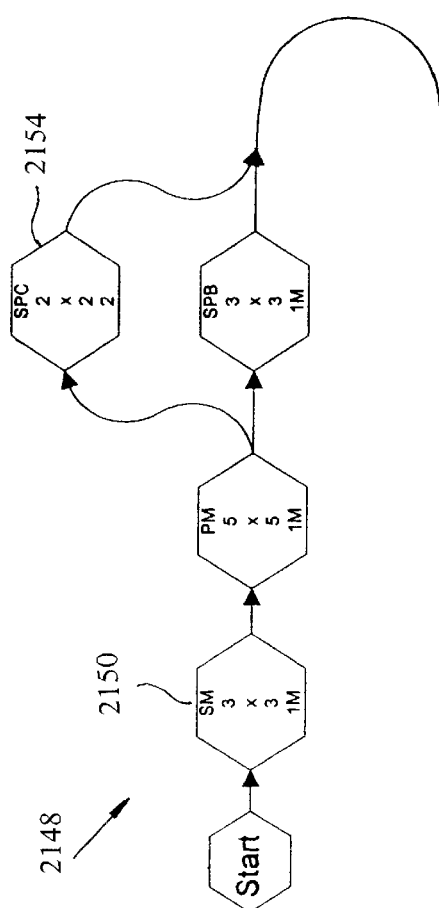
Figure 21F:
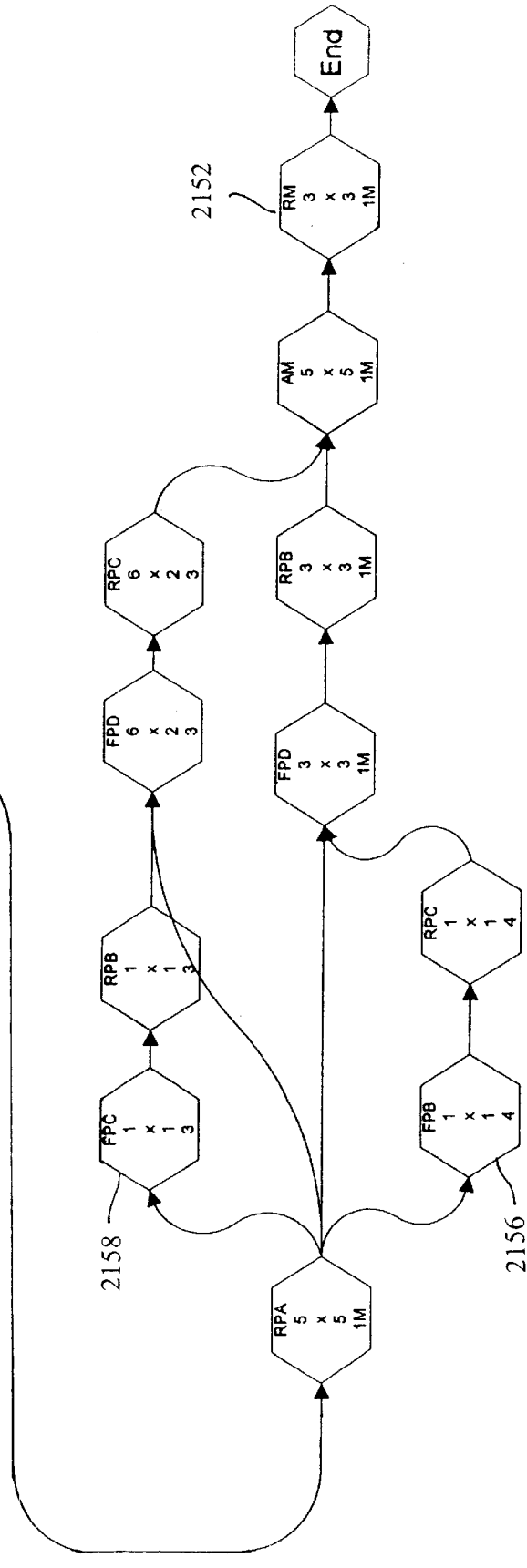

FIG. 21F shows the resultant path map 2148 for the combination of transactions 1, 2 and 3 shown in FIGS. 21C–21E. As with the previously discussed examples, path map 2148 is comprised of a main path beginning with send message PECB 2150 and ending with receive message PECB 2152. The main path in this case shows that the best path between Host A 2102 and Host D 2108 is through Host B 2104. This is the expected result because all hosts in this example are considered of equal capacity and links 2110A, 2110B and 2110C perform data transmission faster than link 2110D.

In addition, the alternate route of a packet through Host C 2106 is shown as the path through PECB 2154 and the route from Host A 2102 to Host D 2108 via Host B 2104 then Host C 2106 is shown as PECB chain 2156. Similarly, the route from Host A 2102 to Host D 2108 via Host C 2106 then Host B 2104 is shown as PECB chain 2158. These non-optimal routes appear as segments deviating from the main path. Thus, the path map created by the present invention accurately depicts network-based transactions, and does so in a manner similar to profiling those programs which do not traverse a network.

Figure 21G:
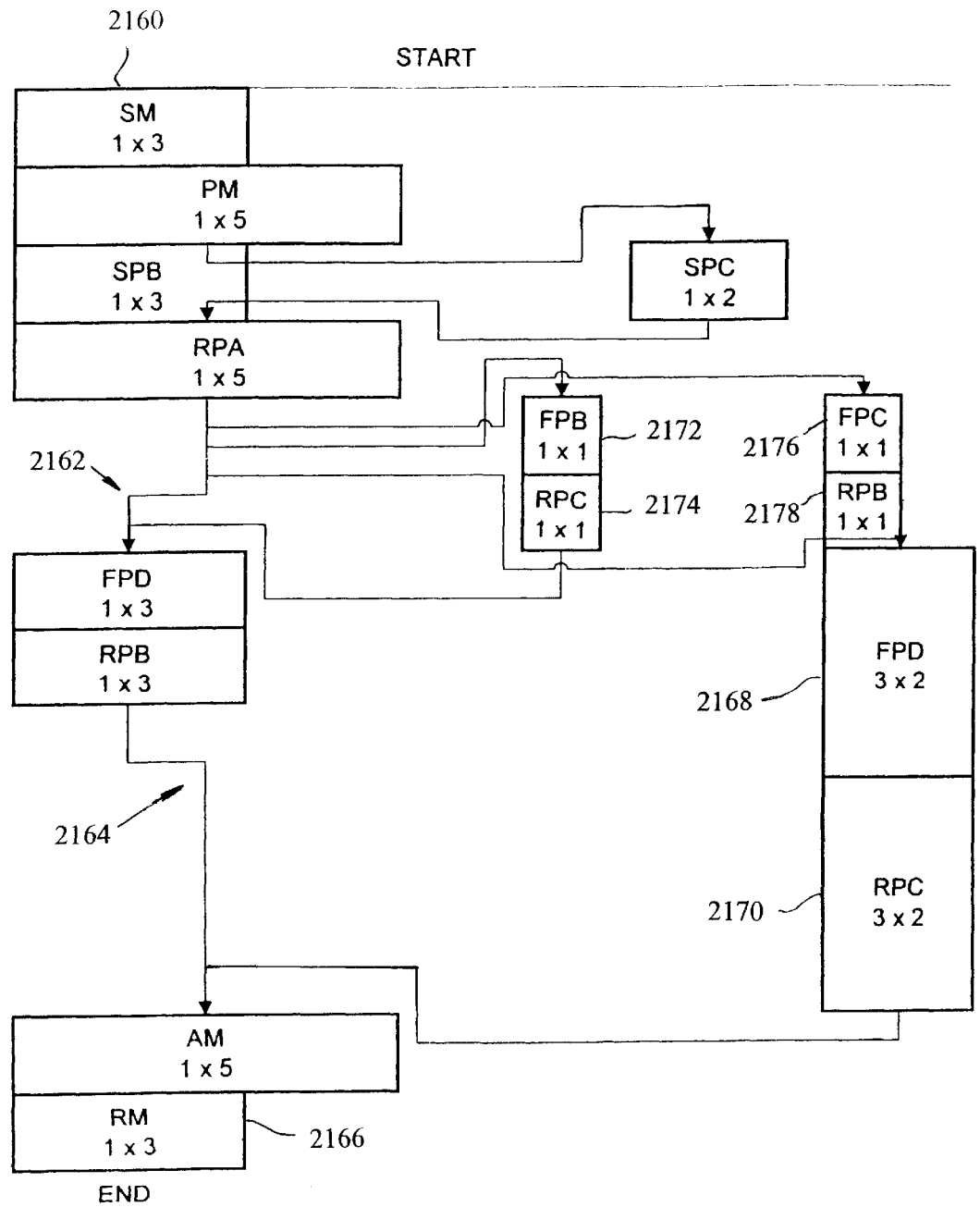
FIG. 21G is an output diagram for the transactions depicted in FIGS. 21C–21F generated by a computer program profiler constructed in accordance with the present invention.

FIG. 21G shows an output path map based on transactions 1, 2 and 3, and specifically, based on the resultant path map shown in FIG. 21F. As shown on the output path map in FIG. 21G, the main path corresponding to the main path shown in FIG. 21F is shown by event symbol 2160 vertically down the output path diagram through connectors 2162 and 2164, terminating at event symbol 2166. Event symbols 2160 and 2166 correspond to PECBs 2150 and 2152, respectively, shown in FIG. 21F.

The output map shown in FIG. 21G gives a user a clear understanding of the performance of the profiled electronic mail transactions such that an interested user, such as a software developer or network operations administrator, can concentrate his or her attention to quickly locate problematic areas. For example, the forward packet to Host D event symbol 2168 and receive packet from Host C event symbol 2170 show that a significant amount of time is spent in the path from Host C 2106 to Host D 2108. In addition, the path segments shown by forward packet to Host B event symbol 2172 and receive packet from Host C event symbol 2174, and the path segment showing forward packet to Host C event symbol 2176 and receive packet from Host B event symbol 2178 illustrate that there is additional undesired cross-communication between Hosts B and C. In other words, there is traffic sent by Host A 2102 destined for Host D 2108 which traverses link 2110e. A user can use the output path map to identify the effect that this additional routing hop adds to the processing of electronic mail transactions.

In sum, based upon the output path map, a user would be able to identify the problem areas in the network to be sure that the primary routing of all electronic mail traffic is from Host A 2102 to Host B 2104 and then to Host D 2108, traversing links 2110a and 2110c. Further, the user would know that this routing decision should occur in the send packet routine on Host A 2102 and can make appropriate programmatic changes.

An example of plotting the event symbols for the main path of the output diagram of FIG. 19A will now be described. To plot the main path on the output diagram, some assumptions about the horizontal and vertical positions of various elements of the output diagram must be made. The first assumption is that the header information printed at the top of the output medium occupies the top two inches of space in the vertical dimension. As a result, the start event symbol must be placed below this point. The vertical center of the output medium is next determined and will be referred to for the simplicity of this example as "Center". Thus, "Center" identifies the location of the column on the output medium in which the main path will be depicted. In the vertical time dimension, several other assumptions are made for the sake of this example. The shortest time period to be represented on the output diagram is one time unit (corresponding to an average event duration of 1). As indicated by the final start location stored in trailer PECB 1904 of FIG. 19A, the length of the longest path on the path map is almost 30 time units. One-quarter of an inch of length of the output medium will be used to represent one time unit in the time dimension, so the longest path may be depicted in less than 7.5 inches and the output diagram will therefore fit on one standard 8 ½×11 inch sheet of paper. Next, the PECB with the greatest event count is located. In FIG. 19A, the greatest event count in any PECB (aside from the header and trailer PECBs) is 4. If a single point size for each event instance were used to indicate the event count of each event, then the event symbols drawn on the output diagram would vary from 1 to 4 points in width. These very narrow widths would probably be insufficient to provide ready differentiation between the elements, and a multiplier is therefore preferably used to increase the width associated with each event count so that the varying event counts of the events depicted in the ultimate output diagram may be readily recognized. Assuming a multiplier of 4, the widths of the various event symbols plotted on the output diagram would be 4, 8, 12 or 16 points wide, which would provide a better visual depiction. Finally, a value of 1 is arbitrarily set for the length of the start and end event symbols represented by the header and trailer PECBs. Alternatively, the default start time and default end time stored in the header and trailer PECBs of the path map could be used.

The start event symbol and the first four events on the main path could be plotted as follows. Width is given in terms of point size and length is given in terms of units of one-quarter of an inch. For this example, four items of information are sufficient to plot the event symbols on the output diagram: (1) the column position; (2) the distance downward from the top of the output medium at which the event symbol begins; (3) the width of the event symbol; and (4) the length of the event symbol:

Start event symbol: center, down 8, width 28, length 1.

First main path event symbol: center, down 9, width 16, length 3.25.

Second main path event symbol: center, down 12.25, width 16, length 3.5.

Third main path event symbol: center, down 15.75, width 12, length 2.33.

Fourth main path event symbol: center, down 18.08, width 8, length 4.5.

FIG. 20 illustrates the first four events of the main path of FIG. 19A plotted in an output diagram. The output diagram includes the header 2002, event symbols 2004, and text 2006 associated with the event symbols 2004 immediately to the left thereof. A start event symbol 2008 is also shown. Since each PECB in the path map would contain all of the necessary information relating to its position on the output diagram, any PECB could be selected and plotted next.

After the event elements have been output, the connecting lines showing how the event elements precede or follow one another are drawn on the output medium in step 1710. FIG. 19E shows connecting lines 19121 and 19125, and FIG. 19I shows connecting lines 19137 and 19139. These lines show the interaction between the recorded events and connect the event symbols on the output diagram based on the pointers in the path map. The connection lines may also be used as an alternative indicator for representing the event count or event duration of the events on the output diagram (by varying the width of the connecting lines based on the event count of the events connected by the connecting lines, for example) if this information is not represented in the display of the event symbols themselves.

The connecting lines are drawn as follows. When drawing connecting lines, the current block identifies the start point and the next block identifies the end point. When a block starts at the same horizontal level as the current end point, the connecting line is a horizontal line to the new block start location. The column information of the next block is used to determine whether the connecting line moves right or left. When the start location value of indexed block is directly below, as depicted in FIG. 20, the connecting line is drawn vertically down to the start location value of that next block.

When the column number of the block containing the next connection point is one greater or one less than the column of the current block, a line is drawn directly to that connecting block since there is no intervening column of data. A connector is drawn when the connecting column is on the opposite side of the main path. FIG. 19J shows connectors 19146 and 19148. Connector 19146 shows identifier "A", thereby referring to the complementary identifier "A" in connector 19148. In other words, there is a programmatic path from 19146 to 19148.

When the connecting column is more than one column away from the current block, the various path segments must be checked for intervening column numbers. Intervening paths found for data elements which exist in a horizontal path, i.e., the path line would cross that data element, must be determined. If no intervening paths exist, the line is drawn directly. If an intervening path segment exists in the area where the connecting line will pass, a connector must be used.

If a connector is required, a short line is drawn in the direction of the next block and a connector drawn thereon using an appropriate symbol to identify the connection. The corresponding connector is drawn at the target point a short distance from the connector point and a line is drawn to the connector point. The line segment need not be drawn on the chart prior to the connector since the path element control blocks contain all of the necessary data needed to plot the line segment.

When connectors are required, the identifier assigned to the connector and the location on the page of the connector must be tracked. If a connector is needed, a determination must be made as to whether a connector value has been assigned. If a value has not been assigned, the next connector identifier value is assigned to that connector. Once all of the data segments have been plotted, text describing the events can be added to the output display. Information in the control block is used to place the descriptive text to the side of the segment it describes, midway down the line segment. A flag is added to the descriptive text if there is looped data for that event.

Where looped data for an event exists, an additional page is created and the header information from the display page is repeated. Any looped data for the events is then printed, in which the looped data contains the event description, total time spent in the looping event and the quantity of times the event looped.

Finally, after all of the event elements and connecting lines have been drawn, summary and/or error messages may be printed at the end of the output medium in step 1712. The summary information and error messages are not necessary, but may include useful information for the user such as which events were involved in looping situations, the total time spent in the looping events, the number of repetitions of the loops, and the like.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for profiling one or more operational characteristics of a computer program, said computer program performing a plurality of transactions, at least one of said transactions having at least one event, said method comprising the steps of:

gathering event data corresponding to one or more of said transactions;

constructing a path map from said gathered event data, said path map representing program operation performance relationships between said gathered events relative to said transactions, said path map being arranged in order of execution; and creating an output, said output being created based on said path map, and reflecting data corresponding to a frequency of occurrence and a time length of occurrence of the gathered event data.

2. A method according to claim 1, wherein said gathering, constructing and creating steps are performed by at least two processors.

3. A method according to claim 2, wherein said at least two processors communicate across a network.

4. A method according to claim 1, wherein an execution of said computer program is distributed across at least two processors.

5. A method according to claim 4, wherein said at least two processors communicate across a network.

6. A method according to claim 1, wherein said data gathering step includes the step of allowing a user to specify one or more data gathering criterion.

7. A method according to claim 6, wherein said user can commence and stop said data gathering, and alter said data gathering criterion while said computer program is executing.

8. A method according to claim 6, wherein said data gathering step further includes the step of storing in a computer memory, only event data which matches said one or more specified data gathering criterion.

9. A method according to claim 6, wherein said data gathering step further includes the step of storing all events associated with at least one of said transactions and filtering said stored events in accordance with said one or more specified data gathering criterion such that said path map is constructed from said filtered gathered event data.

10. A method according to claim 1, wherein said output is created in accordance with one or more filtering criterion specified by a user.

11. A method according to claim 1, wherein at least one of said events corresponds to at least one category of related data.

12. The method according to claim 1, wherein said method is performed by a mainframe computer.

13. A method according to claim 1, wherein said output comprises output data selected from the group consisting of display data, print data and storage data.

14. A method according to claim 1, wherein said output depicts a path through said computer program showing the actual processing flow of said computer program, said output being comprised of:
    a header;
    a plurality of event symbols; and
    a plurality of textual data, each of said plurality of textual data describing a respective event symbol.

15. A method according to claim 14, wherein a length of each of said event symbols corresponds to a ratio of an average total event duration for a respective gathered event to a sum of an average total event duration for all of said gathered events.

16. A method according to claim 14, wherein a width of each of said event symbols corresponds to a ratio of a quantity of occurrences for a respective gathered event to a sum of the quantity of occurrences for all of said gathered events.

17. A method according to claim 14, wherein at least one of a color, greyscale or shading level of each of said event symbols corresponds to a ratio of an average total event duration for a respective gathered event to a sum of an average event duration for all of said gathered events.

18. A method according to claim 14, wherein at least one of a color, greyscale or shading level corresponds to a proportion of a quantity of occurrences for a respective gathered event to a sum of the quantity of occurrences for all of said gathered events.

19. A method according to claim 14, wherein said output is further comprised of connecting lines, said connecting lines being used to connect said event symbols to show an operational flow of said computer program.

20. A method according to claim 19, wherein a main path is located in approximately a center of said output, said main path being a connected sequence of event symbols of one or more connected sequences of event symbols in which said gathered events corresponding to said event symbols were executed with a highest quantity.

21. A method according to claim 1, wherein said data is gathered in a manner having approximately no adverse impact on the operation of said computer program.

22. A method for profiling one or more operational characteristics of a computer program, said computer program performing one or more transactions, at least one of said transactions having at least one event, said method comprising the steps of:
    gathering event data corresponding to one or more of said transactions;
    constructing a path map from said gathered event data, said path map representing program operation performance relationships between said gathered events, said path map being arranged in order of execution; and
    creating an output, said output being created based on said path map,
    wherein said path map construction step comprises the steps of:
        selecting which of said gathered events is to be analyzed;
        sorting said selected events in order of event occurrence;
        building one or more event chains in which each of said event chains corresponds to a sequence of sorted events occurring in an instance of said computer program; and
        generating said path map by assimilating said event chains into said path map such that only said event chains representing a unique sequence of sorted events are assimilated, said path map including data corresponding to a frequency of occurrence and a time length of occurrence for each of said sorted events.

23. A method according to claim 22, wherein said path map comprises a plurality of path element control blocks linked together.

24. A method according to claim 23 wherein each of said path element control blocks is comprised of:
    an event identifier for correlating said gathered event with a textual representation of said gathered event;
    accumulated statistical data for each of said gathered events;
    a path segment identifier indicating a path number for said gathered event; and
    a pointer, said pointer representing linking data to another path element control block.

25. A method according to claim 23, wherein said accumulated statistical data comprises a frequency of occurrence and a time length of occurrence.

26. A method for profiling one or more operational characteristics of a computer program, said computer program performing one or more transactions, at least one of said transactions having at least one event, said method comprising the steps of:
    gathering event data corresponding to one or more of said transactions;
    constructing a path map from said gathered event data, said path map representing program operation performance relationships between said gathered events, said path map being arranged in order of execution;
    creating an output, said output being created based on said path map, and said output comprises output data selected from the group consisting of display data, print data and storage data;
    wherein said output is scaled in accordance with at least one of a first ruler and a second ruler, said first ruler defining a first mapping between first units and horizontal output distance units, said second ruler defining a second mapping between second units and vertical output distance units.

27. A method according to claim 26, wherein said first units correspond to time units and said second units correspond to event frequency of occurrence units.

28. An apparatus for profiling one or more operational characteristics of a computer program, said computer program performing a plurality of transactions, at least one of said transactions having one or more events, said apparatus comprising a processor capable of the following functions:

gathering event data corresponding to one or more of said transactions;

constructing a path map from said gathered event data, said path map representing program operation performance relationships between said gathered events relative to said transactions, said path map being in execution-time sequence; and creating an output, said output being created based on said path map, and reflecting data corresponding to a frequency of occurrence and a time length of occurrence of the gathered event data.

29. An apparatus according to claim 28, wherein said processor is a mainframe computer.

30. An apparatus according to claim 28, wherein said computer program executes on one or more apparatuses other than said apparatus.

31. An apparatus according to claim 28, wherein said data is gathered in a manner having approximately no adverse impact on the operation of said computer program.

32. A computer storage medium storing a first computer executable program code which, when run, executes a method for profiling one or more operational characteristics of a second computer program, said second computer program performing a plurality of transactions, at least one of said transactions having a one or more events, said method comprising the steps of:

gathering event data corresponding to one or more of said transactions;

constructing a path map from said gathered event data, said path map representing program operation performance relationships between said gathered events relative to said transactions, said path map being arranged in order of execution; and creating an output, said output being created based on said path map, and reflecting data corresponding to a frequency of occurrence and a time length of occurrence of the gathered event data.

33. A computer storage medium storing said first computer-executable program code which, when run, executes a method for profiling one or more characteristics of said second computer program according to claim 32, wherein said gathering, constructing and creating steps are performed by at least two processors.

34. A computer storage medium storing said first computer executable program code which, when run, executes a method for profiling one or more characteristics of said second computer program according to claim 33, wherein said at least two processors communicate across a network.

35. A computer storage medium storing said first computer executable program code which, when run, executes a method for profiling one or more characteristics of said second computer program according to claim 32, wherein an execution of said second computer program is distributed across at least two processors.

36. A computer storage medium storing said computer executable program code which, when run, executes a method for profiling one or more characteristics of said second computer program according to claim 35, wherein said at least two processors communicate across a network.

37. A computer storage medium storing said computer executable program code which, when run, executes a method for profiling one or more characteristics of said second computer program according to claim 32, wherein said data gathering step includes the step of allowing a user to specify one or more data gathering criterion.

38. A computer storage medium storing said computer executable program code which, when run, executes a method for profiling one or more characteristics of said second computer program according to claim 37, wherein said data gathering step further includes the step of storing in a computer memory, only event data which matches said one or more specified data gathering criterion.

39. A computer storage medium storing said computer executable program code which, when run, executes a method for profiling one or more characteristics of said second computer program according to claim 37, wherein said data gathering step further includes the step of storing all events associated with at least one of said transactions and filtering said stored events in accordance with said one or more specified data gathering criterion such that said path map is constructed from said filtered gathered event data.

40. A computer storage medium storing said computer executable program code which, when run, executes a method for profiling one or more characteristics of said second computer program according to claim 32, wherein said output is created in accordance with one or more filtering criterion specified by a user.

41. A computer storage medium storing said computer executable program code which, when run, executes a method for profiling one or more characteristics of said second computer program according to claim 40, wherein said user can commence and stop said data gathering, and alter said data gathering criterion while said second computer program is executing.

42. A computer storage medium storing said computer executable program code which, when run, executes a method for profiling one or more characteristics pf said second computer program according to claim 32, wherein said output comprises output data selected from the group consisting of display data, print data and storage data.

43. A computer storage medium storing said computer executable program code which, when run, executes a method for profiling one or more characteristics of said second computer program according to claim 42, wherein said output is scaled in accordance with at least one of a first ruler and a second ruler, said first ruler defining a first mapping between first units and horizontal output distance units, said second ruler defining a second mapping between second units and vertical output distance units.

44. A computer storage medium storing said computer executable program code which, when run, executes a method for profiling one or more characteristics of said second computer program according to claim 43, wherein said first units correspond to time units and said second units correspond to event frequency of occurrence units.

45. A computer storage medium storing said computer executable program code which, when run, executes a method for profiling one or more characteristics of said second computer program according to claim 32, wherein said output depicts a path through said second computer program showing the actual processing flow of said computer program, said output being comprised of:

a header;

a plurality of event symbols; and a plurality of textual data, each of said plurality of textual data describing a respective event symbol.

46. A computer storage medium storing said computer executable program code which, when run, executes a method for profiling one or more characteristics of said second computer program according to claim 45, wherein a length of each of said event symbols corresponds to a ratio of an average total event duration for a respective gathered event to a sum of an average total event duration for all of said gathered events.

47. A computer storage medium storing said computer executable program code which, when run, executes a method for profiling one or more characteristics of said second computer program according to claim 45, wherein a width of each of said event symbols corresponds to a ratio of a quantity of occurrences for a respective gathered event to a sum of the quantity of occurrences for all of said gathered events.

48. A computer storage medium storing said computer executable program code which, when run, executes a method for profiling one or more characteristics of said second computer program according to claim 45, wherein said output is further comprised of connecting lines, said connecting lines being used to connect said event symbols to show an operational flow of said second computer program.

49. A computer storage medium storing said computer executable program code which, when run, executes a method for profiling one or more characteristics of said second computer program according to claim 48, wherein a main path is located in approximately a center of said output, said main path being a connected sequence of event symbols of one or more connected sequences of event symbols in which said gathered events corresponding to said event symbols were executed with a highest quantity.

50. A computer storage medium storing said computer executable program code which, when run, executes a method for profiling one or more characteristics of said second computer program according to claim 42, wherein said data is gathered in a manner having approximately no adverse impact on the operation of said computer program.

51. A computer storage medium storing a first computer executable program code which, when run, executes a method for profiling one or more operational characteristics of a second computer program, said second computer program performing one or more transactions, at least one of said transactions having a one or more events, said method comprising the steps of:

gathering event data corresponding to one or more of said transactions;

constructing a path map from said gathered event data, said path map representing program operation performance relationships between said gathered events, said path map being arranged in order of execution; and creating an output, said output being created based on said path map wherein said path map construction step comprises the steps of:

selecting which of said gathered events is to be analyzed;

sorting said selected events in order of event occurrence;

building one or more event chains in which each of said event chains corresponds to a sequence of sorted events occurring in an instance of said second computer program; and generating said path map by assimilating said event chains into said path map such that only said event chains representing a unique sequence of sorted events are assimilated, said path map including data corresponding to a frequency of occurrence and a time length of occurrence for each of said sorted events.

52. A computer storage medium storing said computer executable program code which, when run, executes a method for profiling one or more characteristics of said second computer program according to claim 51, wherein said path map comprises a plurality of path element control blocks linked together.

53. A computer storage medium storing said computer executable program code which, when run, executes a method for profiling one or more characteristics of said second computer program according to claim 52, wherein each of said path element control blocks is comprised of:

an event identifier for correlating said gathered event with a textual representation of said gathered event;

accumulated statistical data for each of said gathered events;

a path segment identifier indicating a path number for said gathered event; and a pointer, said pointer representing linking data to another path element control block.

54. A computer storage medium storing said computer executable program code which, when run, executes a method for profiling one or more characteristics of said second computer program according to claim 53, wherein said accumulated statistical data comprises a frequency of occurrence and a time length of occurrence.

* * * * *